(12) United States Patent
Beardsley et al.

(10) Patent No.: US 9,216,745 B2
(45) Date of Patent: Dec. 22, 2015

(54) SHARED CONTROL OF SEMI-AUTONOMOUS VEHICLES INCLUDING COLLISION AVOIDANCE IN MULTI-AGENT SCENARIOS

(71) Applicant: DISNEY ENTERPRISES, INC., Burbank, CA (US)

(72) Inventors: Paul A. Beardsley, Zurich (CH); Scott Frazier Watson, Marina Del Rey, CA (US); Javier Alonso-Mora, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 222 days.

(21) Appl. No.: 14/457,291

(22) Filed: Aug. 12, 2014

(65) Prior Publication Data
US 2015/0284010 A1    Oct. 8, 2015

Related U.S. Application Data

(60) Provisional application No. 61/878,308, filed on Sep. 16, 2013.

(51) Int. Cl.
*A01B 69/00* (2006.01)
*B60W 50/10* (2012.01)
*B60W 30/08* (2012.01)
*G05D 1/00* (2006.01)

(52) U.S. Cl.
CPC .............. *B60W 50/10* (2013.01); *B60W 30/08* (2013.01); *G05D 1/0011* (2013.01); *B60W 2720/00* (2013.01)

(58) Field of Classification Search
CPC ................. B60W 30/095; B60W 30/18009; B60W 30/16; B60W 2520/00
See application file for complete search history.

(56) References Cited

U.S. PATENT DOCUMENTS

| | | | | | |
|---|---|---|---|---|---|
| 5,006,988 | A | * | 4/1991 | Borenstein | G05D 1/0255 180/169 |
| 2009/0079839 | A1 | * | 3/2009 | Fischer | G01S 7/003 348/218.1 |
| 2013/0325244 | A1 | * | 12/2013 | Wang | G05D 1/028 701/26 |

* cited by examiner

*Primary Examiner* — Michael D Lang
(74) *Attorney, Agent, or Firm* — Marsh Fischmann & Breyfogle LLP; Kent A. Lembke

(57) ABSTRACT

A method for providing shared control over movement of a vehicle within a space. The method includes receiving user input related to a velocity and a direction for the vehicle within the space. The method includes processing the user input to selectively adjust the velocity and the direction desired by the user based on a set of predefined constraints to generate a trajectory for the vehicle for an upcoming time period. The method includes operating drive mechanisms in the vehicle based on the trajectory to move the vehicle from a first position to a second position within the space during the upcoming time period. A grid map defining locations of obstacles in the space may be used to define the trajectory to avoid collisions, and a guidance trajectory may be used to further control movement to achieve a desired throughput and control vehicle movement within particular portions of the space.

43 Claims, 30 Drawing Sheets

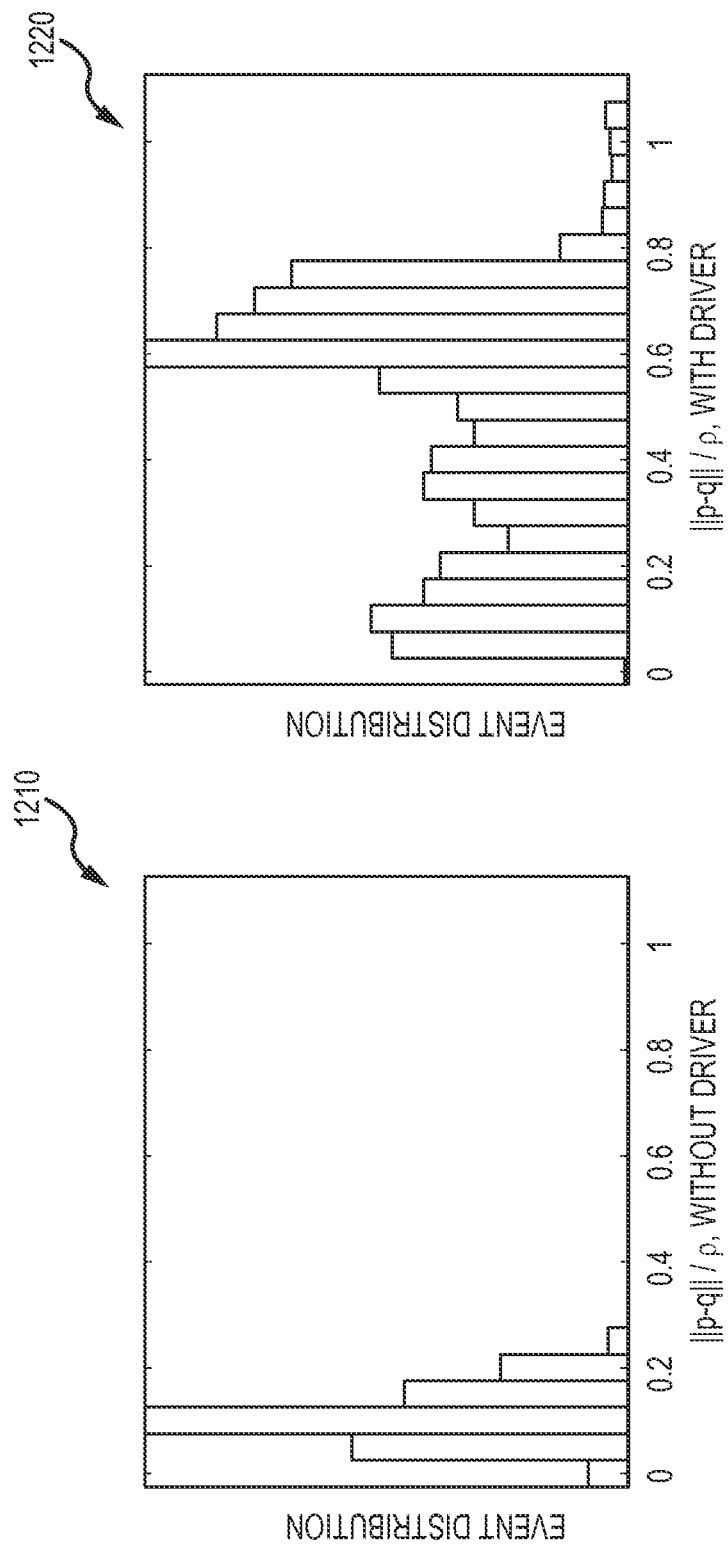

- - - - CANDIDATE REFERENCE TRAJECTORIES
———— CANDIDATE LOCAL TRAJECTORIES

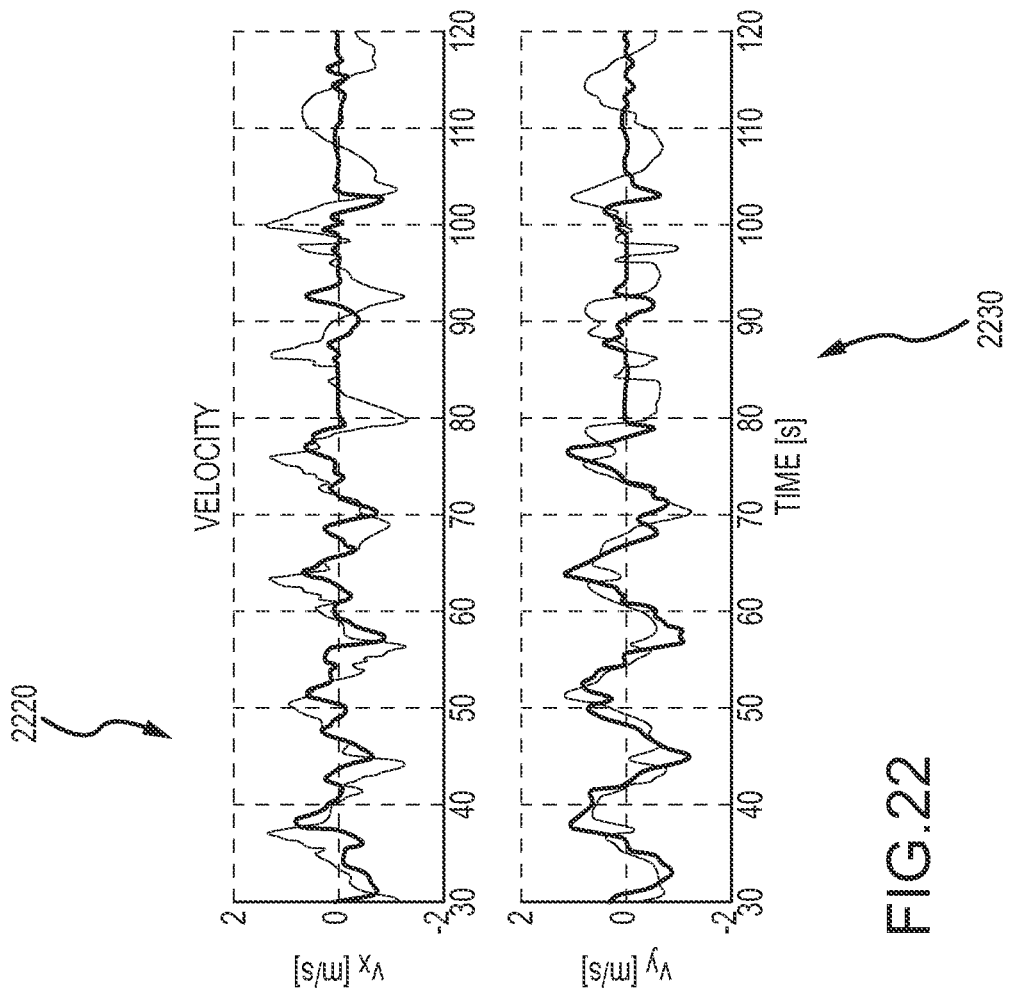
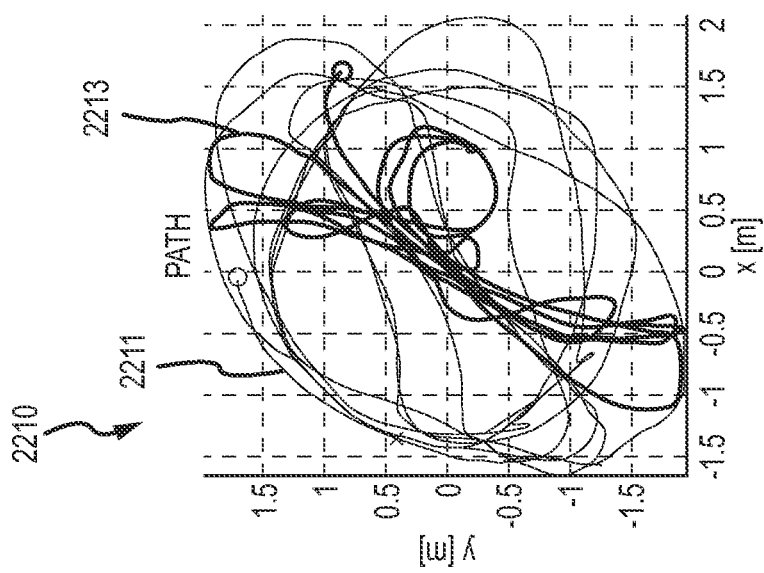
FIG.22

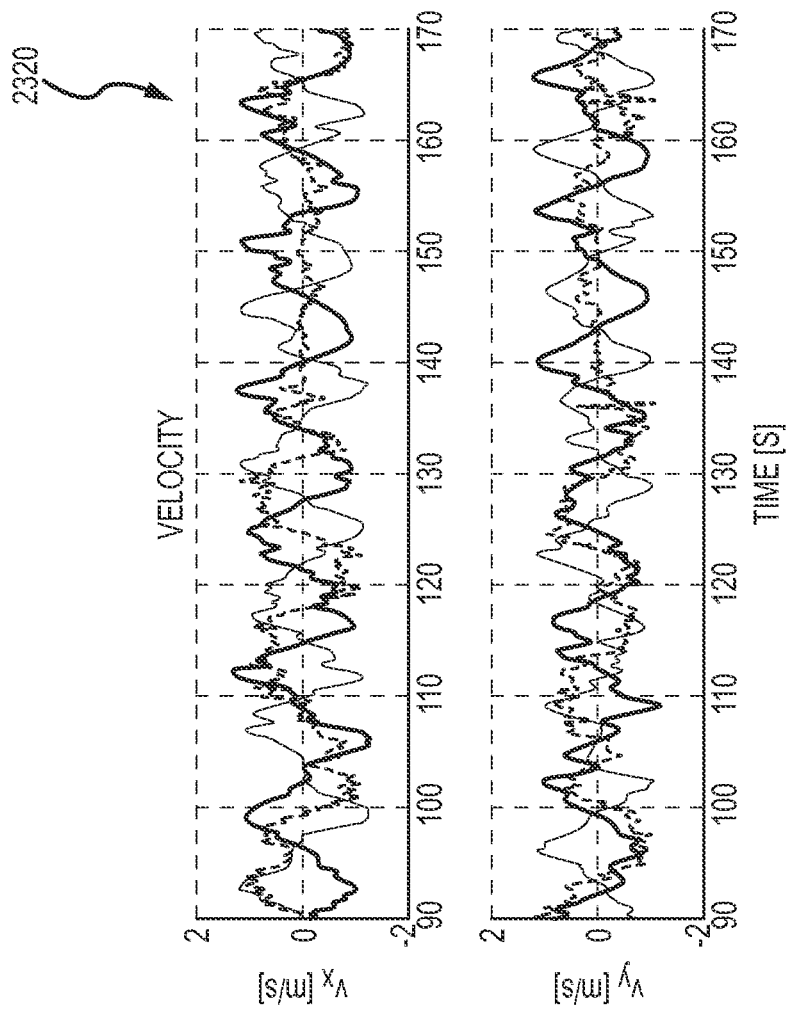
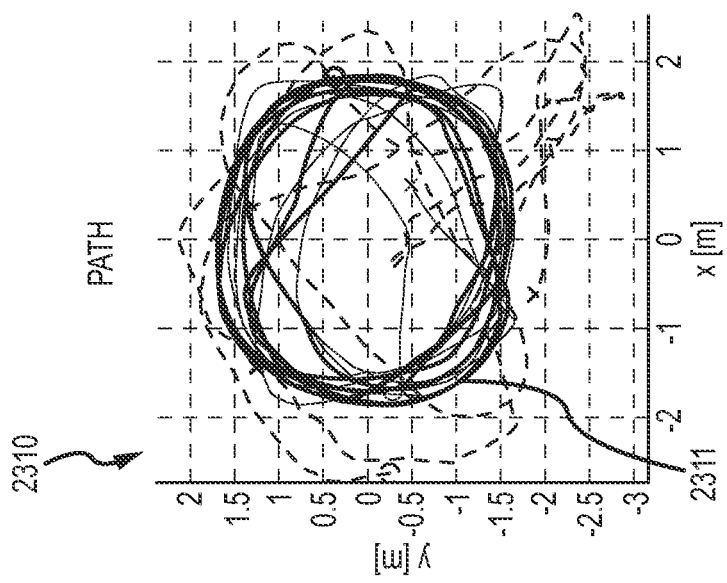
FIG.23

SHARED CONTROL OF SEMI-AUTONOMOUS VEHICLES INCLUDING COLLISION AVOIDANCE IN MULTI-AGENT SCENARIOS

CROSS-REFERENCE TO RELATED APPLICATIONS

This application claims the benefit of U.S. Provisional Application No. 61/878,308, filed Sep. 16, 2013, which is incorporated herein by reference in its entirety.

BACKGROUND

1. Field of the Description

The present description relates, in general, to techniques for remotely controlling movements and operations of vehicles such as ground-based vehicles (e.g., a two-to-four or more wheeled vehicle) and aerial vehicles (e.g., a multi-copter, a drone, or the like), and, more particularly, to methods and systems adapted for providing shared control (i.e., both remote and local operator control) over a semi-autonomous vehicle.

2. Relevant Background

There are many settings where it is desirable to provide shared control over the operations of a robot such as a terrestrial vehicle or an aerial vehicle. For example, an amusement park may provide a ride in which a passenger vehicle is driven along a race track or through an obstacle course, and it may be desirable to allow the passenger to "drive" the vehicle by providing user input indicating a direction they wish to travel and a velocity or speed they want their vehicle to move in the selected direction.

However, the vehicle control is preferably shared to provide collision avoidance with static obstacles and also with other vehicles (which may be driven by other ride participants). In other cases, a human operator may remotely control a flying drone such as a multi-copter in a particular air space, but the control is shared with a central controller to avoid collisions or achieve other goals.

Human-robot shared control has been applied in a variety of settings, but there remains a need for improved shared-control methods that enhance human control such as by providing the human operator more local control or operational freedom while still safely avoiding collisions. For example, shared control has been applied in the field of tele-robot operation for tasks including space exploration and surgery. In the case of mobile robots, methods have been developed for human interaction with a forklift, and shared control has been used with a formation of aerial vehicles via a haptic device. Work has also progressed for human-robot shared control with semi-autonomous vehicles such as wheelchairs or similar vehicles and with self-driving cars and other urban transporters.

SUMMARY

The present description provides a shared control method (and relative system for implementing this control method) for a vehicle (e.g., any wheeled or terrestrial vehicle, any aerial vehicle, and the like). A human driver, who may be in the vehicle or remote to the vehicle, commands (i.e., provides user input to provide) a preferred velocity. The method involves transforming this user input into a collision-free local motion that respects actuator constraints (e.g., vehicle kinematics) and allows for smooth and safe control. Collision-free local motions are achieved with an extension of velocity obstacles that takes into account dynamic constraints and also a grid-based map representation of the space through which the vehicle is traveling under share controlled.

To limit the freedom of control of the driver or human operator, a global guidance trajectory (or "ghost vehicle") can be used in the shared control method. The global guidance trajectory may specify the areas (or volumes) where the vehicle is allowed to drive or move in each time instance. Further, to improve operations in many environments, schedules are imposed along with or as part of the global guidance trajectory to ensure the vehicles, even under human control, achieve broadly stated goals of reaching particular places (move from a first or start position or location to a second or finish position or location) under predefined time schedules.

The low computational complexity of the method makes it well suited for multi-agent settings and high update rates, and a centralized function and a distributed function (or centralized and distributed algorithms) are described herein that allow for real-time, concurrent control of many vehicles (e.g., several to 10 to 40 or more vehicles). Extensive experiments have been performed, and the results of these experiments (using a motorized, robotic wheelchair as the vehicle) at relatively high speeds in tight dynamic scenarios are presented in the following description.

More particularly, a method is described for achieving shared control over movement of a vehicle within a space (2D or 3D space depending on whether the vehicle is a wheeled/tracked vehicle or boat or is an aerial vehicle). The shared control method includes receiving user input related to a velocity (e.g., speed and direction) for the vehicle within the space. The method then includes processing the user input with a local motion planner selectively adjusting the velocity and the direction based on a set of predefined constraints (and the presence of neighboring or other vehicles within the space) to generate a trajectory (which may also be considered a velocity as it defines speed and direction) for the vehicle in the space. The method further includes communicating motion control signals including the trajectory to the vehicle and then operating drive mechanisms in the vehicle based on the motion control signals to move the vehicle from a first position to a second position within the space during an upcoming time period.

In some cases, the trajectory defines a preferred speed for the vehicle and a direction for movement in the space. The set of predefined constraints may include a grid map (e.g., image) of the space that defines locations of obstacles in the space (physical objects such as walls and also, in some cases, virtual objects that may be projected into the space or be displayed on a monitor/display device in the vehicle). There are at least two ways to treat virtual objects: (1) if the virtual object is fixed, it can be placed in the grid map and treated like a fixed physical object; and (2) if the virtual object is created for a transient period only or if it is moving, it can be treated like another vehicle. The processing of the user input includes searching the grid map (e.g., with the vehicle's current position in the space) to identify the obstacles and to define a path from the first position to the second position in the space that avoids the obstacles.

In some implementations of the method, the set of predefined constraints includes a guidance trajectory defining a passageway through the space that can be traveled by the vehicle without collision with the obstacles, and the trajectory is defined so as to control movement of the vehicle to retain the vehicle within the passageway. The passageway may include a set of interconnected waypoints in the space and an active area in which the vehicle may move is associated with each of the waypoints. At least some of the active areas differ in size or shape defining differing areas in which the vehicle may move within the space. In some embodiments, the set of predefined constraints includes kinematic data for the vehicle, and the processing based on neighboring vehicles in the space includes processing data for collision avoidance for other vehicles moving in the space, velocity predictions for ones of the other vehicles neighboring the vehicle in the space, and/or predictions of movements of the other vehicles during an upcoming time period.

BRIEF DESCRIPTION OF THE DRAWINGS

FIGS. 12A and 12B show histograms of distance from a vehicle to a guidance trajectory;

FIG. 22 illustrates a set of graphs showing results of experiments using two quadrotors tracking intersecting trajectories while avoiding collision locally;

FIG. 23 provides a pair of graphs showing results of experiments using two quadrotors along with a moving human acting as a dynamic obstacle moving through the test fly space;

DETAILED DESCRIPTION

In brief, methods and systems are described herein that are designed to provide shared control of semi-autonomous vehicles (terrestrial or ground based vehicles and/or aerial vehicles) based, in many cases, on velocity space optimization. The method for shared control of a semi-autonomous vehicle is performed based on or using: (1) real-time input from a driver or operator of the vehicle; (2) a guidance trajectory that specifies the areas (which may be 3D spaces or volumes for aerial vehicles) where the vehicle is allowed to drive or move in each time instance; (3) avoidance constraints with respect to other agents (which may be other semi-autonomous vehicles) and/or with respect to a grid map defining the location, size, and shape of static obstacles (real or virtual such as in the form of projected images in the vehicle's drive path/space, images displayed in a vehicle's head's up display, and the like); and (4) motion continuity constraints. The local planner may provide local planning of vehicle movements using efficient centralized and/or distributed algorithms based on convex optimization and non-convex search to achieve real-time local planning where an exact grid-based representation of the map can be used in conjunction with a velocity obstacles framework. This may be desirable to allow for real-time control of a larger number of vehicles (e.g., 10 to 40 or more vehicles in a space).

Figure 1:
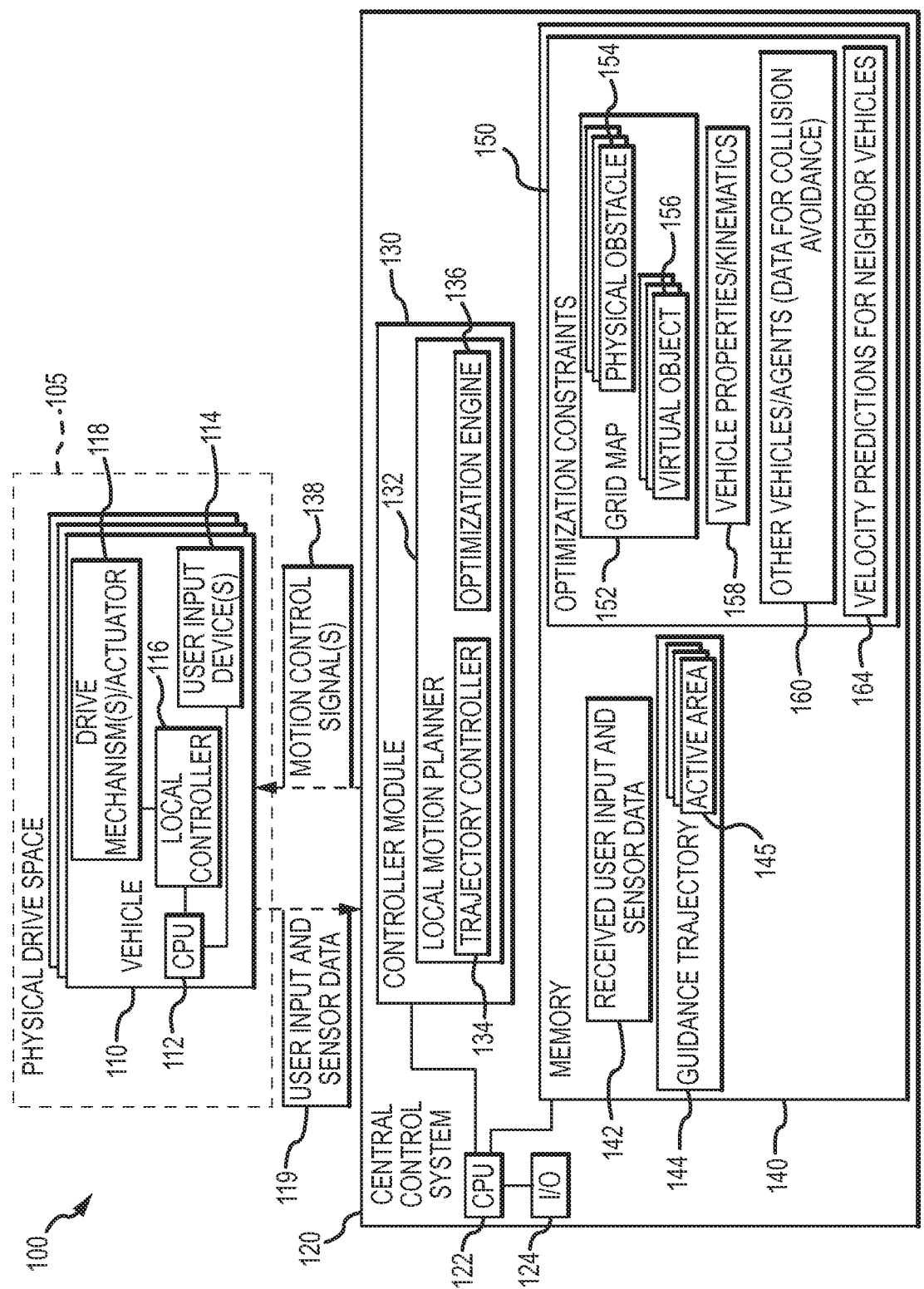
FIG. 1 is a functional block diagram of a shared control system for semi-autonomous vehicles as described herein.

FIG. 1 illustrates a shared control system 100 for use in controlling movement (velocity, direction, and the like) of semi-autonomous vehicles 110 within a physical drive space 105. For example, the physical drive space 105 may be areas of an amusement park ride where it is acceptable for an operator of one of the vehicles 110 to drive or the space 105 may be a volume of air space through which the vehicles 110 may fly when controlled (e.g., remotely in the case of a drone or multi-copter). The driver/operator (not shown) may be seated in or supported on the vehicle 110 or may be at a remote location (e.g., user input 114 may be a remote device communicating velocity inputs via wireless communications).

The vehicle 110 may include a processor 112 running a local controller 116 that controls operations of a drive mechanism(s)/actuator 118 to cause the vehicle 110 to move in a particular direction and velocity within the space 105. This control may be based on motion control signals 138 from a central control system 130 and also based on input from user input devices 114. For example, a driver/operator 114 may move a steering wheel and accelerator pad to cause the local controller 116 to operate the drive mechanism/actuator 118 within an active area defined/allowed by the motion control signal 138 from central control system to avoid collision and to follow a schedule as the vehicle 110 moves along a guidance trajectory 144. The user input device 114 may also take the form of a joystick that can be manipulated by the driver/operator of vehicle 110.

The local controller 116 and/or other components on the vehicle 110 may operate to transmit (wirelessly in most cases) user input data 119 in response to operations of the user input device(s) 114 by the driver/operator, and the user input data 119 typically will include a user-preferred velocity (e.g., direction and speed for the vehicle 110 in drive space 105). The communicated data 119 may also include sensor or tracking system data that is useful for determining the present location of other/neighbor vehicles 110 in the space and, in some cases, their present velocity, both of which can be used by the control system 120 in controlling the vehicle 110 via motion control signals 138 to avoid collisions among the vehicles 110 in the space 105.

The system 100 further includes a central control system 120 that may take the form of a computer or computer-based system specially configured to control the vehicles 110 via motion control signals 138. Particularly, the control system 120 includes one or more processors 122 managing operations of input/output (I/O) devices such as a monitor, a keyboard, a mouse, a touchpad, a touchscreen, and the like for receiving input from an operator and for displaying data (such as displaying present locations of vehicles 110 in space 105 and the like). The processor 122 also runs or executes code in a computer readable medium to provide a controller module 130, which provides all or a large portion of the shared motion control described herein. The controller module 130 may include a local motion planner 132 to generate the motion control signals 138, and, to this end, the local motion planner 132 may include a trajectory controller 134 along with an optimization engine 136 whose functions and design are described in detail below.

The processor 122 manages one or data storages devices or memory 140 to store (at least temporarily) data used by the controller module 130 to provide the shared control of the vehicles 110. As shown, for example, the memory 140 may be used to store received user input and sensor data 142 from the vehicle 110. Further, the memory 140 may store a guidance trajectory 144 defined by the controller module 130 for controlling the vehicle 110 including defining active areas 145 within the drive space 105 in which the vehicle 110 may be driven by an operator/driver while following a ride path or other planned trajectory. The memory 140 also stores a number of optimization constraints 150 that are used by the optimization engine 136. The constraints 150 may include a grid map 152 that maps physical obstacles 154 and, in some embodiments, virtual objects 156 (e.g., displayed 2D or 3D images of objects projected into space 105 or displayed to within or nearby the vehicle 110 to appear to be in the space 105) to locations or positions within the drive space 105. The controller module 130 may search the grid map 152 based on a present location of the vehicle 110 to generate a motion control signal 138 that avoids collision with obstacles.

Additionally, the memory 140 may be used to store vehicle properties and/or kinematics 158 for the vehicle 110 that can be used to determine the motion control signal 138 (e.g., an acceptable local trajectory for a next control cycle or at a present time). Other constraints 150 may include data on other vehicles/agents 160 that may be used to avoid collisions and may be determined from sensor data 119 from the vehicle 110 or from an external tracking system (not shown) operating to determine present locations of each of the vehicles 110 in the drive space 105. The optimization constraints 150 may include velocity predictions 164 for other or neighbor vehicles 110 that may be nearby to the vehicle 110 ("ego vehicle") in the drive space 105. This information can be used by the optimization engine 136 to control the vehicle 110 via signals 138 so as to avoid collisions with other flying or airborne vehicles 110 in the 3D space 105.

With the system 100 understood and in mind, it may be useful to provide an overview of the shared control method that may be provided by operation of the system 100 and similar systems. Then, the description can proceed with explanation of a useful vehicle model and control, an exemplary guidance trajectory, a shared control technique, local motion planning, algorithms for implementing the methods taught herein, and experimental results.

Consider a group of n vehicles of which m are controlled, either in a distributed or centralized way. The position, velocity, and acceleration of a robot, i, are denoted by $p_i \in \mathbb{R}^2$, $v_i = \dot{p}_i$, and $a_i = \ddot{p}_i$ respectively. A disk, $D(p,r)$, of radius $r_i$ centered at $p_i$ defines its enveloping shape. The enlarged obstacle map is given by a static grid map $O_r$ of the positions p where a disk $D(p,r)$ is in collision with a static obstacle.

The driver/operator of the vehicle (or robot) commands the vehicle through the vehicle's user input devices by specifying a desired velocity. A guidance trajectory along with or together with active areas (i.e., areas (or spaces) where the vehicle is allowed to drive (or fly)) can be specified to: (1) guide the motion of the vehicle; (2) limit its movements; (3) guarantee that the vehicle has a certain performance even in the case where the driver does not specify a velocity; and (4) control the throughput of vehicles throughout a drive space or ride area. In brief, the desired velocity and the guidance trajectory (two inputs to the controller module) are combined and a local trajectory is computed (which is used to generate motion control signals, e.g., after optimization, for the vehicle's drive mechanism/actuator).

Figure 2:
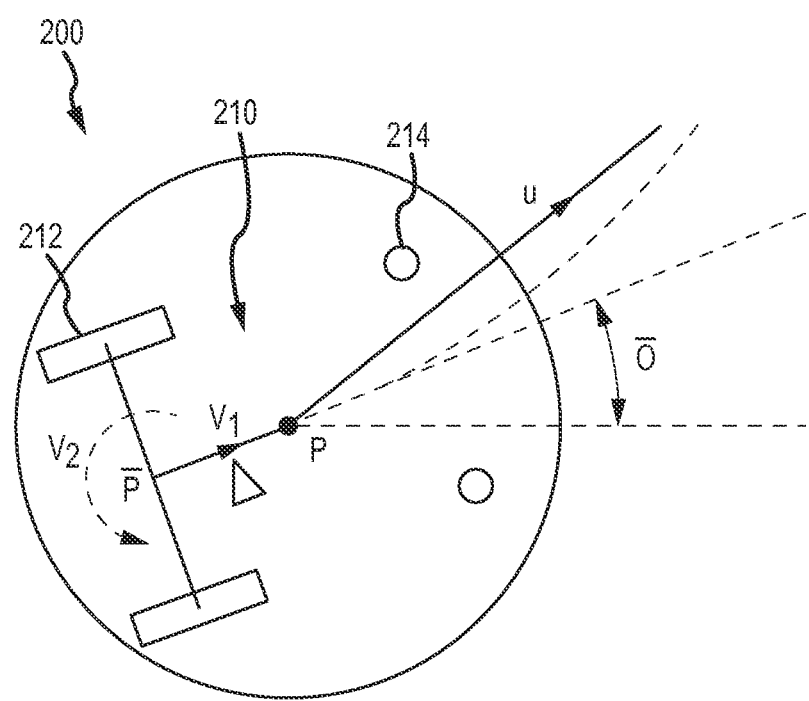
FIG. 2 illustrates a graph of a wheelchair used as the semi-autonomous vehicle in several experiments implementing a shared control system such as that shown in FIG. 1.

For each vehicle, the set of local trajectories is given by a controller (of sufficient continuity, $C^2$, in this description) towards a straight-line reference trajectory at velocity $u \in \mathbb{R}^2$ (see FIG. 2). This provides a low dimensional parameterization (given by u) of the local motions and allows for an efficient optimization in reference velocity space to achieve collision-free motions that respect the dynamic constraints of the vehicle. In each time step of the local planner, the motion is obtained by computing an optimal reference velocity, $u^*$, such that its associated trajectory is collision free, satisfies the motion and guidance constraints, and minimizes the distance to a preferred velocity, $\bar{u}$. The preferred velocity takes into account the driver input, a guidance trajectory, and the neighboring obstacles.

Throughout this description, x denotes scalars, x vectors, $x = \|\mathbf{x}\|$ its Euclidean norm, X matrices, $\mathcal{X}$ sets, and $X \oplus y$ their Minkowski sum. The super index $*^k$ indicates the value at time $t^k$ and subindex $*_i$ indicates agent i and $x_{ij} = x_i - x_j$ relative vectors. Time relative to the current time step is employed when appropriate and denoted by $\tilde{t} = t - t^k$. In practice, estimated states are used, but, to simplify the notation, no distinction is made herein between estimated and real states.

Turning now to a vehicle model and control, given a reference trajectory at constant velocity $p_{ref}(t)=p^k+ut$ for $t\in[0,\infty)$, with $p^k$ being the position of i at the current time-step k and u being the reference velocity, one can consider a trajectory tracking controller $f(z^k,u,t)=p(t)$ that is continuous in the initial state, $z^k=[p^k,\dot{p}^k,\ddot{p}^k,\ldots]$ of the agent and that is converging to the reference trajectory. The set of feasible motions is given by:

$$\mathcal{R}(z^k)=\{u\in\mathbb{R}^2, \text{ such that the trajectory } f(z^k,u,t) \text{ respects all dynamic restraints}\} \quad \text{Eq. (1)}$$

This set can be pre-computed by forward simulation and depends on $\dot{p}^k$ and $\ddot{p}^k$. A trajectory controller appropriate for the vehicle kinematics can then be formulated.

With regard to such a trajectory controller, and recalling the methods herein described are independent of the chosen controller, one such example is as follows. If the system is modeled as the second order integrator (continuity in acceleration) and the appropriate state feedback control low towards the reference trajectory is formulated, the trajectory $f(z^k,u,t)$ is given (for $\bar{t}<0$) by:

$$p(t)=p^k+u\bar{t}+((\dot{p}^k-u+(w_1-w_0)F)\bar{t}-F)e^{-w_0\bar{t}}+Fe^{-w_1\bar{t}} \quad \text{Eq. (2)}$$

with $F=(\ddot{p}^k+2w_0(\dot{p}^k-v_\infty))/(w_0-w_1)^2$ and $w_0$ and $w_1$ being design parameters related to the decay of the initial velocity and acceleration. Saturation limits are added, e.g., maximum linear and angular speed ($|v_1|\leq v_{1,max}$, $|v_2|\leq v_{2,max}$) and maximum linear and angular accelerations ($|\dot{v}_1|\leq \dot{v}_{1,max}$, $|\dot{v}_2|\leq \dot{v}_{2,max}$).

Turning now to kinematics of the vehicle, the inventors employed wheelchairs for the semi-autonomous vehicles that can have shared control. With regard to wheelchair (vehicle, in this example) kinematics, the unicycle model is used, with $\bar{p}$ the point in-between both tractor wheels, $\delta$ the orientation of the vehicle, and $v_1$, $v_2$ the linear and angular speed of the platform. The graph 200 of FIG. 2, which shows the wheelchair/vehicle 210 with its two rear driving wheels 212 and to front castor wheels 214 and which shows a reference trajectory given by u and an executed trajectory, and the kinematics can be stated as:

$$[\bar{p},\dot{\delta}]'=[\cos\delta, \sin\delta, 0]'v_1+[0,0,1]'v_2 \quad \text{Eq. (3)}$$

A (fully controllable or holonomic) point $p=\bar{p}+[\cos\delta, \sin\delta]^T\Delta$ to the front of the vehicle axles can then be considered, where $\Delta>0$ defines the maneuverability of the vehicle. The following relations hold:

$$\dot{p}=\xi, v_1=\xi\cdot[\cos\delta, \sin\delta]^T, v_2=\xi\cdot[-\sin\delta, \cos\delta]^T/\Delta \quad \text{Eq. (4)}$$

The local trajectory is applied at this point, and a circle of radius r is considered as the enveloping shape of the vehicle.

Figure 3:
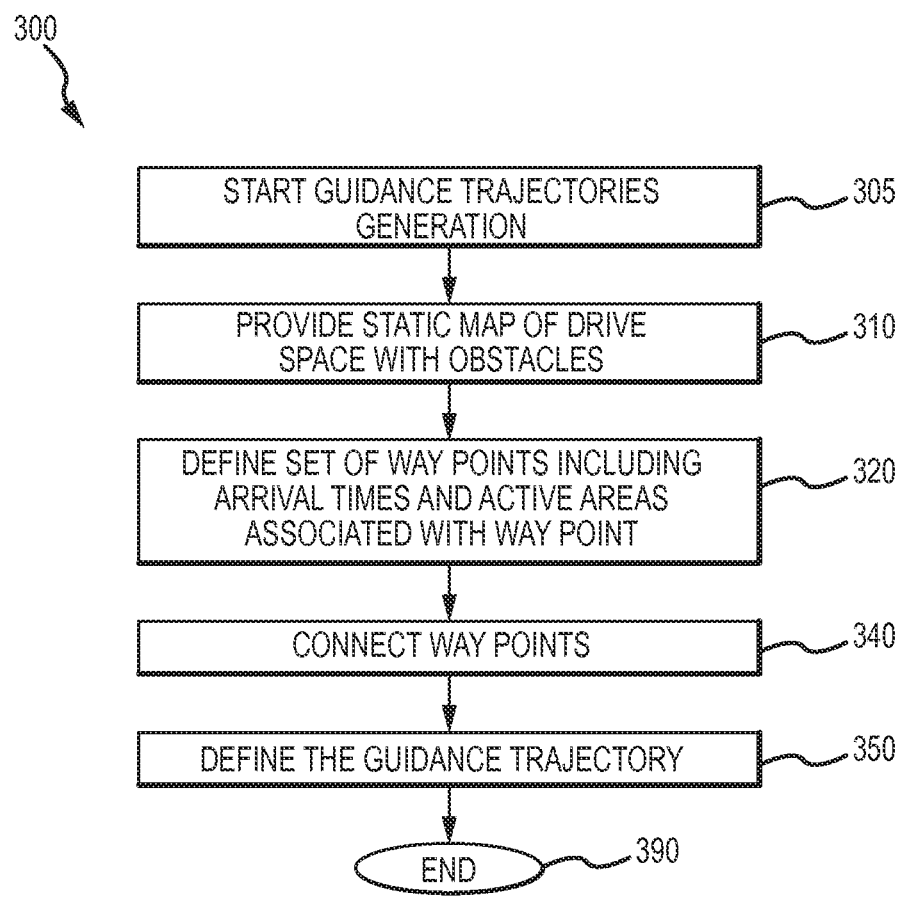
FIG. 3 illustrates a flow diagram of a method of generating a guidance trajectories in a grid map of a drive space for vehicles.

With regard to use of a guidance trajectory, it may be desirable for some applications of shared control to have higher control over the motion of the vehicles. In these cases, a roadmap or set of guidance trajectories can be created. A method 300 of creating a roadmap or set of guidance trajectories is shown in FIG. 3. The method 300 starts at step 305 such as with selecting a drive area or space in which a vehicle is allowed to move under driver control/input such as with regard to direction and speed. The method 300 continues at 310 by providing a static map of the selected drive space that includes locations, shapes, and sizes of obstacles. The roadmap may be computed automatically or be created via waypoints connected by straight lines as shown in FIG. 3. This representation does not require one to account for the dynamics of the vehicle nor to perfectly fit the map since both of these constraints or parameters are considered by the local motion planner.

At step 320, a set of waypoints is specified, and, for each waypoint, an arrival time, $T_i$, (or, alternatively, a speed over the segment) and an active area (where the vehicle is allowed to freely move) of a predefined radius, $\rho_i$, around the waypoint is provided. At 340, the method 300 continues with connecting consecutive waypoints. Then, at 350, the method 300 involves generating or defining the guidance trajectory along with the active area around it (e.g., by interpolation or the like). The method 300 then ends at 390. In practice, when two or more active areas (e.g., from different trajectories) intersect, the vehicle can be assigned to an active area depending on its current position and specified attributes of the guidance trajectories, such as if more than one vehicle can follow that trajectory or if the vehicle must stay in the current one.

In the method 300, one can select the trajectory, s, that minimizes the weighted distance to the current point on the guidance trajectory, $q^s$, relative to the current radius of the active area, $\rho^s$:

$$\arg_s^{min}(1-\sigma^s)\|p-q^s\|/\rho^s \quad \text{Eq. (5)}$$

where $\sigma^s\in(0,1)$ is an attribute indicating the predilection to stay in one trajectory. This framework provides an intuitive way to guide a team of vehicles throughout the drive space while giving the vehicles and their drivers/operators limited freedom in their movement via the active areas. An active area with a large radius, $\rho$, implies greater freedom of movement for the vehicle while an active area with a small radius, $\rho$, imposes less freedom and accurate tracking of the vehicle along and within the guidance trajectory.

Figure 4:
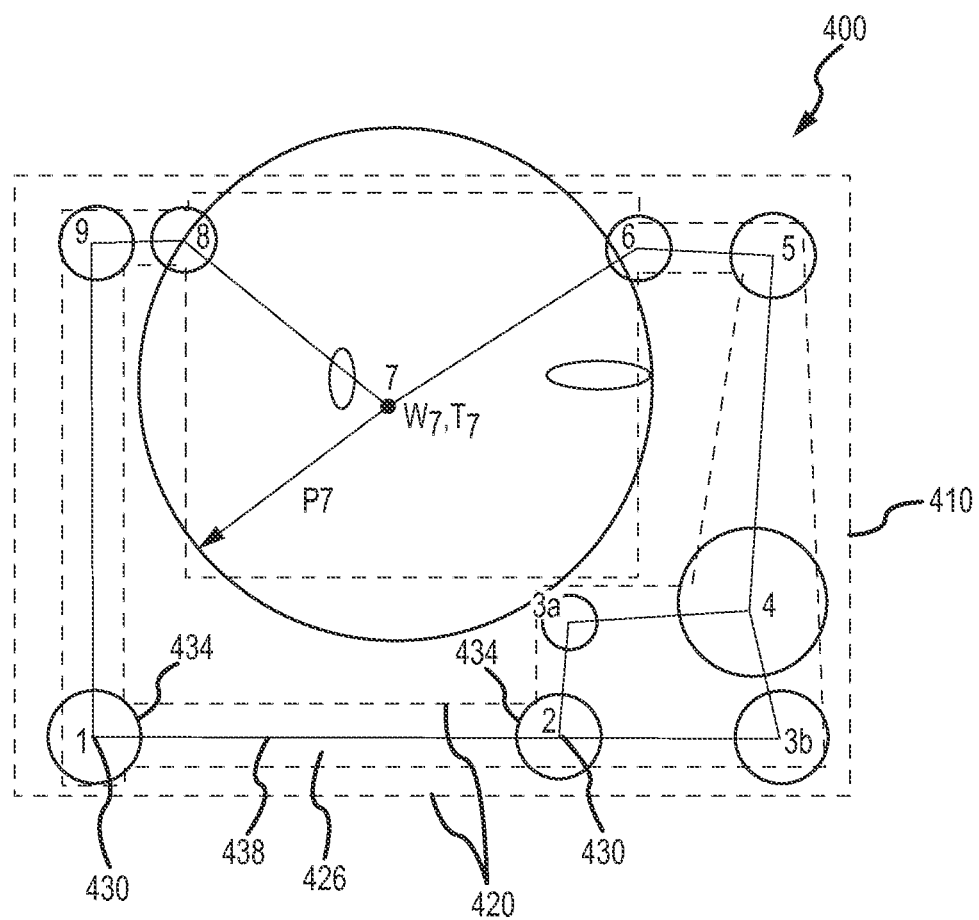
FIG. 4 illustrates a roadmap or grid map with guidance trajectories defined by a combination of interconnected waypoints and their associated active areas.

FIG. 4 illustrates a grid map 400 of a drive space 410 that may be generated with the method 300 of FIG. 3. The drive space 410 includes several rooms and corridors with these available spaces/areas for driving shown at 426 (with lighter or no shading) and occupied spaces or physical/virtual objects shown at 420 (with darker shading). In this example, nine waypoints, $w_i$, are created as shown with exemplary waypoints 430 with arrival times, $T_i$, and a number of different radii, $\rho_i$, for their associated active areas 434. The waypoints 430 are connected by straight lines as shown at 438, and, in between waypoints, the ideal trajectory and active area is given by interpolation. In the grid map 400 with the guidance trajectories and active areas, waypoints 3a and 3b represent a bifurcation and waypoint 7 has a large active area where the vehicles are allowed to freely drive.

Figure 5:
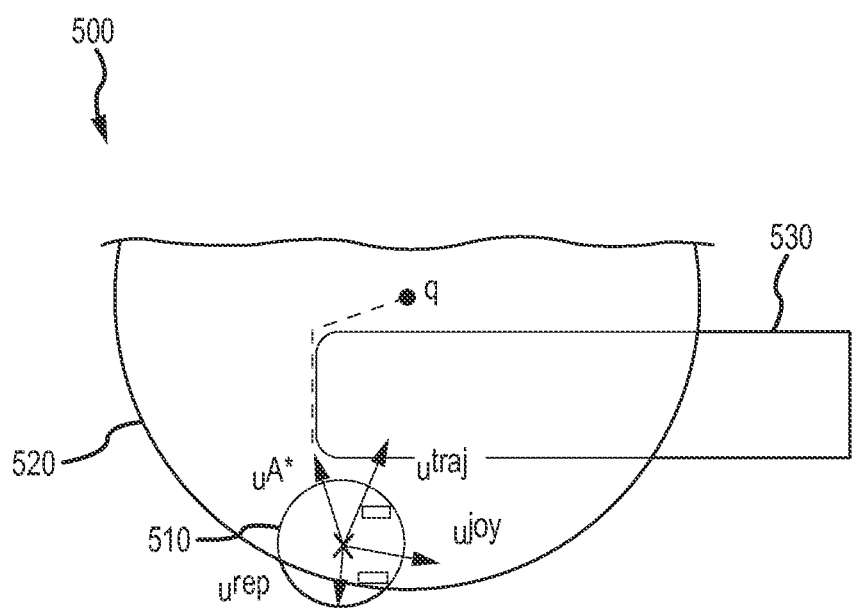
FIG. 5 illustrates a graph showing use of the shared control method to control movement of a semi-autonomous vehicle within a drive space relative to an obstacle to avoid collision.

Now, with regard to shared control, in each time step, for each vehicle i, a preferred velocity $\bar{u}_i$ is computed, based on the input from the driver, the guidance trajectory, and the neighboring obstacles as follows:

$$\bar{u}_i=\mu_1(\mu_2 u_i^{joy}+u_i^{traj})+(1-\mu_1)u_i^{A*}+u_i^{rep} \quad \text{Eq. (6)}$$

where $\mu_2=1$ if the vehicle is inside the active area and $\mu_2=0$ otherwise, and $\mu_1=1$ if q is in line of sight of the vehicle and $\mu_1=0$ otherwise (see FIG. 5). In practice, a small hysteresis is introduced to $\mu_1$ and $\mu_2$ to avoid oscillations. In normal operations, $\mu_1=\mu_2=1$. Each velocity term is computed as follows. The input velocity $u_i^{joy}$ is proportional to the joystick position (in relative frame of the vehicle). The guidance velocity $u_i^{traj}$ (optional term) is given by a proportional controller to the guidance trajectory as:

$$u_i^{traj}=K_p(q_i-p_i)+\dot{q}_i \quad \text{Eq. (7)}$$

where $q_i$ is the ideal position on the guidance trajectory at the current time. The repulsive velocity $u_i^{rep}$ is computed with a potential field approach that pushes the vehicle away from both static and dynamic obstacles. A linear function weighting the distance to other vehicles is used as follows:

$$u_i^{rep} = Vr\frac{\overline{D} - d(p_i, O)}{\overline{D}} n_{i,O} + \sum_{j|p_{ij}<D} Vr\frac{D - p_{ij}}{D - r_i - r_j}\frac{p_{ij}}{p_{ij}} \quad \text{Eq. (8)}$$

where $V_r$ is the maximum repulsive velocity, $D$ and $\overline{D}$ are the maximum distance from which a repulsive force is added, $d(p_i,O)$ is the distance to the closest static obstacle within the $O_{rj}$ map, and $n_{i,O}$ is the normal vector from it. In order to avoid corner issues, not only the closest point is considered but also an average over the closest points. The norm of $u_i^{rep}$ is then limited to $\|u_i^{rep}\| \leq V_r$.

In cases where the guidance point, $q_i$, is not in direct line of view from the current position, $p_i$, a preferred velocity solely based on the previous terms could be prone to deadlocks. To avoid this, a term, $u_i^{A*}$, computed from a global path from $p_i$ to $q_i$ taking into account the map $O_r$, but ignoring the kinematic constraints and other vehicles may be added. This term is given by the first control input of a standard A* search in the grid map.

FIG. 5 illustrates a graph 500 representing implementation of such shared control. Components of the preferred reference velocity are shown for a vehicle 510 within the active area 520 of the current point, q, on the ideal trajectory within the drive space. An obstacle 530 is shown in the graph with the shared control functioning to avoid collision with the obstacle.

With regard to local motion planning, in each control loop, given the preferred velocity, $\overline{u}_i$, of the ego vehicle and the current position and velocity of neighboring vehicles, a local trajectory is given by an optimal reference velocity, $u^*_i$, is computed by solving an optimization problem in reference velocity space. The optimization problem may be formulated as a combination of a convex optimization with quadratic cost and linear and quadratic constraints and a non-convex optimization.

Two alternative formulations are presented: (1) a centralized optimization where the optimal reference velocities of all vehicles, $u^*_{1:m} = [u^*_1, \ldots, u^*_m]$, are jointly computed and (2) a distributed optimization where each vehicle, i, independently solves an optimization where its optimal reference velocity, $u^*_i$, is computed. The position $p_j$ and velocity $v_j$ of neighboring agents is known. The optimization cost is given in two parts. The first one is a regularizing term penalizing changes in velocity, and the second one minimizing the deviation to the preferred reference velocity. For the centralized cast the cost may be provided as:

$$C(u_{1:m}) := K_o \|u_{1:m} - v_{1:m}\|^2 + \|u_{1:m} - \overline{u}_{1:m}\|^2 \quad \text{Eq. (9)}$$

where $K_o$ is a design constant. For the distributed case, the cost may be provided as:

$$C(u_i) := K_o \|u_i - v_i\|^2 + \|u_i - \overline{u}_i\|^2 \quad \text{Eq. (10)}$$

The kinematic constraints of the vehicle are included where the vehicle's radius is enlarged by a value $\in > 0$ and the local trajectories are limited to those with a tracking error below $\in$ with respect to the reference trajectory (parameterized by u).

Figure 6:
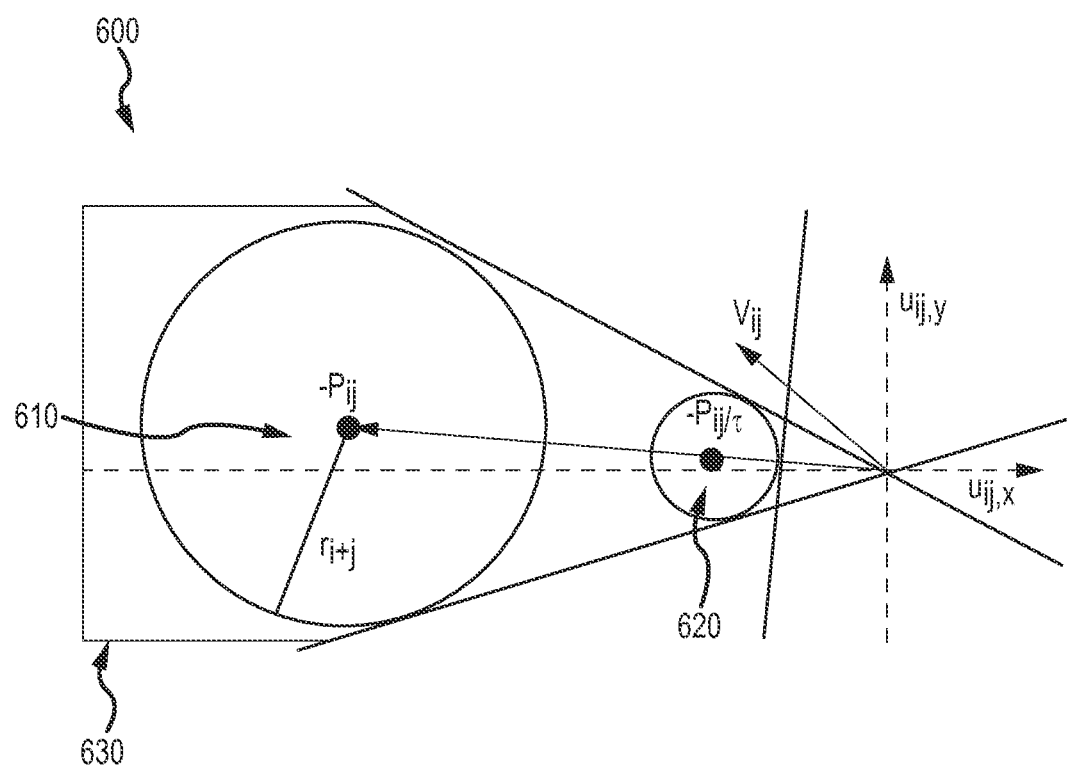
FIG. 6 illustrates a graph showing implementation of an avoidance constraint to avoid collision between two neighboring vehicles.

With regard to a first constraint ("Constraint 1") concerning avoidance of other agents, for every pair of neighboring agents i≤m and j≤n, the constraint is given by the reference velocities such that $\|p_i - p_j + (u_i - u_j)t\| \geq r_{i+j} = r_i + \in_i + r_j + \in_j$, for all $t \in [0, \tau]$. This constraint can be rewritten as $u_i - u_j \notin VO_{ij}^\tau = \cup_{t=0}^\tau ((D(p_j, r_j + \in_j) \oplus D(p_i, r_i + \in_i/t)$ representing a truncated cone. For example, FIG. 6 illustrates with graph 600 the implementation of the constraint of avoidance of other vehicles or agents. This constraint is shown as area 630 for avoidance between two vehicles 610 and 620, and vehicle avoidance constraint is approximated by three linear constraints as shown in the graph 600. This constraint can then be computed if the distance between the two agents is below a threshold ($p_{ij} < K_d$). The non-convex constraint $\mathbb{R}^2 \backslash VO_{ij}^\tau$ is approximated by three linear constraints of the form $n_{ij}^{l} \cdot u_{ij} - b_{ij}^l$ as:

$$\begin{bmatrix} \cos(\gamma^+) \\ \sin(\gamma^+) \end{bmatrix} u_{ij} \leq 0, \quad \text{Eq. (11)}$$

$$-\frac{p_{ij}}{p_{ij}} \cdot u_{ij} \leq \frac{p_{ij} - r_{i+j}}{\tau}, \quad \begin{bmatrix} \cos(\gamma^-) \\ \sin(\gamma^-) \end{bmatrix} u_{ij} \leq 0$$

where $\gamma^+ = \alpha + \beta$, $\gamma^- = \alpha - \beta$, $\alpha = a \tan 2(-p_{ij})$ and $\beta = a \cos(r_{i+j}/p_{ij})$. The first and last constraints represent avoidance to the right and to the left, and the middle one a head-on maneuver (collision-free up to $t = \tau$). The linearization of $\mathbb{R}^2 \backslash VO_{ij}^\tau$ is obtained by selecting the linear constraint with maximum constraint satisfaction for the current relative velocity ($\min_l (n_{ij}^l v_{ij} - b_{ij}^l)$). Other sensible choices include linearization with respect to the preferred velocity $\overline{u}_{ij}$ or fixed avoidance side (right/left). For j≤m, this linear constraint is added to the centralized optimization. For j>m (dynamic obstacles) or when distributed, it can be rewritten as follows.

In the distributed case, all agents are considered as independent decision-making agents solving their independent optimizations. To globally maintain the constraint satisfaction and avoid collisions, an assumption on agent j's reference velocity should be determined. Variable sharing of avoidance effort might be considered with $\Delta v_i = \lambda \Delta v_{ij}$ and the assumption that $\Delta v_j = -(1 - \lambda) \Delta v_{ij}$. For collaborative agents that equally share the avoidance effort, $\lambda = 0.5$. If it is considered that agent j ignores agent i and continues with its current velocity, then $\lambda = 1$ and full avoidance is performed by agent i. For $\lambda \in [0, 1]$, the constraint is given by:

$$n_{ij}^l \cdot u_{ij} = \frac{n_{ij}^l}{\lambda} \cdot (u_i - (1 - \lambda)v_i - \lambda v_i) \leq b_{ij}^l \quad \text{Eq. (12)}$$

With regard to a second constraint ("Constraint 2") concerning active areas, this constraint guarantees that the agent locally remains within the active area. For agent i≤m, the constraint is given by $\|p_i - q_i + (u_i + \dot{q}_i)\tau\|^2 \leq \rho_i^2$ with $q_i$ being the point on the guidance trajectory for the current time, $\dot{q}_i$ being speed, and $\rho_i$ the radius of its associated active area (by interpolation between the previous and next waypoint). With the constant velocity assumption for the guidance trajectory, if the vehicle is initially within the active area, this constraint guarantees that the vehicle remains inside for time t≤τ. If the vehicle is initially outside, the constraint guarantees that the vehicle enters within time τ. The constraint can be written as:

$$u_i^T u_i + 2\left(\frac{p_i - q_i}{\tau} - \dot{q}_i\right)^T u_i + \left\|\left(\frac{p_i - q_i}{\tau} - \dot{q}_i\right)\right\|^2 \leq \frac{\rho_i^2}{\tau^2} \quad \text{Eq. (13)}$$

This is a quadratic constant (circle in reference velocity space) that is ignored if no active areas are given.

With regard to a third constraint ("Constraint 3") concerning avoidance of static obstacles, for agent i≤m, the constraint is given by the reference velocities such that the new positions are not in collision with the enlarged obstacle map, $p_i + u_i t \notin$ $O_{r_j+\in_j}$, for all $t\in[0,\tau]$. This constraint is kept in its grid-based form (obstacles in FIG. 3) to allow the vehicle full navigation capability including being able to move close to the static obstacles and to go inside and/or through small openings. Given a known map, $O_0$, the enlarged map, $O_{r_j+\in_j}$, can be precomputed for several values of $\in_j$.

With regard to a fourth constraint ("Constraint 4") concerning dynamic restrictions, each agent should remain within $\in_i$ of its reference trajectory. For a maximum tracking error, $\in_i$, and a current state, $z_i=[p_i,\dot{p}_i,\ddot{p}_i]$, the set of reference velocities, $u_i$, that can be achieved with position error below $\in_i$ is given by $R_i := R(z_i,\in_i)$ such that:

$$R_i := \{u_i \in \mathcal{R}(z_i) | \|(p_i+tu_i) - f(z_i,u_i,t)\| \le \in_i, \forall t > 0\} \quad \text{Eq. (14)}$$

If the trajectory controller defined in part by Eq. (2) is used, the set of reachable reference velocities, $R_i$, depends on $\dot{p}_i$, $\ddot{p}_i$, and $\in_i$. A mapping, $\gamma$, from initial state, $\dot{p}$, $\ddot{p}$, and the reference velocity, $u$, to a maximum tracking error is precomputed and stored in a look up table as:

$$\gamma(u, \dot{p}, \ddot{p}) = \max_{t>0} \|(p+tu) - f(z, u, t)\| \quad \text{Eq. (15)}$$

Figure 7:
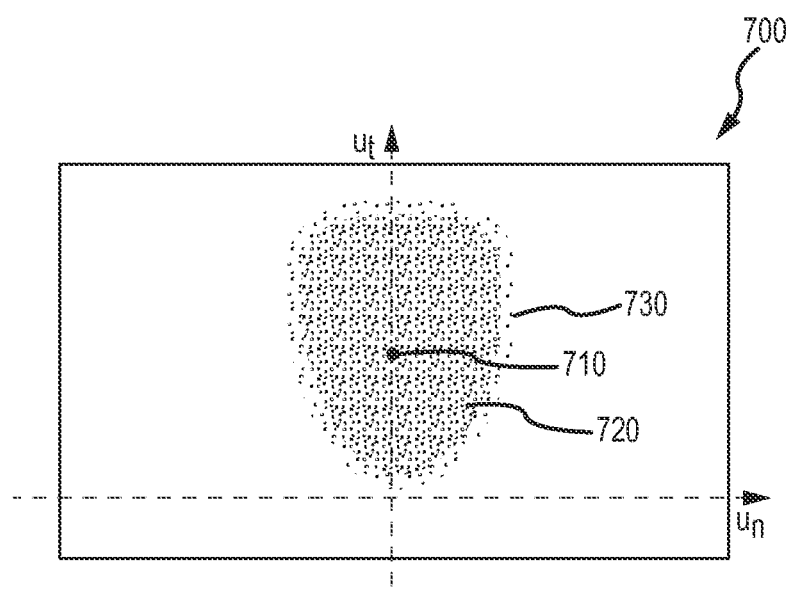
FIG. 7 illustrates a graph showing implementation of a dynamic restriction constraint as part of local motion planning for a vehicle under shared control.
Figure 8A:
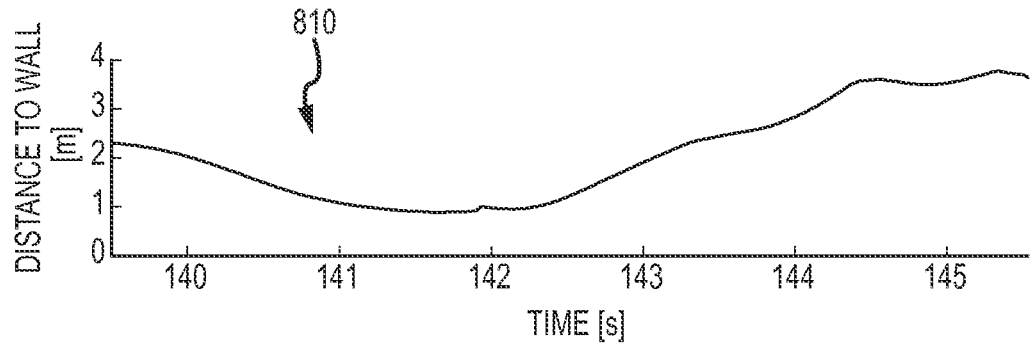
FIGS. 8A-8F illustrate graphs of two representative examples of distributed collision avoidance.
Figure 8B:
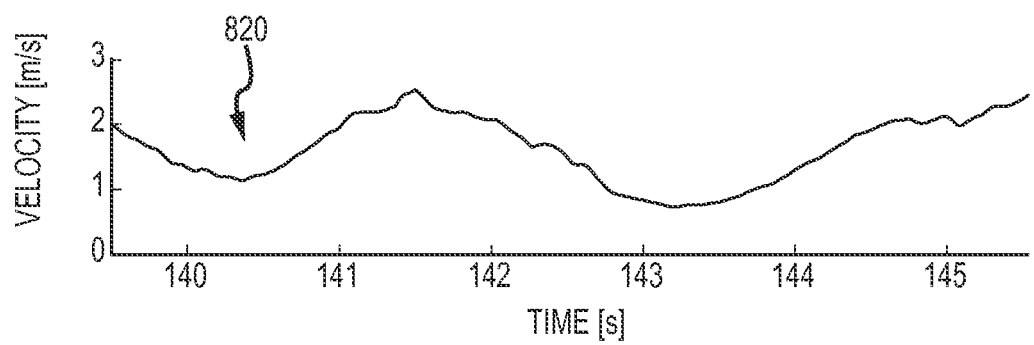
Figure 8C:
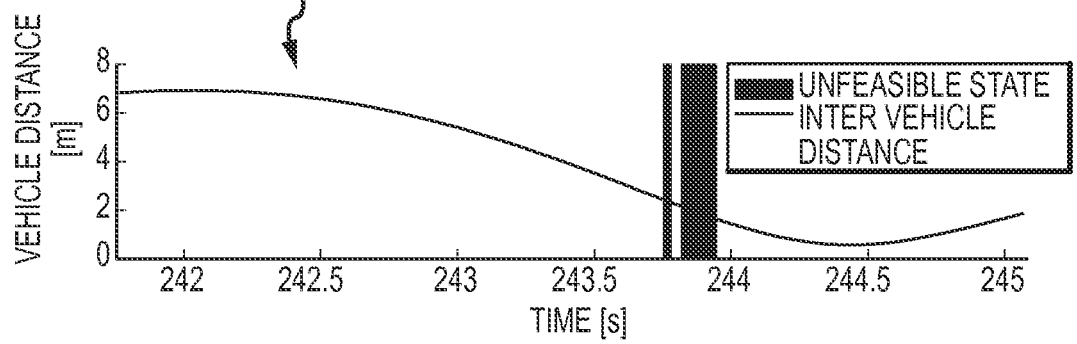
Figure 8D:
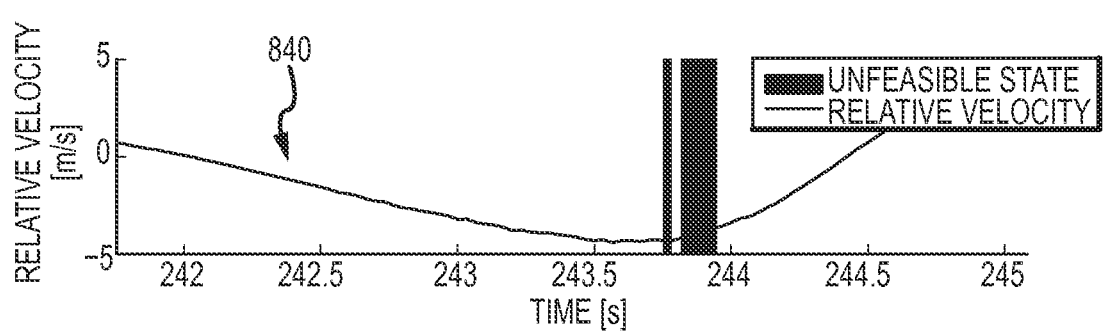
Figure 8E:
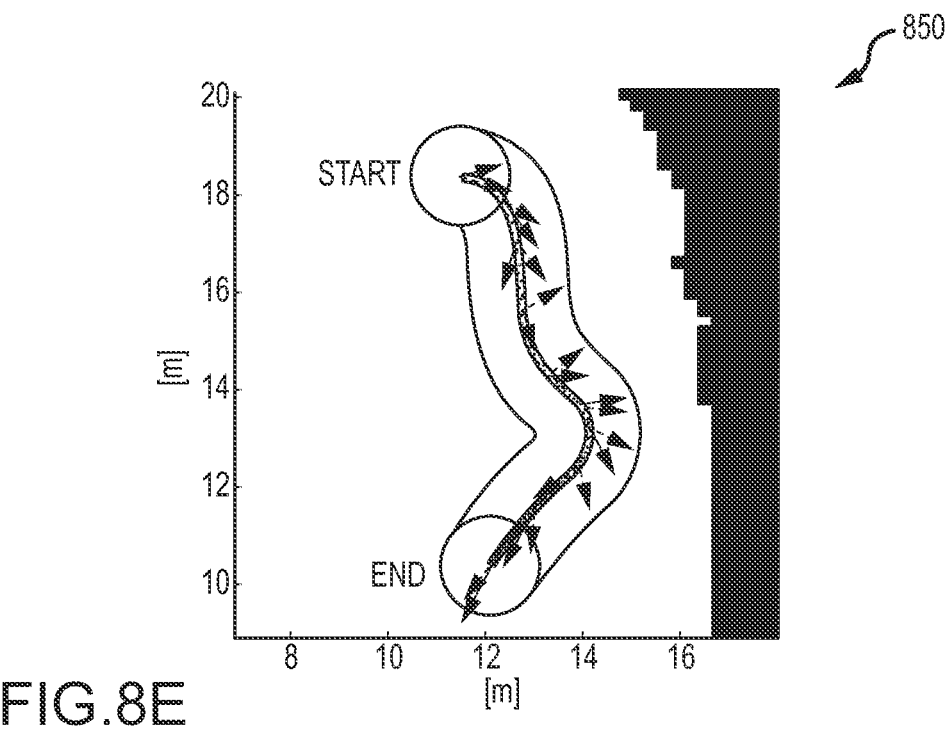
Figure 8F:
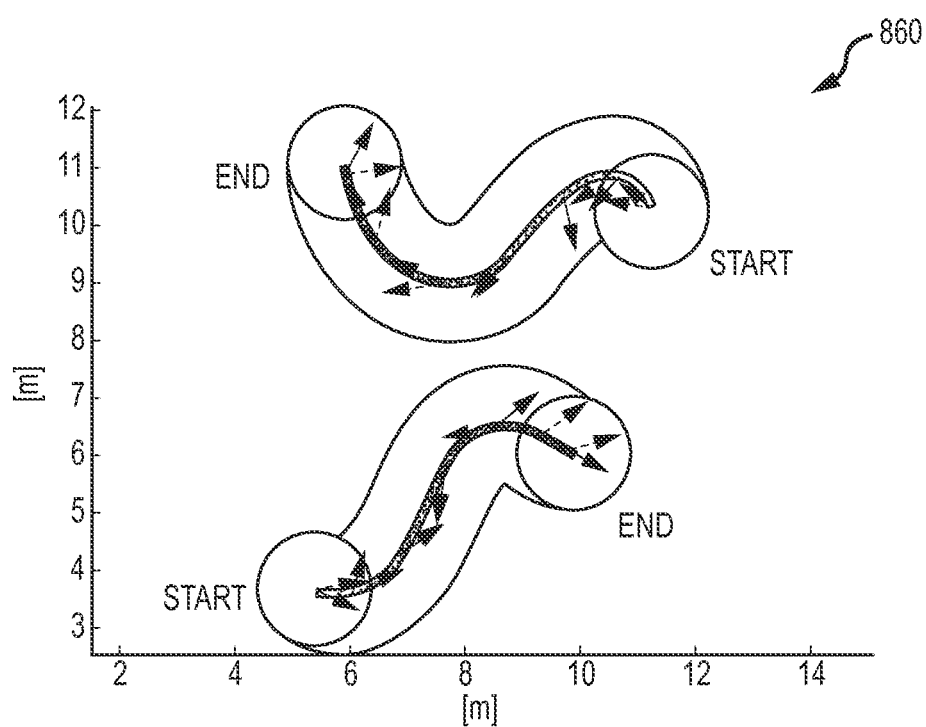
Figure 9A:
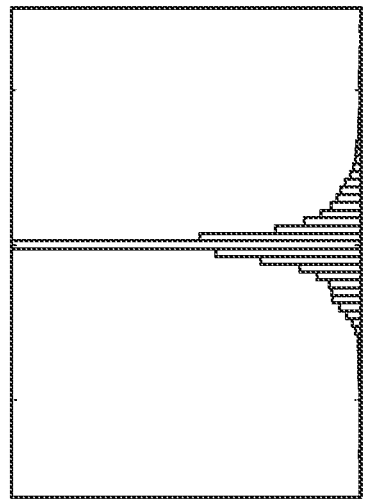
FIGS. 9A-9D illustrate histographs generated based on the shared control experimental results.
Figure 9B:
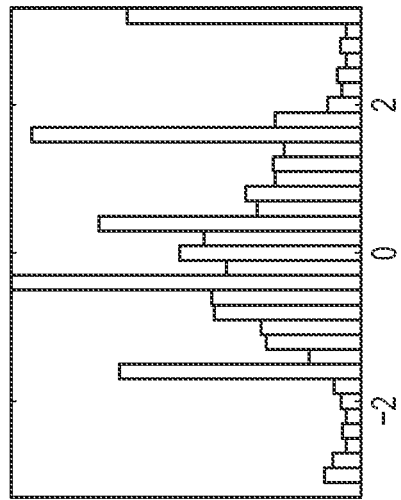
Figure 9C:
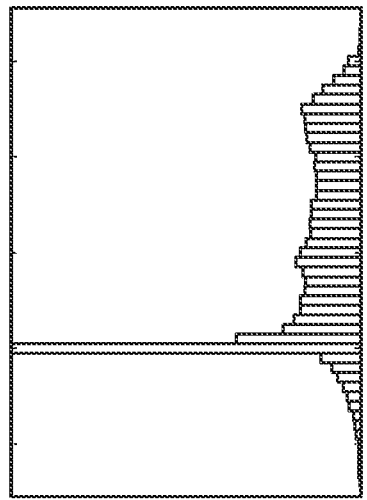
Figure 9D:
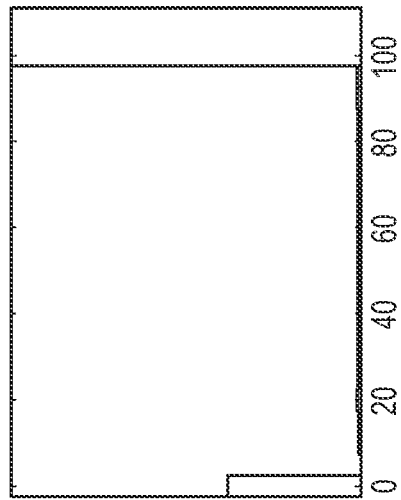

An example of this constraint is shown in FIG. 7. FIG. 7 illustrates with graph or plot 700 the implementation of the dynamic restrictions constrain with a trajectory controller. As shown, a vehicle may have a current velocity as shown at 710, and the areas 720 and 730 represent reachable reference velocities, $R_i$, for the representative current velocity 710. The plot/graph 700 is in reference velocity space aligned with the vehicle axis (e.g., tangential/normal), with forward velocities being displayed. A bounding box is given by four linear constraints of the form $H_l = \{u_i | A_l u_i \le b_l\}$ is computed such that $R(z_i,\in_i) \subset \cup_{l=1}^{4} H_l$. These linear constraints are included in both the centralized and decentralized optimizations to reduce the search space.

With regards to a useful optimization algorithm and guarantees, the optimization includes two types of constraints: (1) convex (linear and quadratic) and non-convex (grid-based). To efficiently find a solution, the optimization is divided into two parts. First, a convex subproblem is solved resulting in $u_i^c$, and, second, a search within the grid-based constraints is performed that is restricted to the convex area defined by the linear and quadratic constraints. The set of convex constraints (Constraints 1 and 2 and bounding box of Constraint 4) is denoted by C. The set of non-convex constraints (Constraints 3 and 4 for agent I, with respect to a grid of the same resolution) is denoted by $\tilde{C}_i$. For both the centralized (N=m) and the distributed (N=1, without loss of generality) optimizations, the algorithm may be stated as:

Input distributed: $z_1$, $\bar{u}_1$ and $r_1 + \in_1$; $p_j$, $\dot{p}_j$ and $r_j$ $\forall j$ neighbor of 1. Consider $\in_j = \in_1$.
Input centralized: $z_i$, $\bar{u}_i$ and $r_i + \in_i \forall i \le m$; $p_j$, $\dot{p}_j$ and $r_j$ $\forall j > m$ neighbor of $i \le m$.
Result: $u_{1:N}^* = [u_1^*, ..., u_N^*]$
Compute constraints (See Eq. (5))
$u_{1:N}^c \leftarrow$ solution 2N-dimensional convex optimization with quadratic cost (Eqs. (9)-(10)) and convex constraints C.
//Wave expansion from $u_{1:N}^c$ within convex area C.
Initialize shorted list L (increasing cost) with $u_{1:N}^c$
while L = Ø do
  $u_{1:N} \leftarrow$ first point in L; L := L\\$u_{1:N}$; feasible := 'true';
  for i = 1 to N do
    if feasibleDynamics($u_i$)='false' or feasibleMap($u_i$)='false'
    then L $\leftarrow$ expandNeighbors(L, $u_{1:N}$, i, 1);
      feasible := 'false'; break;
    end if
  end for
  if feasible = 'true' then return $u_{1:N}^* = u_{1:N}$ end if
end while; return 0.

Function feasibleDynamics($u_i$) checks in a precomputed grid if the tracking error is below $\in_i$ given the initial state of the vehicle:

if $u_i \in R_i$ (See Eq. 14) then return 'true'; else 'false'   Eq. (21)

Function feasibleMap(ui) checks if ui leads to a trajectory in collision with static obstacles given by the grid map O. This is efficiently checked in the precomputed dilated map, $O_{r_j+\in_j}$, (see Constraint 3):

if segment($p_i,p_i+u_i\tau$) $\cap O_{r_j+\in_j} = \emptyset$ then return 'true'   Eq. (22)

The function expandNeighbors adds the neighboring grid points if they are within the convex region defined by the convex constraints in C, and they were not previously explored. This algorithm is recursive for N>1, although only one level of recursion is used to reduce computational time at the expense of optimality:

Function L $\leftarrow$ expandNeighbors(L, $u_{1:N}^{in}$, k, rec);
for each 8-connected grid neighbor $u_k$ of $u_k^{in}$ do
  Consider $u_{1:N} = [u_1^{in}, ..., u_{k-1}^{in}, u_k, u_{k+1}^{in}, ..., u_N^{in}]$.
  if {$u_{1:N}$ not previously add to L} and
  {$u_k$ not checked as unfeasible w.r.t. constr. $\tilde{C}_i$} then
    if $u_{1:N}$ satisfies convex constraints C
      add $u_{1:N}$ to L
    else
      if {rec=1} and {∃ constr. type 1 unfeasible} then
        Select constr. which maximizes $n \cdot u_{1:N} - b > 0$.
        j := "index of second agent in the selected constraint"
        if j $\le$ N then L $\leftarrow$ expandNeighbors(L, $u_{1:N}$, j, 0)
end if; end if; end if; end for If the optimization is unfeasible, constraints 2 are removed and the optimization is recomputed. If still unfeasible, agents i$\le$N decelerate on their last feasible local trajectory following the time remap:

$$\gamma(t) = -t_f^2/(2\tau) + (1+t_f/\tau)t - t^2/(2\tau) \quad \text{Eq. (16)}$$

where $t_f$ is the time where the last feasible local motion was obtained. This reparameterization of the trajectories guarantees that the vehicles stop within the time horizon of the local planner, unless the optimization becomes feasible in a later time step.

With regard to computational complexity, with a limit in the number of linear constraints for collision avoidance, the complexity of the algorithm can be kept linear with the number of agents, although the centralized is of higher cost. If distributed, for each agent, the optimization is made up of two variables, one quadratic constraint, four linear constraints (bounding box of Constraint 5), a maximum of m linear constraints of Type 1 (in practice limited to a constant $K_c$) and a wave expansion within the 2D grid. If centralized, the optimization is made up of 2n variables, n quadratic constraints, less than $$4n + \frac{n(n-1)}{2} + n(m-n)$$

linear constraints (limited to $4n+nk_c$) and a joint wave expansion in n 2D grid maps.

With regard to safety guarantees, if feasible, the local trajectories are collision free up to time $\tau$, with the assumption that other vehicles follow the same algorithm or maintain constant velocity. If unfeasible, no collision-free solution exists that respects all the constraints. If the time horizon is longer than the required time to stop, safety is preserved if all vehicles drive their last feasible trajectory with a time reparameterization to reach stop before a collision arises:

$$\dot{\gamma}(t_f+\tau)=(1+t_f/\tau)-(t_f+\tau)/\tau=0 \qquad \text{Eq. (17)}$$

Note, though, that the optimization can be unfeasible due to several causes. First, there may not be enough time to find the solution within the allocated time. Second, there may be differences between the model vehicle and the real world vehicle. Third, there may be noise in localization and estimation of the vehicle's state. Fourth, optimization may be unfeasible due to the limited local planning horizon together with over simplification of motion capabilities by reducing them to the set of local motions. Fifth, if distributed, unfeasibility may be caused given the use of pair-wise partitions of velocity space with either the assumption of equal effort in the avoidance or constant speed. Hence, not all world constraints are taken into account for the neighboring agents/vehicles. As a result, a vehicle may have conflicting partitions with respect to different neighbors, static obstacles, and/or kinematics that render optimization unfeasible for this vehicle.

With regards to deadlock-free guarantees, for a single agent/vehicle, deadlock-free navigation is achieved in part due to the $u_A^*$ term in the optimization that drives the vehicle toward its goal position or guidance trajectory. In the multi-agent (or vehicle) scenario, deadlocks are still possible although in degenerated situations. Giving priority to those agents/vehicles further in their guidance trajectory can help resolve this situation, though. The input from the driver of the vehicle can also act as a deadlock-breaking input.

Turning to experimental results, the algorithms have been extensively tested in simulation with larger groups of robots/agents. Due to space limitations in the test setup, the analysis relied upon real wheelchairs for the vehicles with a driver (see FIG. 2). Each vehicle had an enclosing radius of 1 m, limits $v_{1,max}=3$ m/s, $v_{2,max}=2$ rad/s, $\dot{v}_{1,max}=2$ m/s$^2$, $\dot{v}_{2,max}=20$ rad/s$^2$, $\dot{v}_{1,min}=-1.1$ m/s$^2$, and a maximum sideways acceleration of 1.5 m/s$^2$. Vehicles were tracked by an overhead tracking system and controlled from a central computer at 30 Hz. Velocity commands from the driver were transmitted to the central computer at the same rate. Computations were performed using an i5 3 GHZ PC.

As part of the experiment with shared control, semi-autonomous driving was tested without a guidance trajectory and where each vehicle was driven by a human that inputted a desired velocity, $u^{joy}$. Over 50 hours of experiments showed that the algorithms described above are safe and collisions with walls and other obstacles as well as with other vehicles were avoided. FIGS. 8A-8F illustrate graphs 810, 820, 830, 840, 850, and 860 that show, respectively, examples of robot (or vehicle) and obstacle (or wall) collision avoidance, robot-to-robot (or vehicle-to-vehicle collision avoidance, distance velocity, relative velocity (negative when towards each other and with time-steps where the optimization was unfeasible are marked in gray in the background and where a zero distance indicates that two objects touch), and vehicle position (with the input velocity from the driver being displayed with dashed arrows and the safe vehicle command with solid arrows).

FIGS. 8A-8F show two representative examples of the distributed collision avoidance, where the driver-commanded velocity, $u^{joy}$, is shown with arrows in the graphs 850 and 860. In graph 850, safe and smooth velocity between 1 and 2.5 m/s was achieved in very close proximity to a wall when the driver was commanding the vehicle towards the wall. The vehicle slightly slows down as it gets closer to the wall (obstacle). In the graph 860, a frontal collision with another vehicle is avoided where a relative velocity of about 5 m/s in very close proximity (e.g., below 6 m) with a neighboring vehicle was handled. In this example, the optimization became unfeasible during 0.15 seconds, which was mostly due to lack of reactiveness in the low level controller and unmodeled dynamics that slowed the vehicle. This renders the algorithm feasible in subsequent time steps.

FIGS. 9A-9D show four histograms 910, 920, 930, and 940 over the shared control experiments Linear and angular velocities are shown with histograms 910 and 920 while histograms 930 and 940 show input velocity from the driver relative to the vehicle. From these histograms, it can be seen that even if the velocity input by the driver seems to follow a bang-bang control of zero (e.g., maximum velocity as seen in histogram 930 of FIG. 9C), the algorithm adapts the velocity of the vehicle in the range of $-1$ to 3 m/s to remain safe (see, for example, FIG. 9A and histogram 910). The driver stops at some times as can be seen from the experiment results. The angular velocity is smooth and within the limits (see, for example, FIG. 9B and histogram 920), while the orientation of the desired velocity (see FIG. 9B in vehicle reference frame) is mostly centered in the forward direction and presents clear peaks at 0, +90, and 180 degrees.

Figures 10A, 10B:
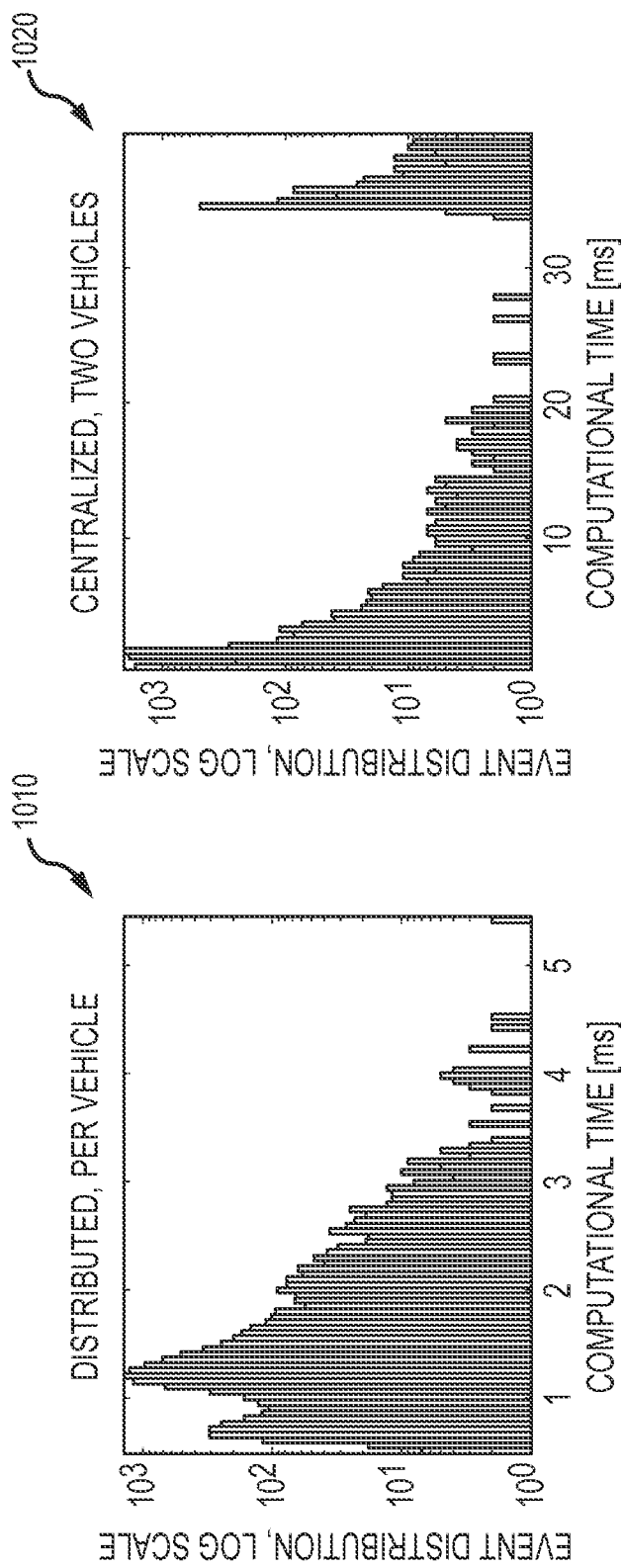
FIGS. 10A and 10B illustrate histograms of computational times for a collision avoidance algorithm for the distributed and centralized cases.

FIGS. 10A and 10B shows histograms 1010 and 1020 (distributed and centralized, respectively) in log scale of the computational time of the collision avoidance algorithm. If no solution is found in 35 ms in this experiment, the algorithm was configured to return unfeasible for that time step. FIGS. 10A and 10B show, in log scale to emphasize the infrequent worst cases, statistics of the computational time for the collision avoidance optimization. For the distributed algorithm as shown in histogram 1010 (per vehicle), a solution is usually found in less than about 1.5 ms. Higher times, e.g., below 6 ms in all experiments, depend on the non-convex search within the convex region. Similar computational times per vehicle were observed for experiments with larger numbers of vehicles in simulation. For the centralized algorithm as shown in histogram 1020 (two vehicles), higher computational times were observed for the worst case, and the inventors believe this may have been due to inefficient handling of high-dimensional sorted lists and other implementation inefficiencies.

Figure 11A:
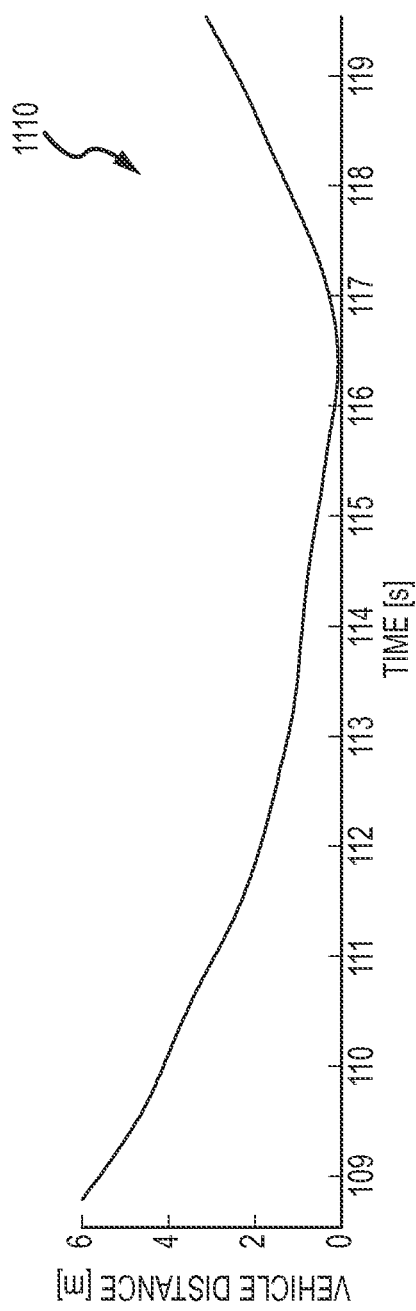
FIGS. 11A-11C are graphs of vehicles followings two guidance trajectories.
Figure 11B:
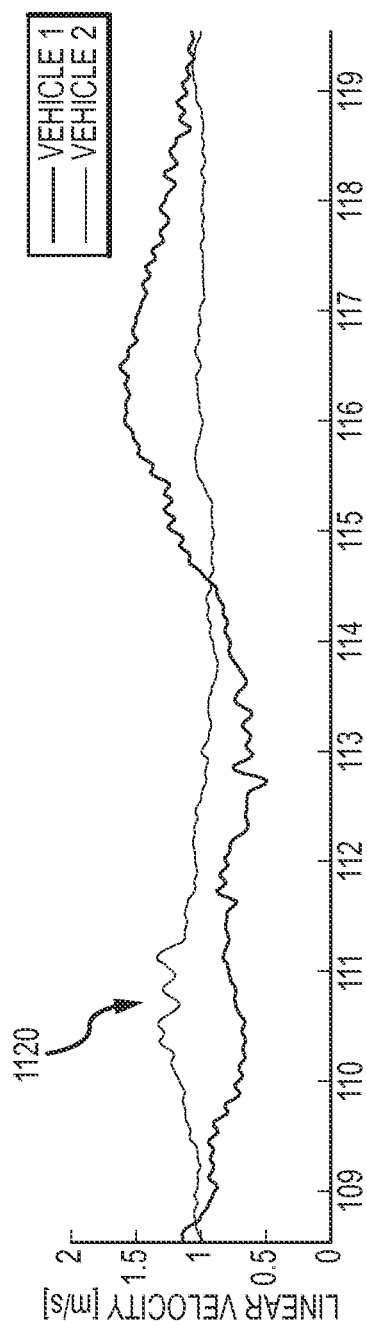
Figure 11C:
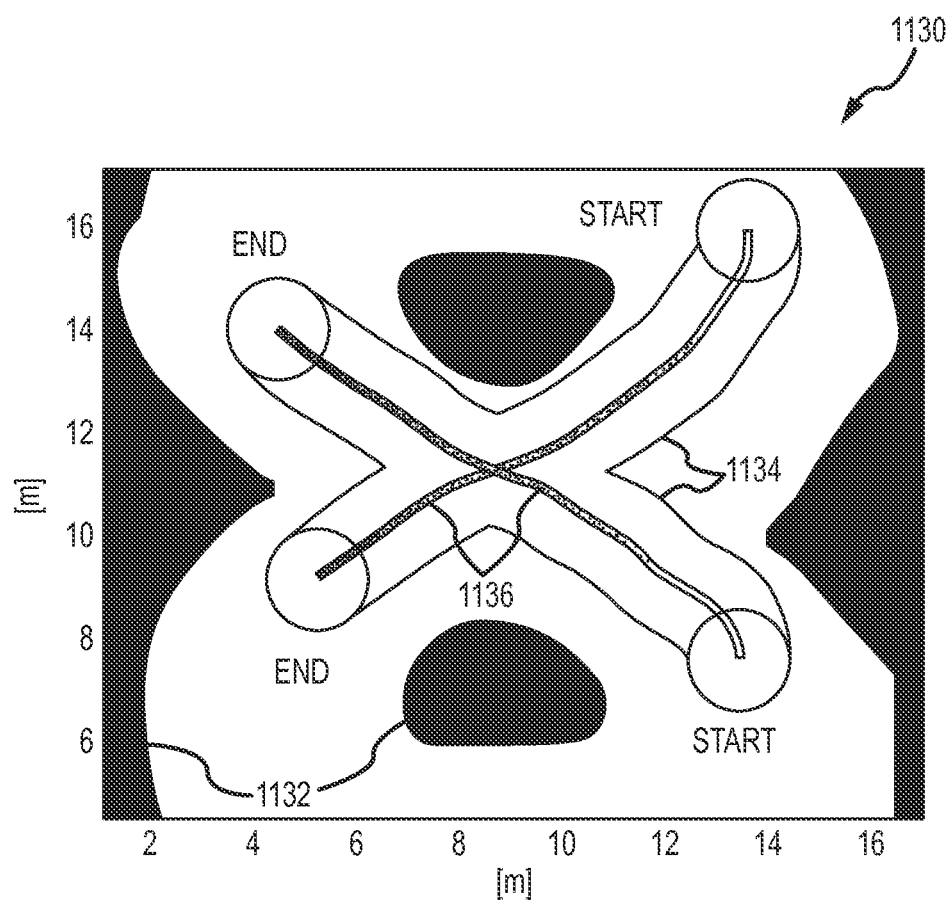

With regard to constrained driving experiments using a guidance trajectory along with a grid map of obstacles, FIGS. 11A-11C show graphs 1110, 1120, and 1130 providing vehicle distance and linear velocities over time (in FIGS. 11A and 11B, respectively) and vehicle position (in FIG. 11C) with obstacles shown at 1132, areas covered by vehicle at 1134, and lines 1136 providing a time indicator. FIGS. 12A and 12B show histograms 1210 and 1220 (with and without a driver, respectively) of distance from vehicle to guidance trajectory relative to active area radius. FIGS. 12A and 12B show statistics over several experiments of vehicle distance to the guidance trajectory relative to the active area radius. For a vehicle without a driver (as seen in histogram 1210), the 10 percent offset is due to the proportional tracking controller employed. For a vehicle with a driver (as seen in histogram 1220), it can be observed that the driver is able to freely move within the active area, but the optimization algorithm successfully constrains the motion of the vehicle so as to avoid collisions with obstacles or other vehicles.

As will be appreciated based on the above description, a method is taught for shared control of a vehicle. In this shared control method, the driver commands the vehicle by specifying a preferred velocity. The specified velocity is then transformed into a local motion that respects the actuator limits of the vehicle and is collision free with respect to other moving vehicles and static obstacles (physical or virtual) given by (or defined by) a grid map of the drive space. This allows for smooth and safe control of the vehicle. In order to limit the freedom of the driver, a global guidance trajectory can be included in some embodiments of the shared control method, and the global guidance trajectory specifies the areas (or spaces) where the vehicle is allowed to drive in each time instance. Good performance has been observed in extensive experimental tests at speeds of up to 3 m/s and in close proximity to other vehicles and obstacles (e.g., walls). Further, the low computational time of the optimization algorithm allows for real-time control of numerous vehicles in the drive space.

The above description teaches the inventors' shared control for vehicles that are wheeled or driving on the ground in a 2D drive space. The inventors further explored application and/or extension of their shared control method (and associated system) to collision avoidance for aerial vehicles especially in multi-agent (or multi-aerial vehicle) scenarios. The following paragraphs describe an investigation of local motion planning and collision avoidance for a set of decision-making agents (vehicles) navigating or flying in 3D space. The shared control method is applicable to agents that are heterogeneous or homogeneous in size, dynamics, and aggressiveness. The method may use and expand upon the concept of velocity obstacles (VO), which characterizes the set of trajectories that lead to a collision between interacting agents.

Motion continuity constraints are satisfied by using a trajectory tracking controller and by constraining the set of available local trajectories in an optimization. Collision-free motion is obtained by selecting a feasible trajectory from the VO's complement, where reciprocity can also be encoded. The following three algorithms for local motion planning are presented herein: (1) a centralized convex optimization in which a joint quadratic cost function is minimized subject to linear and quadratic constraints; (2) a distributed convex optimization derived from the centralized convex optimization; and (3) a centralized non-convex optimization with binary variables in which the global optimum can be found but at a higher computational cost. The following description also presents results from experiments with up to four vehicles/agents in the form of physical quadrotors (or multi-copters) flying in close proximity and with two quadrotors avoiding a human in the 3D space (or flying space or air space).

The last decade has seen significant interest in unmanned aerial vehicles (UAVs) including multi-rotor helicopters (or multi-copters) due to their mechanical simplicity and agility. Successful navigational control builds on the interconnected competences of localization, mapping, and motion planning and/or control. The real-time computation of global collision-free trajectories in a multi-agent setting had proven challenging. One approach used was to hierarchically decompose the problem into a global planner, which may omit motion constraints, and a local reactive component that locally modifies the trajectory to incorporate all relevant constraints. The local reactive component is one topic of the following paragraphs, and this description teaches a real-time reactive local motion planner that takes into account motion constraints, static obstacles, and other flying vehicles or agents. Further, the important case where other agents/vehicles are themselves decision-making vehicles is addressed with the shared control method (and system).

Among the inventors' contributions provided in their shared control method is a derivation and evaluation of three methods for local planning in 3D environments or air spaces (e.g., based on recent extensions of the VO concept). A first method is a distributed convex optimization in which a quadratic cost function is minimized subject to linear and quadratic constraints. Only knowledge of relative position, velocity, and size of neighboring agents/vehicles is utilized. A second method for local planning uses a centralized convex optimization in which a joint quadratic cost function that is minimized subject to quadratic and linear constraints. This variant scales well with the number of agents and presents real-time capability but may provide, in some cases, a suboptimal but still useful solution. The third method uses a centralized non-convex optimization in which a joint quadratic cost function is minimized subject to linear, quadratic, and non-convex constraints. This optimization may be formulated as a mixed integer quadratic program, and this variant explores the entire solution space but can, in some situations, scale poorly with the number of agents/vehicles. Each of the optimization methods can: (1) characterize agents as decision making agents that collaborate to achieve collision avoidance; (2) incorporate motion continuity constraints; and (3) handle heterogeneous groups of agents. The following description also provides a complexity analysis and a discussion of the advantages and disadvantages of each optimization method.

The control problem can be thought of as a consideration of a group of n agents freely moving in 3D space. For each agent, i, $p_i \in \mathbb{R}^3$ denotes its position, $v_i = \dot{p}_i$ its velocity, and $a_i = \ddot{p}_i$ its acceleration. The goal is to compute for each such agent, at high frequency (e.g., 10 Hz or the like), a local motion that respects the kinematics and dynamic constraints of the ego agent or aerial vehicle. The local motion should also be collision free with respect to neighboring agents or aerial vehicles in the 3D space for a short time horizon (e.g., for 2 to 10 or more seconds), which may be thought of as providing local motion that provides collision avoidance.

Two scenarios are discussed herein: (1) a centralized one where a central unit computes local motions for all agents simultaneously and (2) a distributed one where each agent or vehicle computes independently its local motion. For the second case, no communication between the agents is required, but each agent is able to maintain an estimate of the position and velocity of its neighbors. For the distributed case, neighboring agents are labeled as dynamic obstacles or decision-making agents, which employ an algorithm that is identical to that in the ego agent or vehicle. The local motion planning problem is first formulated as an efficient convex optimization (either centralized or distributed), followed by a non-convex optimization (centralized) that trades off efficiency for richness of the solution space.

The shape of each agent or vehicle is modeled by an enveloping cylinder of radius, $r_i$, and height, $2h_i$, centered at the agent or vehicle. The local motion planning framework is applied to quadrotor helicopters, which are useful in many applications due to their agility and mechanical simplicity. Implementation details, including an appropriate control framework, are described in the coming paragraphs followed by discussion of extensive experimental results using up to four quadrotors along with a human moving through the 3D space.

Figure 13A:
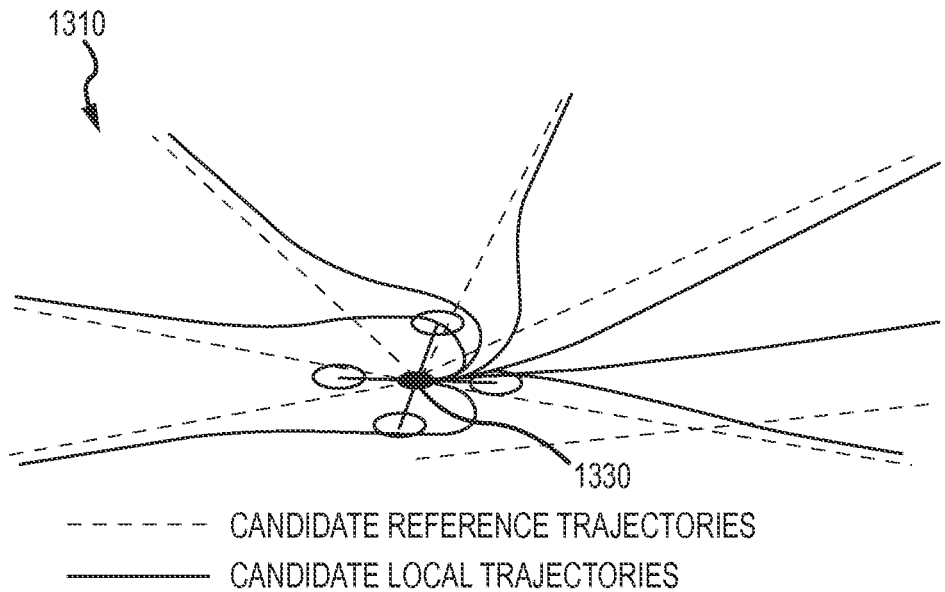
FIGS. 13A and 13B illustrate graphically schemas of local motion planning showing candidate local trajectories in relation to candidate reference trajectories and showing an exemplary local trajectory.
Figure 13B:
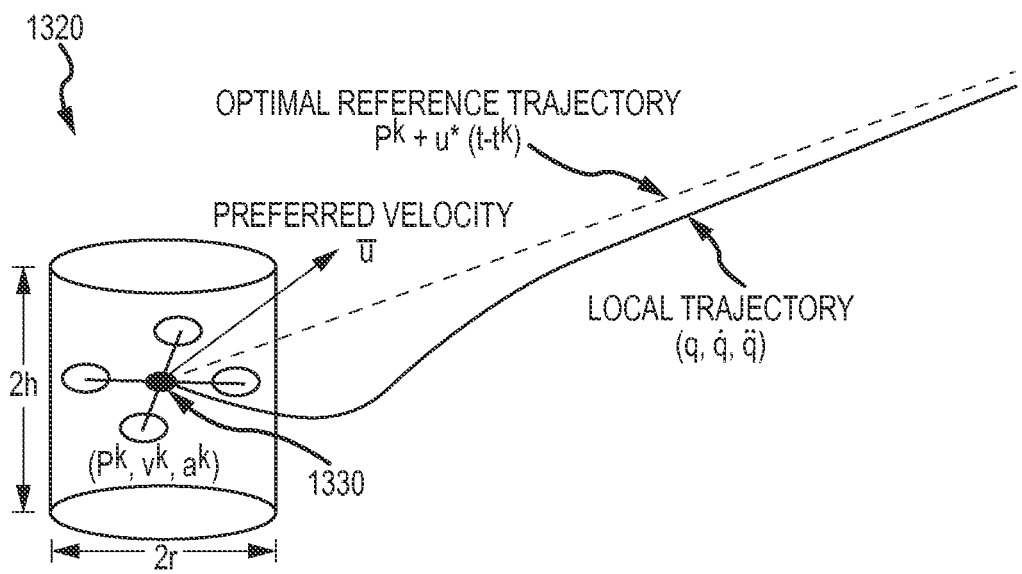

As an overview to local motion planning, it may be useful to first introduce the terminology used to describe motion planning and then follow this with a definition of the local trajectories and an overview of the optimization problem solved to obtain collision-free motions. With regard to terminology, FIGS. 13A and 13B illustrate schemas 1310, 1320 of local motion planning including examples of candidate local trajectories and examples of a local trajectory, respectively, for an agent 1330 (e.g., a quadrotor helicopter).

A "global trajectory" is a trajectory between two configurations embedded in a cost field with simplified dynamics and constraints." A "preferred velocity" is an ideal velocity computed by a guidance system to track the global velocity, and it may be denoted as $\bar{u} \in \mathbb{R}^3$. A "local trajectory" is the trajectory executed by the agent or vehicle for a short time horizon and is selected from a set of candidate local trajectories. A "candidate local trajectory" is one that respects the kinematics and dynamic constraints of the agent or vehicle and is computed from a candidate reference trajectory via a bijective mapping or the like. A "candidate reference trajectory" is a trajectory given by a constant velocity, $u \in \mathbb{R}^3$, that indicates the target direction and velocity of the agent or aerial vehicle. An "optimal reference trajectory" is a trajectory given by the optimal reference velocity, $u^* \in \mathbb{R}^3$, selected from the set of candidate reference velocities and which minimizes the deviation to $\bar{u} \in \mathbb{R}^3$. Further, this trajectory defines the local trajectory.

One focus of the present description is on local motion planning using a preferred velocity, $\bar{u}$, computed by a guidance or control system in order to track a global trajectory. An optimal reference trajectory is computed such that its associated local trajectory is collision free. This provides a parameterization of local motions given by u and allows for an efficient optimization in candidate reference velocity space, $\mathbb{R}^3$, to achieve collision-free motions.

Each candidate reference trajectory is that of an omnidirectional agent moving at a constant velocity, u, and starting at the current position, $p^k$, of the agent as shown by:

$$P_{ref}(t) = p^k + u(t - t^k), t \in [t^k, \infty) \quad \text{Eq. (18)}$$

A trajectory tracking controller, respecting the kinematics and dynamic constraints of the agent, $q(\tilde{t}) = f(z^k, u, \tilde{t})$ is considered, continuous in the initial state $z^k = [p^k, \dot{p}^k, \ddot{p}^k, \ldots]$ of the agent and converging to the candidate reference trajectory. This defines the candidate local trajectories given by $q(\tilde{t})$ and a bijective mapping (for a given $z^k$) from candidate reference velocities, u.

As an overview of the optimization problem, a collision-free local trajectory (described above and parameterized by u*) is obtained via an optimization in candidate reference velocity space where the deviation to the preferred velocity, $\bar{u}$, is minimized. In the following description, two alternative formulations are presented as a centralized optimization and a distributed optimization, formulated as a convex optimization with quadratic cost and linearized constraints for the following: (a) Motion Continuity: The position error between the candidate reference trajectory and the local trajectory should be below a limit, $\in$, to guarantee that the local trajectory is collision free if the candidate reference trajectory is. Continuity in position, velocity, acceleration, and further derivatives (optional) is guaranteed by construction; and (2) Collision Avoidance: The candidate reference velocities leading to a collision are described by the velocity obstacle, a cone in relative candidate reference velocity space for agents of $\in$-enlarged radius. Consider $C_i$ the set of collision avoidance constraints for an agent, i, with respect to its neighbors and $C = \cup_{i \in A} C_i$.

These non-convex constraints can be linearized leading to a convex optimization with quadratic cost and linear quadratic constraints. The optimization problem is formulated below, and the convex optimization is described for the case of heterogeneous groups of agents of unknown dynamics. Further, an algorithm is described to solve the original non-convex optimization along with an extension for homogeneous groups of agents (same dynamics and controller). In the centralized case, a single convex optimization is solved where the optimal reference velocity of all agents, $u^*_{1:m} = [u^*_1, \ldots, u^*_m]$, are jointly computed. In the distributed case, each agent, $i \in A$, independently solves an optimization where its optimal reference velocity, $u^*_i$, is computed. In this case, it can be considered that agents collaborate in the avoidance and apply the same algorithm, otherwise they are treated as dynamic obstacles. Only information about the neighbor's current position, velocity, and shape is utilized in the optimization.

Now, it may be appropriate to further describe a formulation for local motion planning, and the following discusses in detail the optimization cost and the optimization constraints used in local motion planning. With regard to preferred velocity, in each local planning iteration, a preferred velocity, $\bar{u}$, can be computed given the current position and velocity of the vehicle so as to follow a global plan to achieve either a goal or a trajectory. With regard to achieving a trajectory, the preferred velocity, $\bar{u}$, is given by a trajectory tracking controller for omnidirectional agents.

With regard to achieving a goal, the preferred velocity, $\bar{u}$, is given by a proportional controller towards the goal position, $g_i$, saturated at the agent's or vehicle's preferred speed, $\bar{V} > 0$, and decreasing when in the neighborhood as shown in the following:

$$\bar{u}_i = \bar{V} \min\left(1, \frac{\|g^i - p^i\|}{K_v}\right) \frac{g_i - p_i}{\|g_i - p_i\|} \quad \text{Eq. (19)}$$

where $K_v > 0$ is the distance to the goal from which the preferred velocity is reduced linearly. Alternatively, it can be given by an LQR controller.

Figure 14:
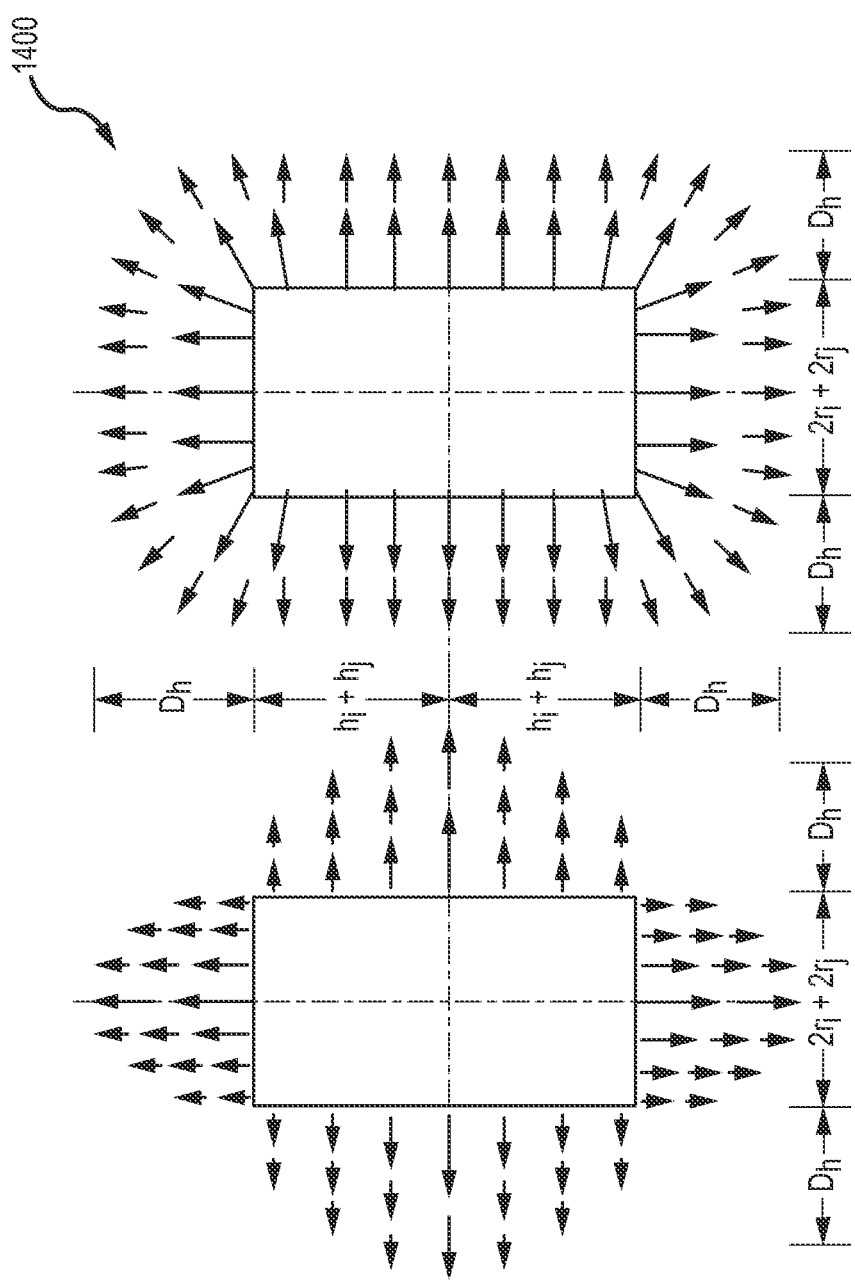
FIG. 14 provides a graphic representation of two examples of repulsive velocities that may be used in a formulation of local motion planning.

With regard to repulsive velocity, formulating the local motion planning as an optimization where avoidance constraints are given by Velocity Obstacles produces collision-free motions but typically reduces inter-agent distance to zero. Although optimal, this property can lead to unsafe motions in real scenarios with sensor noise. To appropriately maintain a minimum inter-agent distance, the preferred velocity, $\bar{u}$, is corrected by adding a repulsive velocity, $\mathring{u}$, given by a vector field such as those shown in one of the two examples of repulsive velocities shown in the graph 1400 of FIG. 14 and that pushes agents apart from each other when at a certain distance. Example equations for repulsive velocity that may be utilized in the shared control method are provided below.

The optimization cost can be given by two parts, with the first one being a regularizing term penalizing changes in reference velocity and the second one being chosen for minimizing the deviation to the preferred velocity, $\bar{u}_i$, corrected by the repulsive velocity, $\mathring{u}_i$. For example, it has been shown that pedestrians prefer to maintain a constant velocity in order to minimize energy, and, hence, preference was given to turning instead of changing speed. Furthermore, penalizing changes in speed leads to a reduction of deadlock situations. This idea is formalized as an elliptical cost, higher in the direction parallel to $\bar{u}_i + \mathring{u}_i$, and lower perpendicular to it. One can let $\lambda > 0$ represent the relative weight and then define $L=\text{diag}(\lambda, 1,1)$ and $D_i$ the rotation matrix of the transformation onto the desired reference frame.

In the distributed case, the quadratic cost can be given by:

$$C(u_i) := K_o \|u_i - v_i\|^2 + \|L^{1/2} D_i(u_i - (\bar{u}_i + \mathring{\mathbf{u}}_i))\|^2 \qquad \text{Eq. (20)}$$

where, with the exception of the optimization variables, $u_i$, the values of all other variables are given for the current time instance and $K_o$ is a design constant.

In the centralized case, the quadratic cost can be given as:

$$C(u_{1:m}) := K_o \Sigma_{i=1}^m \bar{w}_i \|u_i - v_i\|^2 + \Sigma_{i=1}^m \bar{w}_i \|L^{1/2} D^i(u_i - (\bar{u}_i + \mathring{\mathbf{u}}_i))\|^2 \qquad \text{Eq. (21)}$$

where $\bar{w}_i$ represents relative weights between different agents to take into account avoidance preference between agents, which can be interpreted as aggressive (high $\bar{w}_i$) versus shy (low $\bar{w}_i$) behavior.

Turning now to motion continuity constraints, in order to guarantee collision-free motions, it can be guaranteed that each agent remains within $\in_i$ of its reference trajectory, with $\in_i < \min_j \|p_j - p_i\|/2$. So, a first constraint ("Constraint 1") for motion continuity can be stated: for a maximum tracking error, $\in_i$, and current state, $z_i = [p_i, \dot{p}_i, \ddot{p}_i]$, the set of candidate reference velocities, $u_i$, that can be achieved with position error lower than the maximum tracking error, $\in_i$, is given by:

$$R_i = R(z_i, \in_i) = \{u_i \mid \|(p_i + \tilde{t} u_i) - f(z_i, u_i, \tilde{t})\| \le \in_i, \forall \tilde{t} > 0\} \qquad \text{Eq. (22)}$$

For arbitrary $f(z_i, u_i, \tilde{t})$, the set Ri can be precomputed. For quadrotors freely moving in 3D space, an LQR controller can be used as the function $f(z_i, u_i, \tilde{t})$. In the present description, poison control and local trajectory are decoupled and $f(z_i, u_i, t)$ is given by Eq. (40). If the agents were omnidirectional, the set Ri would be given by a sphere centered at zero and of radii $v_{max}$ (no continuity in velocity). For the case of study of this description, given a maximum tracking error, $\in_i$, and an initial state, $z_i$, the limits can be obtained from the computed data with:

$$\delta R_{i, \in_i} = \{u_i \mid_{i>0}^{max} \|(p_i + \tilde{t} u_i) - f(z_i, u_i, \tilde{t})\| = \varepsilon_i\} \qquad \text{Eq. (23)}$$

To reduce computational complexity, $\delta R_{i, \in_i}$ is then approximated by the largest ellipse (quadratic constraint of the form $u_i^T Q_i u_i + 1_i \cdot u_i \le a_i$, with $Q_i \in \mathbb{R}^{3 \times 3}$ positive semidefinite, $l_i \in \mathbb{R}$) fully contained inside $\delta R_{i, \in_i}$.

With regard to collision avoidance constraints, each agent or vehicle should avoid colliding with static obstacles, other controlled agents or vehicles, and dynamic obstacles. A maximum time horizon, $\tau$, can be considered for which collision-free motion is guaranteed. A static obstacle is given by a region $O \subset \mathbb{R}^3$. The vehicles or agents are modeled by an enclosing vertical cylinder. The disk of radius r centered at c is denoted by $D_{c,r} \subset \mathbb{R}^2$, and the cylinder of radius r and height 2h centered at c is denoted by $C_{c,r,h} \subset \mathbb{R}^3$.

The collision avoidance constraints are computed with respect to an agent or vehicle following the reference trajectory. Since the agents are not able to perfectly track the reference trajectory, their enveloping cylinder should be enlarged by the maximum tracking error, $\in_i$. For simplicity, the following notation is used: $r_i := r_i + \in_i$ and $h_i := h_i + \in_i$ for the enlarged radius and the cylinder height with $p_i$ being the current position of an agent, i. Then a second constraint ("Constraint 2") regarding avoidance of static obstacles can be stated as: for every agent $i \in A$ and neighboring obstacle O, the constraint is given by the reference velocities for which the intersection between O and the agent is empty for all future time instances, i.e., $p_i + u_i \tilde{t} \notin (O \oplus C_{0, r_i, h_i}), \forall \tilde{t} \in [0, \tau]$.

Figure 15:
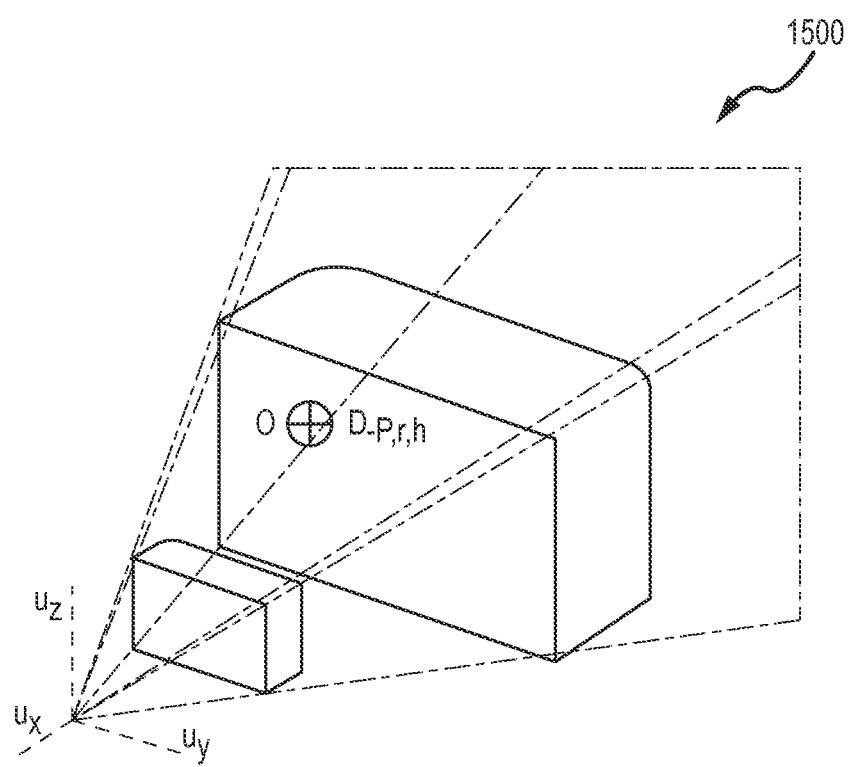
FIG. 15 provides a graphical representation of an example of a collision avoidance constraint for a static rectangular obstacle showing reference velocities leading to a collision within a given time horizon (note, its complement is non-convex and is linearized)

This constraint can be given by a cone in the 3D candidate reference velocity space generated by $O \oplus C_{0, r_i, h_i} - p_i$ and truncated at $(O \oplus C_{0, r_i, h_i} - p_i)/\tau$. An example of this constraint for a rectangular object is shown in the fly space or graph 1500 of FIG. 15. Boundary wall constraints are directly added, given by $n \cdot u_i \le d(\text{wall}, p_i)/\tau$, with n being the normal vector to the wall and $d(\text{wall}, p_i)$ being the distance to it.

A third constraint ("Constraint 3") for inter-agent collision avoidance can be stated: for every pair of neighboring agents $i, j \in A$, the constraint is given by the relative reference velocities for which the agents' enveloping shape does not intersect within the time horizon, i.e., $u_i - u_j \notin VO_{ij}^\tau = \cup_{\tilde{t}=0}^\tau ((C_{p_i, r_j, h_j} \oplus C_{-p_i, r_i, h_i})/\tilde{t}), \forall \tilde{t} \in [0, \tau]$. For cylindrical-shaped agents, the constraint can be separated in the horizontal plane $\|p_i^H - p_j^H + (u_i^H - u_j^H)\tilde{t}\| \ge r_i + r_j$, and the vertical component $|p_i^3 - p_j^3 + (u_i^3 - u_j^3)\tilde{t}| \ge h_i + h_j$ for all the $\tilde{t} \in [0, \tau]$. The constraint is a truncated cone as shown in the graphs 1610, 1620, and 1630 of FIGS. 16A-16C (particularly in graph 1610), with graph 1610 illustrating a velocity obstacle in relative velocity, graph 1620 illustrating projection onto the horizontal plane, and graph 1630 showing projection onto a vertical plane.

Turning now to approximation by linear constraints, since the volume of reference velocities leading to a collision is convex, the aforementioned collision avoidance constraints are non-convex. To obtain a convex optimization, they can be linearized. For increased control over the avoidance behavior and topology, each non-convex constraint can be approximated by five linear constraints representing to the right, to the left, over and under the obstacle or another agent, and a head-on maneuver, which remains collision-free up to $t = \tau$. In particular, for the feasible space $\mathbb{R}^3 \setminus VO_{ij}^\tau$ consider five ($l \in [1,5]$) linear constraints (half-spaces) $H_{ij}^l$ of the form $n_{ij}^l (u_i - u_j) \le b_{ij}^l$, with $n_{ij}^l \in \mathbb{R}^3$ and $b_{ij}^l \in \mathbb{R}$, and verifying that if $u_i - u_j$ satisfies any of the linear constraints, it is feasible with respect to the original constraint that:

$$\cup_{l=1}^5 H_{ij}^l \subset \mathbb{R}^3 \setminus VO_{ij}^\tau \qquad \text{Eq. (23)}$$

Figure 16A:
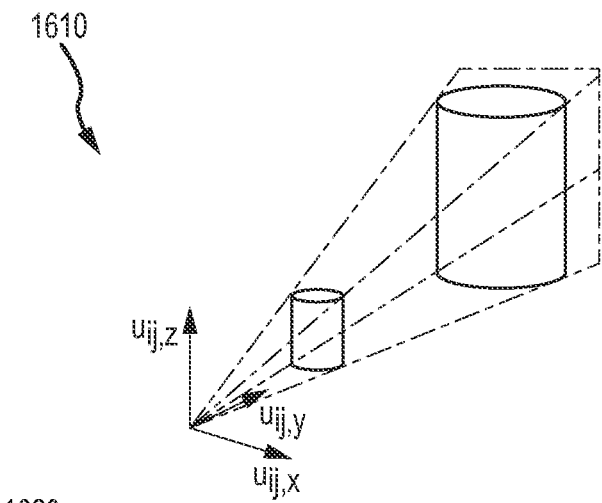
FIGS. 16A-16C provide graphical representations of an inter-agent collision avoidance constraint illustrating a velocity obstacle in relative velocity, illustrating projection onto the horizontal plane, and illustrating projection onto a vertical plane, respectively.
Figure 16B:
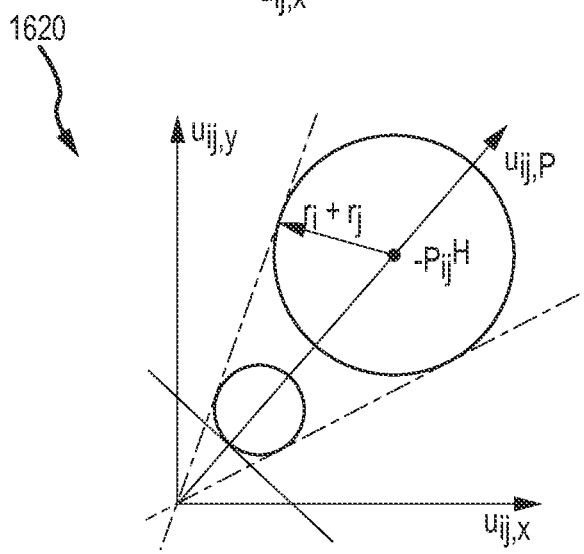
Figure 16C:
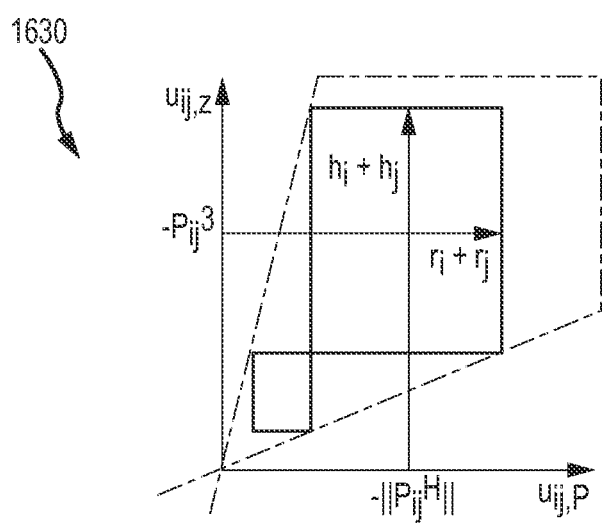

An example of this process is provided in FIGS. 16A-16C, and the equations of the linear constraints are provided below. To linearize the original constraint, only one of the linear constraints is typically selected and added to the convex optimization.

Now, with regard to selection of a linear constraint, each collision avoidance constraint can be linearized by selecting one of the five linear constraints. First, one may choose a fixed side for avoidance. If agents are moving towards each other, $(v_{ij} \cdot p_{ij} < 0)$, one may wish to avoid on a predefined side such as on the left (l=1). If agents are not moving towards each other, the constraint perpendicular to the apex of the cone (l=5) can be selected to maximize maneuverability. Second, the linear constraint chosen may be maximum constraint satisfaction for the current relative velocity:

$$\underset{l}{\operatorname{argmin}} (n_{ij}^l \cdot (v_i - v_j) - b_{ij}^l).$$

This selection maximizes the feasible area of the optimization, when taking into account the motion continuity constraints discussed above.

A third choice may be maximum constraint satisfaction for the preferred velocity:

$$\underset{l}{\operatorname{argmin}} (n_{ij}^l \cdot (\bar{u}_i - \bar{u}_j) - b_{ij}^l) \qquad (1)$$

if centralized and $$\underset{l}{\operatorname{argmin}} (n_{ij}^l \cdot (\bar{u}_i - v_j) - b_{ij}^l) \qquad (2)$$

if distributed. This selection may provide faster progress towards the goal position, but the optimization may become quickly infeasible if the agent greatly deviates from its preferred trajectory. The first choice or option provides the best coordination results as it incorporates a social rule. The second choice or option maximizes the feasible area of the optimization, and the third choice or option may provide faster convergence to the ideal trajectory. An experimental evaluation of these options is given below. Without loss of generality, consider $n_{ij} \cdot u_{ij} \le b_{ij}$ the selected linearization of $\mathbb{R}^3 \backslash VO_{ij}^\tau$, which can be directly added in the centralized optimization of Algorithm 1 discussed below.

With regard to partition, in the distributed case, the reference velocity of an agent, j, is typically unknown, and only its current velocity, $v_j$, can be inferred. With the assumption that every agent follows the same optimization algorithm, a partition should be found such that if both agents select new velocities independently their relative reference velocity, $u_i-u_j$, is collision free. The idea of reciprocal avoidance can be followed. The change in velocity is denoted by $\Delta v_i = u_i - v_i$ and the relative change of velocity by $\Delta v_{ij} = \Delta v_i - \Delta v_j$. In the distributed case, all agents are considered as independent decision makers solving their independent optimizations. To globally maintain the constraint satisfaction and avoid collisions, an assumption on an agent's, j's, velocity can be made.

Variable sharing of avoidance effort might be considered in some cases leading to $\Delta v_i = \lambda \Delta v_{ij}$ with the assumption that $\Delta v_j = -(1-\lambda)\Delta v_{ij}$. For collaborative agents that equally share the avoidance effort, $\lambda = 0.5$. If it is considered that an agent, j, ignores another agent, i, and continues with its current velocity, then $\lambda = 1$ and full avoidance is performed by the agent, i. With the assumption that both agents share the avoidance effort (change in velocity) for $\lambda \in [0,1]$, the linear constraint can be written as:

$$\begin{aligned} n_{ij} \cdot u_{ij} &= n_{ij} \cdot (u_i - v_j - \Delta v_j) \qquad \text{Eq. (24)}\\ &= n_{ij} \cdot (u_i - v_j + (1-\lambda)\Delta v_{ij})\\ &= n_{ij} \cdot (u_i - v_j + (1-\lambda)(u_i - v_i)/\lambda)\\ &= \frac{n_{ij}}{\lambda} \cdot (u_i(1-\lambda)v_i - \lambda v_j) \le b_{ij} \end{aligned}$$

which leads to:

$$n_{ij} \cdot u_i \le b_i = \lambda b_{ij} + n_{ij} \cdot ((1-\lambda)v_i + \lambda v_j) \qquad \text{Eq. (25)}$$

which is a fair partition of the velocity space for both agents and provides avoidance guarantees.

At this point, it may be useful to provide exemplary algorithms for use in convex optimization. To achieve low computational time, the inherently non-convex optimization can be approximated by a convex optimization with quadratic cost and linear and quadratic constraints. The following two algorithms can be used in this regard with one being for use in the centralized implementation and one in the distributed implementation.

The first algorithm ("Algorithm 1") for centralized convex optimization can be stated as: a single convex optimization is solved where the optimal reference velocity of all agents, $u^*_{1:m} = [u^*_1, \ldots, u^*_m]$, are jointly computed as:

$$u^*_{1:m} = \underset{u_{1:m}}{\operatorname{argmin}} C(u_{1:m}) \qquad \text{Eq. (26)}$$

s.t. $\|u_i\| \le v_{max}, \forall i \in A$ quadratic Constraint 1, $\forall i \in A$ linearized Constraint 2, $\forall i \in A$ linearized Constraint 3, of the form $n_{ij} \cdot (u_i - u_j) \le b_{ij}$, $\forall i, j \in A$ neighbors where the optimization by Eq. (21).

The second algorithm ("Algorithm 2") for distributed convex optimization can be states as: each agent, $i \in A$, independently solves an optimization where its optimal reference velocity, $u^*_i$, is computed as:

$$u^*_i = \underset{u_i}{\operatorname{argmin}} C(u_i) \qquad \text{Eq. (27)}$$

s.t. $\|u_i\| \le v_{max}$, quadratic Constraint 1, agent $i$ linearized Constraint 2, agent $i$ linearized Constraint 3, of the from $n_{ij} \cdot u_i \le b_i, \forall j \in A$ neighbor of $i$ where the optimization cost is given by Eq. (20). These 2m and 2-dimensional quadratic optimizations with linear and quadratic constraints can be solved efficiently using presently available solvers.

If the optimization is feasible, a solution is found that guarantees collision-free motion up to a predefined time horizon, $\tau$. If the optimization is infeasible, no solution exists for the linearized problem. In this case, the involved agents drive or fly their last feasible trajectory (obtained at time $t_f$) with a time re-parameterization given by:

$$\gamma(t) = (-t_f^2 + (2\tau + 2t_f)t - t^2)/(2\tau), t \in [t^f, t^f + \tau], \gamma(t) = t_f + \tau/2,\\ t < t_f + \tau \qquad \text{Eq. (28)}$$

This time re-parameterization guarantees that the involved agents reach a stop on their previously computed paths within the time horizon of the collision avoidance algorithm. Since this computation is performed at a high frequency, each individual agent is able to adapt to changing situations.

With these two convex optimization algorithms in mind, it may now be useful to discuss several theoretical guarantees. A first theoretical guarantee or remark pertains to computational complexity and can be stated as follows: linear in the number of variables and constraints although the centralized is of higher complexity. If distributed, for each agent, the optimization utilizes three variables, one quadratic constrain, and a maximum of m linear constraints for collision avoidance (in practice, limited to a constant value, $K_c$). If centralized, the optimization uses 3n variables, n quadratic constraints, and less than $$\frac{n(n-1)}{2} + n(m-n)$$

linear constraints (usually limited to $nk_c$).

A second theoretical guarantee or remark pertains to safety guarantees and can be stated as: safety is preserved in normal operation. If feasible, collision-free motion is guaranteed for the local trajectory up to a particular time, $\tau$ (optimal reference trajectory is collision-free for agents of radii enlarged by the maximum tracking error, $\in$, and agents stay within $\in$ of it) with the assumption that all interacting agents either continue with their previous velocity or compute a new one following the same algorithm and assumptions. If one lets $p_i(t)$ denote the position of an agent, i, at time $t \geq t^k$ and recalls that $\tilde{t}=t-t^k$, then:

$$\|p_i(t)-p_j(t)\|=\|f(z_i^k,u_i,\tilde{t})-f(z_j^k,u_j,\tilde{t})\|\geq\|(p_i^k+u_i\tilde{t})-(p_j^k+u_j\tilde{t})\|$$
$$\|-\in_i-\in_j\geq r_i+\in_i+r_j+\in_j-\in_i-\in_j=r_i+r_j \quad \text{Eq. (29)}$$

where the first inequality holds from the triangular inequality and Constraint 1 ($u_i \in R_i$ and $u_j \in R_j$). The second inequality holds from Constraint 3 ($u_i-u_j \notin VO_{ij}^{\tau}$).

If infeasible, no collision-free solution exists that respects all the constraints. If the time horizon is longer than the required time to stop, passive safety is preserved if the last feasible trajectories of all agents are driven with a time reparameterization to reach stop before a collision arises (see Eq. 28). This time re-parameterization implies a slowdown of the agent, which in turn may render the optimization feasible in a later time step. Since this computation is performed at a high frequency, each individual agent can adapt to changing situations.

A third theoretical guarantee or remark pertains to infeasibility and can be stated as: the optimization can be infeasible due to several causes. First, there may not be enough time to find the solution within the allocated time. Second, there may be differences between the model and the real vehicle. Third, there may be noise in localization and estimation of the agents' states. Fourth, the optimization can be infeasible due to the limited local planning horizon together with an over simplification of motion capabilities by reducing them to the set of local motions. Fifth, if distributed and given the use of pair-wise partitions of velocity, space with either the assumption of equal effort in the avoidance or constant speed, the optimization may be infeasible when not all world constraints are taken into account for the neighboring agents. Thus, an agent may have conflicting partitions with respect to different neighbors rendering its optimization infeasible.

A fourth theoretical guarantee or remark pertains to deadlock-free guarantees and can be stated as: as for other local methods, deadlocks may still appear. With this in mind, a global planner for guidance may be useful in complex scenarios.

Now, it may be useful to provide an exemplary algorithm for use in non-convex optimization. Earlier, a method for local motion planning was described for heterogeneous groups of aerial vehicles (or agents), which was formulated as a convex optimization problem. The following presents an extension to a non-convex optimization where the global optimum can be found but at an increased computational cost. As taught earlier in this description, each non-convex constraint can be approximated by five linear constraints of which only one is introduced in the optimization, which leads to a local optimum. The full solution space can be explored by the addition of binary variables and reformulating the problem as a mixed integer quadratic program (MIQP).

One binary variable, $\xi_c^l=\{0,1\}$, is added for each linear constraint, $l \in [1:5]$, approximation of a nonconvex constraint, $c \in C$. Only one out of the five linear constraints is active, thus $\Sigma_{l=1}^{5}\xi_c^l=4, \forall c \in C$. An algorithm ("Algorithm 3") for non-convex optimization (or for centralized mixed-integer optimization) can now be formulated. A single MIQP optimization is solved where the optimal reference velocity of all agents, as well as the active constraints, $\bar{\xi}=\cup_{l \in [1,5], c \in C}\xi_c^l$, are jointly computed. A vector, $f_\xi^T$, can be defined with (optional) weights for each binary variable, for instance, to give preference to avoidance on one side, and then Algorithm 3 can presented as:

$$\underset{u_{1:m}}{\text{argmin}} \quad C(u_{1:m}) + f_\xi^T \bar{\xi}$$

s.t.
$\|u_i\| \leq u_{max}, \forall i \in A$
quadratic Constraint 1, $\forall i \in A$
linear Constraints 2, of the form
$n_i^l \cdot u_i - N\xi_i^l \leq b_i^l, \forall i \in A, \forall l \in [1,5]$
linear Constraints 3, of the form
$n_{ij}^l \cdot (u_i - u_j) - N\xi_{ij}^l \leq b_{ij}^l$,
$\forall i, j \in A$, neighbors, $\forall l \in [1,5]$
$\Sigma_l^5 \xi_c^l = 4, \forall c \in C$  Eq.(30)

where N>>0 is a large constant of arbitrary value. The linear cost vector $f_\xi$ is a zero vector if no preference between linear constraints for each VO exists. Different weights can be added for each linear constraint to include preference for a particular avoidance side.

This optimization can be solved via branch and bound using state of the art solvers. Although the number of variables and constraints can be bounded to be linear with the number of agents, the number of branches to be explored increases exponentially. In practice, a bound in the resolution time or number of explored branches (avoidance topologies) should be set. A distributed MIQP optimization can also be formulated, but collision avoidance guarantees would be lost since this can lead to a disagreement in the avoidance side and reciprocal dances appear.

Figure 17:
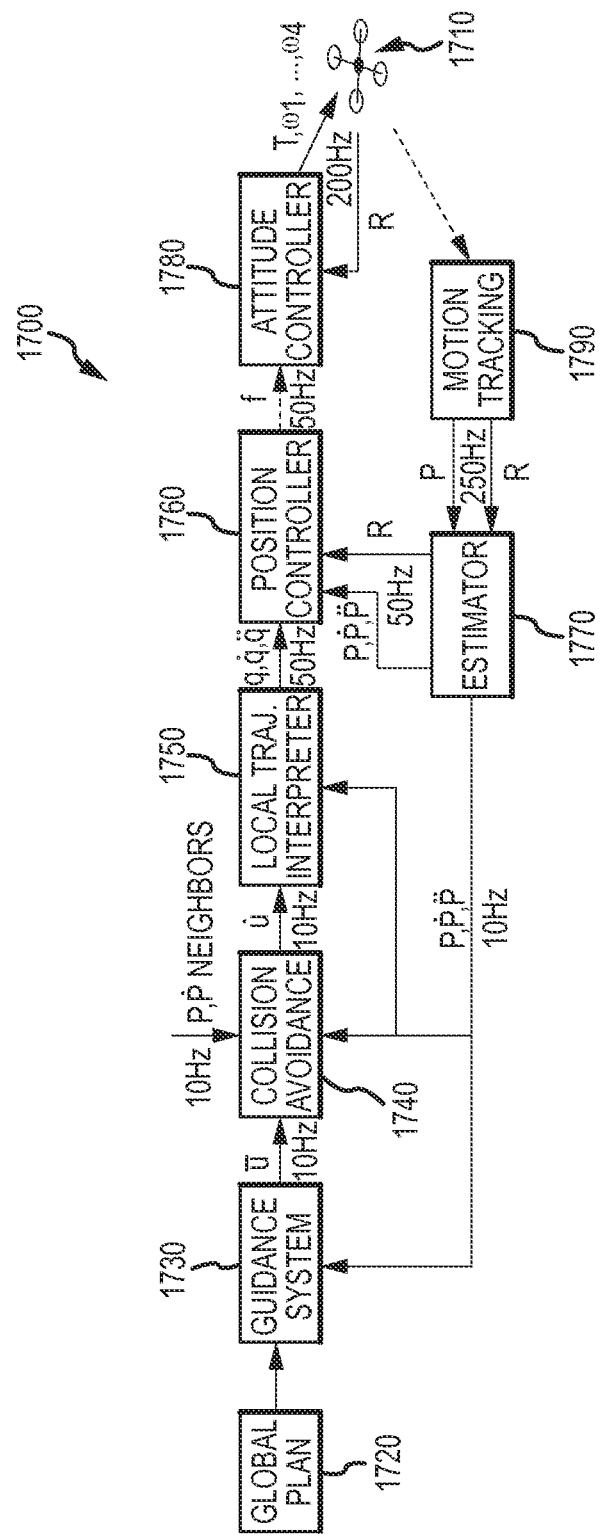
FIG. 17 is a functional block diagram or schema of a controller for use in providing shared control over an aerial vehicle such as a quadrotor helicopter with exemplary variables and frequencies provided.

With all the above teaching in mind, a control framework can be presented that is useful with aerial vehicles, and the inventors implemented and experimentally evaluated the control framework for providing shared control over quadrotor helicopters as the aerial vehicles. Particularly, FIG. 17 illustrates a control framework or controller 1700 that was implemented to provide control over a quadrotor vehicle 1710, and, to this end, the controller 1700 includes a number of submodules (e.g., programs executed by a processor of a central unit in a centralized implementation) 1720-1790 whose functionality and/or operations are described in the following paragraphs.

Motion planning may be divided into global planning and local planning. With regard to global planning, in complex environments, a global planner may be desirable for convergence, but in this discussion a fixed trajectory or goal position may be considered or used (as shown at 1720). With regard to local planning, the controller 1700 may compute (e.g., with a 10 Hz frequency) a collision-free local motion given a desired global trajectory or a goal position. To this end, a guidance system 1730 may output a preferred velocity, $\bar{u}$, given a desired global trajectory or a goal position and the current state of the vehicle. Additionally, a collision avoidance module 1740 receives the preferred velocity, $\bar{u}$, and computes the optimal reference velocity, u*, i.e., the closest collision-free candidate reference velocity that satisfies the motion continuity constraints.

With regard to control, a position controller 1760 controls the position of the quadrotor helicopter (or other aerial vehicle) to the local trajectory and runs at a desired frequency such as 50 Hz offboard in a real-time computer. The local trajectory interpreter 1750 receives the optimal reference velocity, u*, at a number of time instances, $t^k$. The module 1750 then outputs the control states, q, $\dot{q}$, $\ddot{q}$, to satisfy motion continuity at a particular time, and asymptotic convergence to the optimal reference trajectory as may be given by $p^k + u^* \tilde{t}$. The position controller 1760 receives setpoints in position, q, velocity, $\dot{q}$, and acceleration, $\ddot{q}$, and outputs the desired force, f.

The vehicle 1710 may be configured to provide a processor, memory, and software to provide a low-level controller that runs onboard (e.g., a 200 Hz or the like) and provides accurate attitude control at high frequency. The low-level controller may abstract the nonlinear quadrotor model as a point-mass for the high-level control. It may be composed of the following three submodules: (1) an attitude controller 1780 that receives a desired force, f (collective thrust and desired orientation) and outputs desired angular rates, $\bar{w}_x$, $\bar{w}_y$, $\bar{w}_z$; (2) a body angular rate controller that receives the desired body angular rates, and collective thrust, T, and provides an output in the form of a rotation speed setpoint for each of the motors [$\omega_1, \ldots, \omega_4$]; and (3) a motor controller that receives the desired rotation speeds of the motors [$\omega_1, \ldots, \omega_4$], with some implementations of vehicle 1710 using off-the-shelf motor controllers to interface the four motors of the quadrotor.

A quadrotor is a highly dynamic vehicle. To account for delays, the state used for local planning may not be the current state of the vehicle but, instead, a predicted one (e.g., as may be provided by forward simulation of the previous local trajectory) at the time when the new local trajectory is sent. A quadrotor is an under-actuated system in which translation and rotation are coupled. Its orientation (attitude) is defined by the rotation matrix, $R_I^B = [e_x, e_y, e_z] \in SO(3)$, which describes the transformation from the inertial coordinates frame, I, to the body fixed coordinate frame, B. The following paragraphs provide an overview of the model and control.

With regard to a quadrotor model (vehicle model), each of the four motors of the quadrotor has an angular speed, $w_i$, and produces a force, $F_i = c_t w_i^2$, and a moment, $M_i = c_y w_i^2$, where $c_t$ and $c_y$ are model-specific constants. Since the motor dynamics are fast, it is assumed that the desired force, $F_i$, is reached instantaneously. The control input, $o = [T, o_1]$, with $o_1 = [M_x, M_y, M_z]$, T being the total thrust, and $M_x$, $M_y$, and $M_z$ being the moments around the body axis, is given by:

$$o = \begin{bmatrix} T \\ o_1 \end{bmatrix} = \underbrace{\begin{bmatrix} c_t & c_t & c_t & c_t \\ 0 & c_a l & 0 & -c_a l \\ -c_a l & 0 & c_a l & 0 \\ c_y & -c_y & c_y & -c_y \end{bmatrix}}_{U} \underbrace{\begin{bmatrix} w_1^2 \\ w_2^2 \\ w_3^2 \\ w_4^2 \end{bmatrix}}_{w_m} \quad \text{Eq. (31)}$$

where l is the length from the center of gravity of the quadrotor to the rotor axis of the motor and $c_a$ is a model constant.

The angular velocity, w, and its associated skew anti-symmetric matrix, $\hat{w}$, are denoted by:

$$\hat{w} := \begin{bmatrix} 0 & -w_z & w_y \\ w_z & 0 & -w_x \\ -w_y & w_x & 0 \end{bmatrix}, \quad \text{Eq. (32)}$$

$$w := \begin{bmatrix} w_x \\ w_y \\ w_z \end{bmatrix}$$

The angular acceleration around the center of gravity is given by:

$$\dot{w} = J^{-1}[-w \times Jw + o_1] \quad \text{Eq. (33)}$$

with J being the moment of inertia matrix reference to the center of mass along the body axes of the quadrotor. If $R_B^I$ $(R_I^B)^{-1}$ denotes the transformation from the body to the inertial frame, the rotational velocity of the quadrotor's fixed body frame with respect to the inertial frame can be given by $\dot{R}_B^I = \hat{w} R_B^I$.

A point-mass model can be used for the position dynamics. The accelerations of the quadrotor's point-mass in the inertial frame, $\ddot{p}_I$, are given by:

$$\ddot{p}_I = R_B^I \begin{bmatrix} 0 & 0 & -\frac{T}{m} \end{bmatrix}^T + \begin{bmatrix} 0 & 0 & g \end{bmatrix}^T \quad \text{Eq. (34)}$$

where two forces are applied, gravity in the z direction in the inertial frame is given by $F_G = mg$, and T is the thrust in the negative z direction in the quadrotor body-frame.

With regard to attitude control, an approach may be followed that involves directly converting differences of rotation matrices into body angular rates. A desired force setpoint, $\bar{F}$, and a desired yaw angle, $\psi$, given by a high-level controller are transformed to a desired rotation matrix $\bar{R} = [\bar{e}_x, \bar{e}_y, \bar{e}_z]$ with $$\bar{e}_z = \frac{\bar{F}}{\|\bar{F}\|}, \quad \bar{e}_y = \frac{\bar{x}_\psi \times \bar{e}_z}{\|\bar{x}_\psi \times \bar{e}_z\|}, \quad \bar{e}_x = \bar{e}_y \times \bar{e}_z \quad \text{Eq. (35)}$$

and $\bar{x}_\psi = [\cos \psi, \sin \psi, 0]^T$ is a vector pointing in the desired yaw direction. The desired body angular rates can then be controlled with a standard PD controller and given by:

$$\bar{w} = f\left(\frac{1}{2}(\bar{R}_I^B \hat{R}_B^I - \hat{R}_I^B \bar{R}_B^I)\right) \quad \text{Eq. (36)}$$

where $\hat{R}^{**}$ indicates the estimated rotation matrices.

Now, with regard to position control, according to the double integrator dynamics of Eq. (34), the discrete LTI model can be written as:

$$X_{k+1} = A_\chi k + B_u, \quad y = C_\chi k \quad \text{Eq. (37)}$$

with state vector $\chi:=[p_x, v_x, p_y, v_y, p_z, v_z]^T$, input vector $\rho=[F_x, F_y, F_z]^T$, and system matrices given as:

$$A := I_3 \oplus \begin{bmatrix} 1 & dt \\ 0 & 1 \end{bmatrix}, B := I_3 \oplus \begin{bmatrix} st \\ dt \end{bmatrix}, C := I_3 \oplus [1 \ 0]$$

with I being the identity matrix, $$st = \frac{1}{2}dt^2,$$

and $\oplus$ being the Kronecker product. To have an integral action for the LQR controller, the system given in Eq. (37) is augmented to the discrete LTI system:

$$\tilde{X} := \begin{bmatrix} X \\ q \end{bmatrix}, \tilde{A} := \begin{bmatrix} A & 0 \\ C & I \end{bmatrix}, \tilde{B} := \begin{bmatrix} B \\ 0 \end{bmatrix}, \tilde{C} = [C \ 0]$$

The control input, $\rho$, is then given with the state feedback law $\rho = -K_{\tilde{X}}$ with K being the solution to the Discrete Algebraic Riccati equation (DARE) with state and input cost matrices.

With regard to motion primitives, a point-mass M-order integrator model can be used or considered, decoupled in each component:

$$q^{(M+1)}(\tilde{t}) = v \qquad \text{Eq. (38)}$$

Then, one can let $v \in \mathbb{R}^3$ be piecewise continuous and $(.)^{(M+1)}$ represent the derivative of order M+1 with respect to time. The resulting solution $q(\tilde{t})$ is $C^M$ differentiable at the initial point. For M>0 the state feedback control law is given by:

$$v(\tilde{t}) = -a_M q^{(M)} - \ldots -a_2 \ddot{q} + a_1(u-\dot{q}) + a_0(p^k + u\tilde{t} - q) \qquad \text{Eq. (39)}$$

It has been shown that the under-actuated model of a quadrotor can be written as a differentially flat system, with its trajectory parameterized by its position and yaw angle and their derivatives up to forth degree in position and second degree in yaw angle. In the following, the yaw angle is considered constant. Although the method presented herein extends to M=4, in order to simplify the formulations given the difficulty of accurately estimating the high order derivatives and their marginal effect, only continuity in acceleration (M=2) is imposed in the following discussion. For M=2 (continuity in initial acceleration), the motion primitive is:

$$q(\tilde{t}) = p^k + u\tilde{t} + Fe^{-w_1\tilde{t}} + ((\dot{p}^k - u + (w_1 - w_0)F)\tilde{t} - F)e^{-w_0\tilde{t}} \qquad \text{Eq. (40)}$$

with $F = (\ddot{p}^k + 2w_0(\dot{p}^k - v\infty))/(w_0 - w_1)^2$ and $w_0, w_1$ being design parameters related to the decay of the initial velocity and acceleration, which can potentially be different for each of the three axes.

Figure 18:
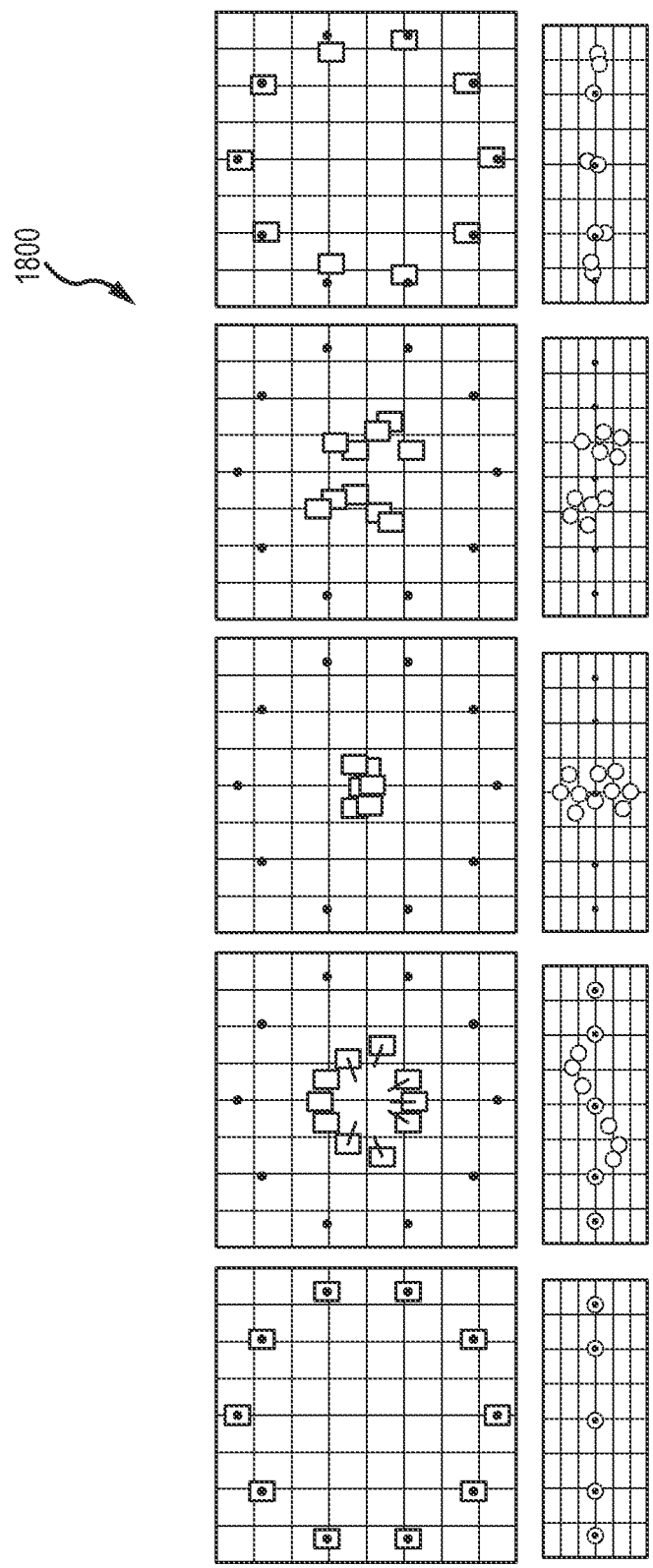
FIG. 18 is a graph of a simulation of position exchange for ten quadrotor helicopters using the control methods taught herein.

At this point in the discussion, it may be useful to describe results of experiments performed by the inventors with the shared control method of aerial vehicles. Particularly, experiments were performed both in simulation and with physical quadrotors. Simulation utilized a model of the dynamics and enabled experiments for larger groups of vehicles. As an example, FIG. 18 illustrates with graph 1800 position exchange for ten quadrotors in a simulation. The top of graph 1800 shows a horizontal (x-y) view and the bottom of graph 1800 shows a vertical (x-z) view. Vehicle position is depicted for timestamps 0 s:4 s:6 s:8 s:12 s in an arena of size 8 m by 4 m by 8 m. Convergence to the goal configuration was achieved in about 15 seconds in this simulation. All other results provided herein are for physical quadrotor helicopters.

The experimental space utilized was a rectangular space that was approximately 5 m by 5.5 m by 2 m in height. Quadrotor position was measured by an external motion tracking system running at 250 Hz. Each vehicle was modeled with the following parameters: $w_0=3, w_1=3.5, r_i=0.35$ m, $h_i=0.5$ m, $v_{max}=2$ m/s, $a_{max}=2$ m/s$^2$, $\in=0.1$ m, and $\tau=3$ s. The control system 1700 was used to control the quadrotors. A low-level attitude estimator and controller were run on each quadrotor's IMU, and the quadrotor was abstracted as a point-mass for the position controller. The position controller was run on a real-time computer and communication between the real-time computer and the quadrotor was done with a 50 Hz UART bridge. The overlying collision avoidance was run in a normal operating system environment and sent a collision-free optimal reference trajectory to the position controller over a communication channel. The position controller ensured that the quadrotors stayed on their local trajectories as computed by the collision avoidance algorithm. This hard real-time control structure ensured the stability of the overall system and kept the quadrotors on given position references.

Figure 19:
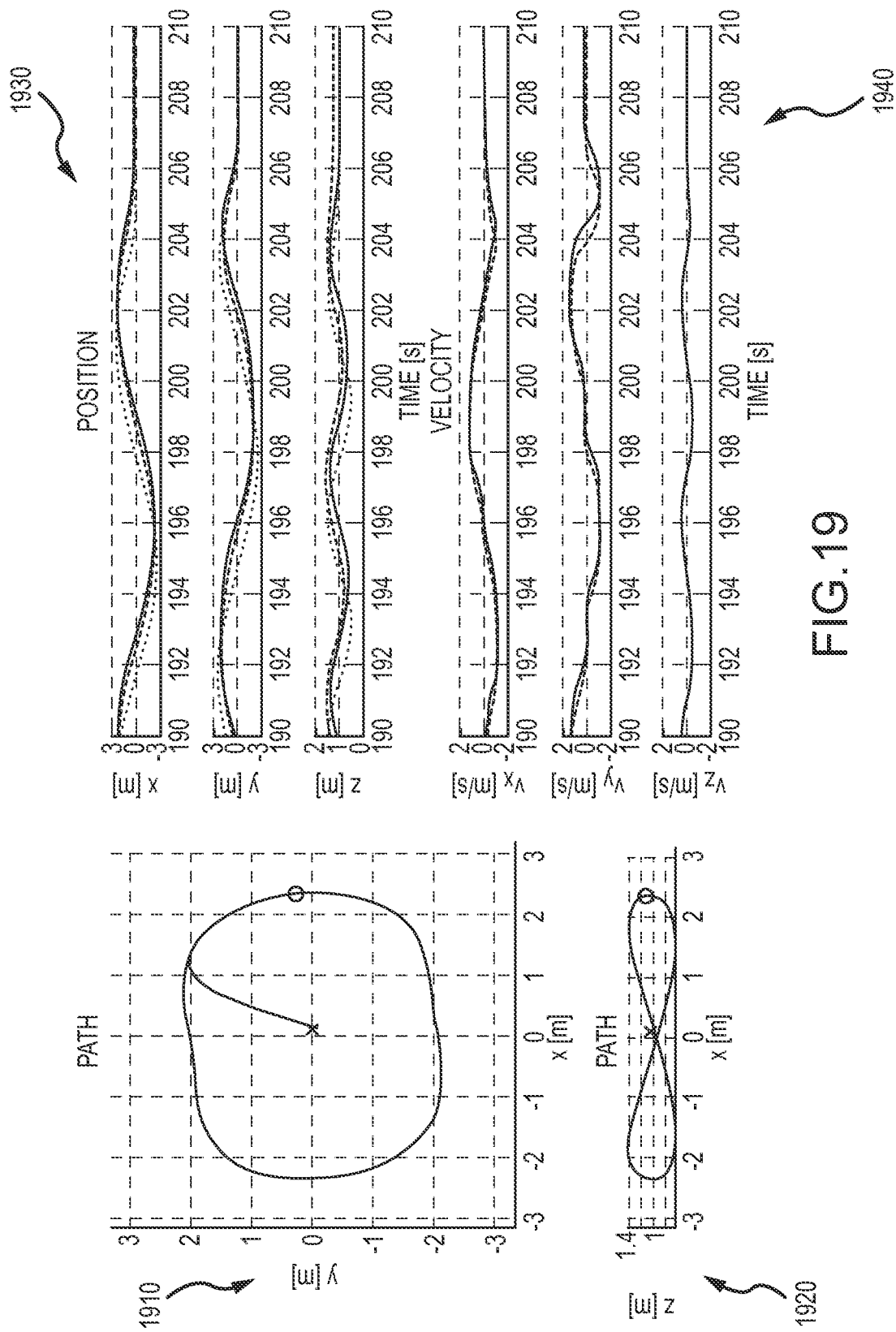
FIG. 19 is a set of graphs showing results of an experiment a single quadrotor.

The benchmark performance of the system was evaluated for a single quadrotor running the full framework, including local planning in which continuity up to acceleration was imposed. FIG. 19 illustrates with graphs 1910, 1920, 1930, and 1940 a single quadrotor tracking a circular motion given by a sinusoid reference signal in all three position components. FIG. 19 shows with graph 1910 the projection of the position p of the quadrotor onto the horizontal plane and shows with graph 1920 the projection onto a vertical plane. The reference circular motion is infeasible due to the space limitation of the experiment room, but the local planning successfully avoided colliding with the walls causing the flattened edges in the y component. The graph 1930 shows each component of the position p with respect to time as a continuous line, while the point-mass local trajectory q is shown by a dashed line. Good tracking performance was observed, although with a small delay due to unmodeled system delays and higher order dynamics. A steady-state error is further observed due to the use of an LQR controller without integral part in the experiments. Steady-state error is greatest in the vertical component, as a thrust calibration is not performed before flight, and its value varies from quadrotor to quadrotor. To handle steady state error, continuity s imposed in the local trajectory instead of on the real state of the quadrotor. This approach adapts well to poorly calibrated systems, like the one used in the experiments.

FIG. 19 in graph 1940 shows the measured velocity v of the quadrotor as a continuous line and the velocity of its point-mass local trajectory as a dashed line with respect to time. Good tracking performance was observed, although the delay was more apparent, especially for abrupt changes in velocity, which may be partially due to the unmodeled high-order dynamics of the quadrotor. The smoothness of the velocity profile can be adjusted by the parameters $w_0$ and $w_1$ in Eq. (40), which can be tuned for overall good performance.

Position swaps were performed with sets of two and four quadrotors, with about fifty transitions to different goal configurations (both antipodal and random). The centralized algorithm (Algorithm 1) and the distributed algorithm (Algorithm 2) were both tested, with the three different linearization options for the collision avoidance constraints described above. The joint MIQP optimization (Algorithm 3) was also tested, but it proved too slow for real-time performance at 10 Hz in the experimental implementation. However, in simulation, this approach provided good results.

Figure 20:
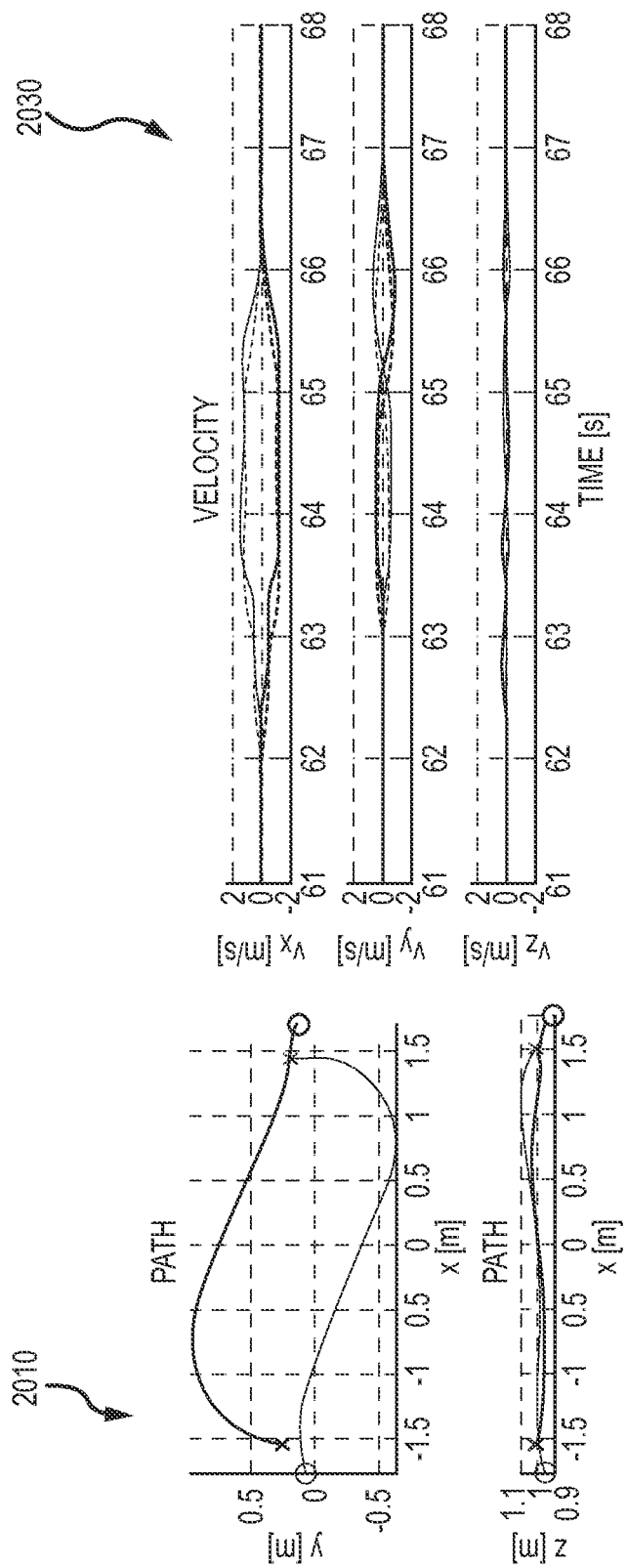
FIG. 20 is a set of graphs showing results of an exchange of two quadrotors in an experiment performed by the inventors.

FIG. 20 shows a representative position exchange for two quadrotors. In graphs 2010 and 2020, FIG. 20 shows the projection of their paths on the horizontal and vertical planes. The slight change in height is due to the dynamics of the quadrotors. FIG. 20 in graph 2030 shows the velocity profile for both quadrotors. The preferred speed of the quadrotors is 2 m/s, and the position exchange takes a few seconds. Very similar performance was obtained in the distributed and centralized cases and with the different linearization options.

Figure 21:
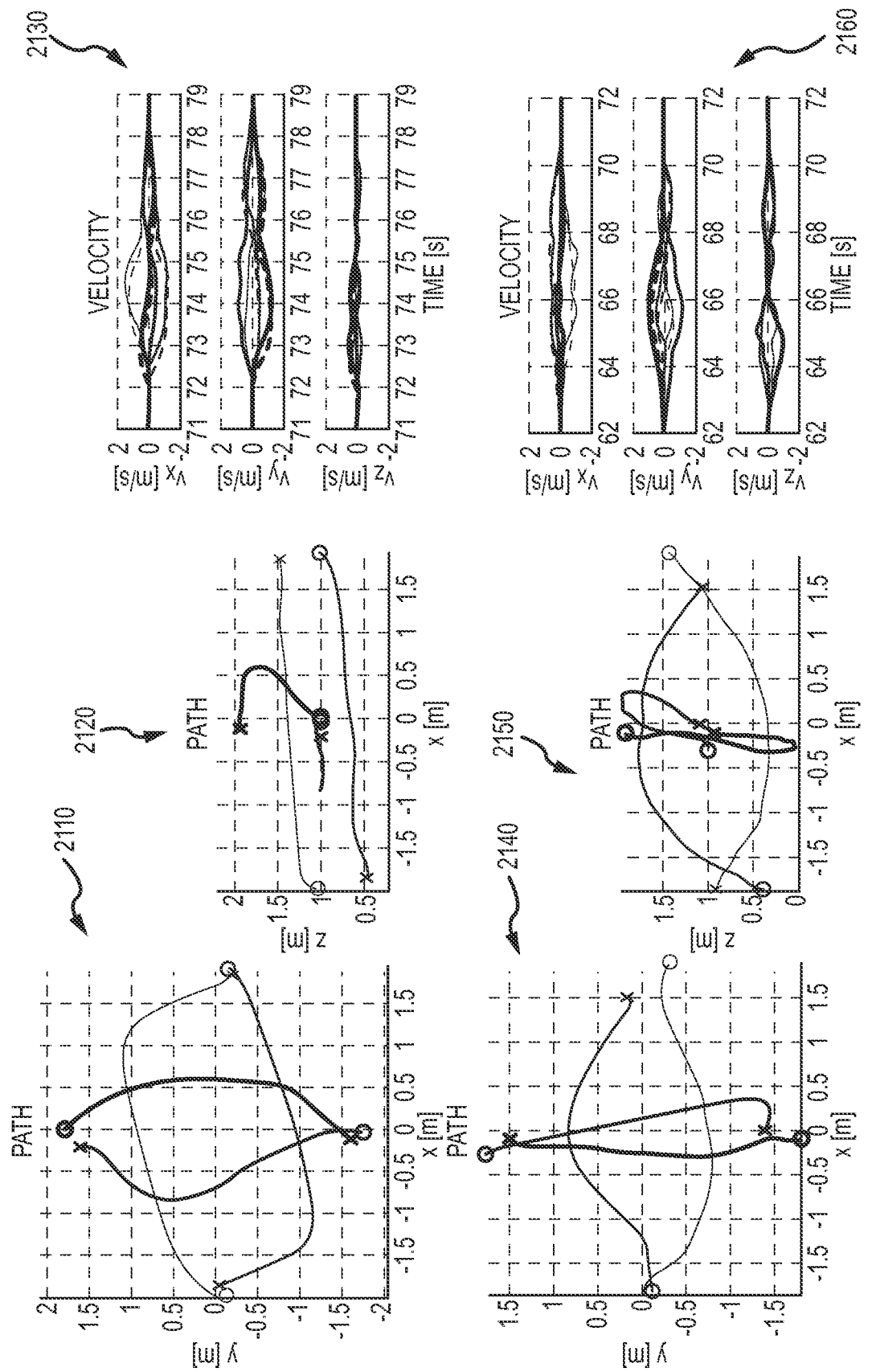
FIG. 21 is a set of graphs showing results of control experiments using four quadrotor helicopters as the aerial vehicles and using two differing linearization strategies.

Two experiments were performed in which four quadrotors were transitioned to antipodal positions while also changing height. Two different linearization strategies were employed, with one being the imposition of avoidance and with one being a case when collision avoidance constraints are linearized with respect to the measured velocity. FIG. 21 with graphs 2110, 2120, 2130, 2140, 2150, and 2160 the results these two experiments. Graphs 2110, 2120, and 2130 illustrate results of use of the first linearization strategy while graphs 2140, 2150, and 2160 illustrate results of use of the second linearization strategy. Graphs 2110, 2120, 2140, and 2150 show the projection of the position of all quadrotors onto the horizontal plane and a vertical plane. Graphs 2130 and 2160 show the velocity profile for all quadrotors. The preferred speed was 2 m/s, and the dimensions of the experiment room (fly space) only allowed the quadrotors to fly at a height between 0 and 2 meters. The position exchanges were collision free due in part to the local planning algorithm even for this more complex case in which the preferred velocity always points towards the goal positions and, therefore, is not collision free.

For the case when avoidance to the right was imposed, the behavior was highly predictable and smooth, with the rotation of all vehicles to one side being imposed in the linearization. This shows the control method provided good results both in the centralized case and the distributed case. Although this characteristic is effective for cases of symmetry, in arbitrary configuration, it can lead to longer trajectories. For the case of linearization with respect to the current velocity, the behavior can be different for different runs and emerges from non-deterministic characteristics of the motion. It was observed that in this particular example that two quadrotors chose to pass over each other using the control method. Although this linearization option presents very good performance in not too crowded environments, its performance may degrade in the case of high symmetry and very crowded scenarios (for example, due to disagreements in avoidance side especially in the distributed case).

Now, it may be useful to discuss the results of experiments performed to test the method for trajectory tracking, e.g., in the case of a moving goal. Two representative scenarios are described, and vertical motion is not displayed in the results because, without loss of generality, motion was approximately in a horizontal plane. FIG. 22 illustrates with graphs 2210, 2220, and 2230 the results of an experiment in which two quadrotors were tracking intersecting trajectories while avoiding collision locally. One quadrotor followed a circular motion (see line 2211) and one followed a diagonal motion (see line 2213 such that there are two intersection points in position and time. The one following a circular motion finally transitioned to a rest position. In graph 2210, FIG. 22 shows that both controlled quadrotors often deviate from their ideal trajectories in order to avoid collision. In graphs 2220 and 2230, the velocity plot shows that no deadlock appeared and both quadrotors were moving at a velocity of about 1.5 m/s except towards the end of the experiment where the quadrotor following a circular motion approached a static goal position. The trajectory for the other quadrotor then becomes feasible, and it is well tracked as shown by the velocity values after about 100 seconds.

FIG. 23 with graphs 2310 and 2320 shows the results of control experiments in which two quadrotors were tracking non-colliding circular trajectories with 180 degrees phase shift while a human (see line 2311) moved in the arena (test flying space). The human was considered as a dynamic obstacle. The two quadrotors avoided collisions locally while tracking, as closely as possible, their ideal trajectories. Graph 2310 shows the trajectories, and graph 2320 shows the measured velocity for all agents. No collision or deadlock was observed in the experiment, although in some cases a quadrotor had to stop as the optimization became infeasible. In this experiment, the human moved at a speed similar to that of the quadrotors (<2 m/s) and was slightly predictable in movements, due to a constant velocity assumption of the experiment.

At this point in the description, it may be useful to provide a discussion of the overall behavior of the control techniques over all the performed experiments based on statistics collected and processed by the inventors. Deadlock was not observed in the experiments, but it is possible from a theoretical standpoint and can occur either due to a stop condition being the optimal solution with respect to the optimization objective or due to the optimization problem being infeasible. The optimization can be infeasible for two main reasons: (1) for experimental reasons such as the unmodeled high-order dynamics of the vehicle and other uncalibrated parameters such as delays and (2) for reasons inherent in the method (and the trade-off between richness of planning versus low computational time) such as the limited horizon of the local planning or the convexification of the optimization via the linearization of the collision avoidance constraint.

The local planning optimization, which was computed at 10 Hz, was infeasible in under nine percent of the of the cumulated time steps over all experiments (over 40,000 data points at 10 Hz over more than 50 experimental runs). On encountering this condition, the speed of the quadrotor is reduced at a higher than normal rate following Eq. (28), and the quadrotor can, if necessary, be brought to a halt before a collision due to the finite local planning horizon. In all cases, due to the reduction in speed, the optimization became feasible after a further one or more time steps, e.g., below 0.5 seconds.

Figure 24:
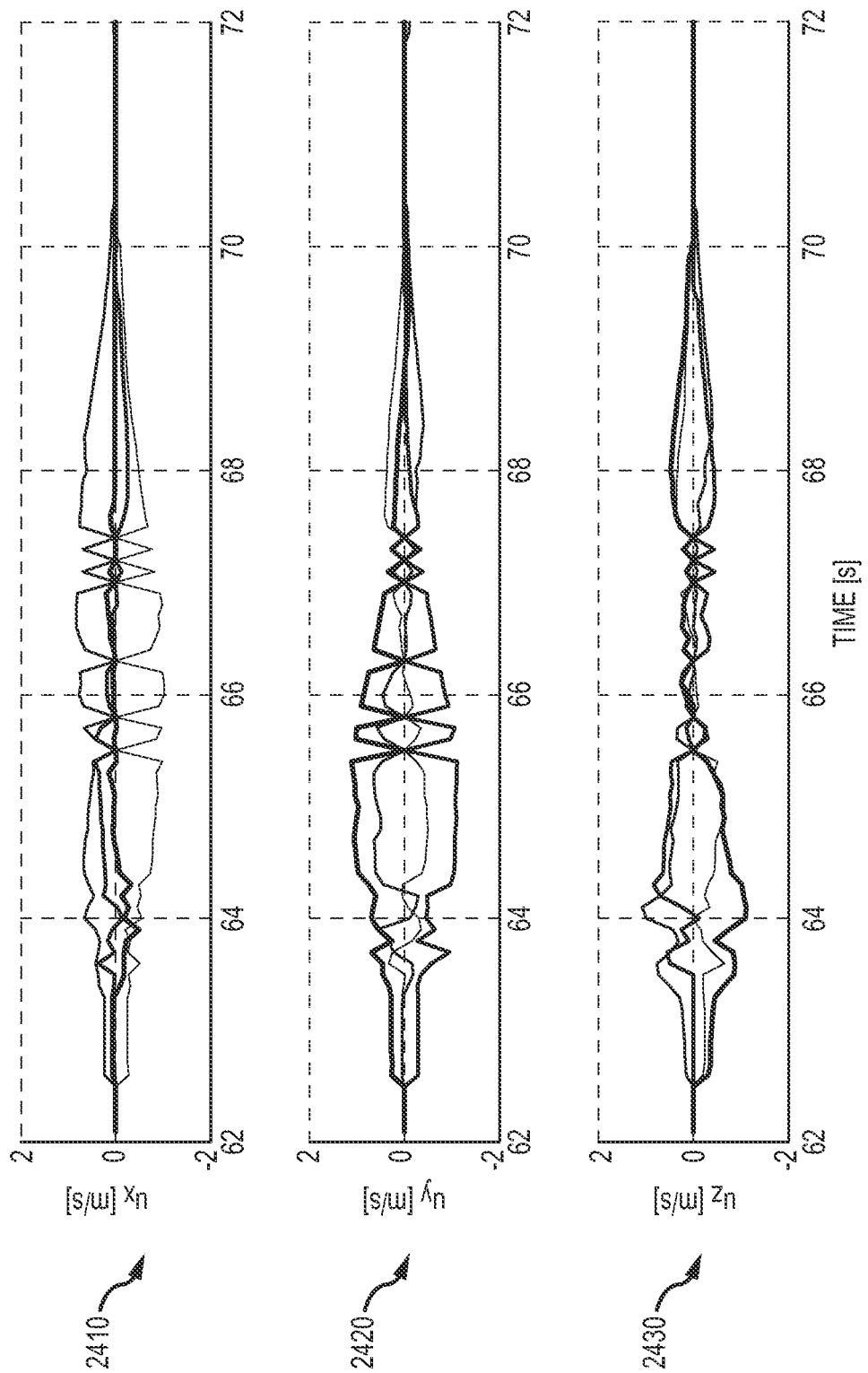
FIG. 24 provides graphs showing optimal reference velocity for an experiment, see FIG. 21, using four quadrotors.

FIG. 24 illustrates with graphs 2410, 2420, and 2430 optimal reference velocity, u*, resulting from the optimization with respect to time for one of the experiments with four quadrotors. Six instances in which the optimization is infeasible are observed between the times 65 seconds and 68 seconds. These are points where the optimal reference velocity becomes zero before the quadrotors have converged to their goal positions. The effect of these infeasible time steps is to slow down the quadrotors, which in turn has the effect of rendering the local planning feasible in subsequent time steps. This extreme situation was mostly not observed in experiments with only two quadrotors.

Figure 25:
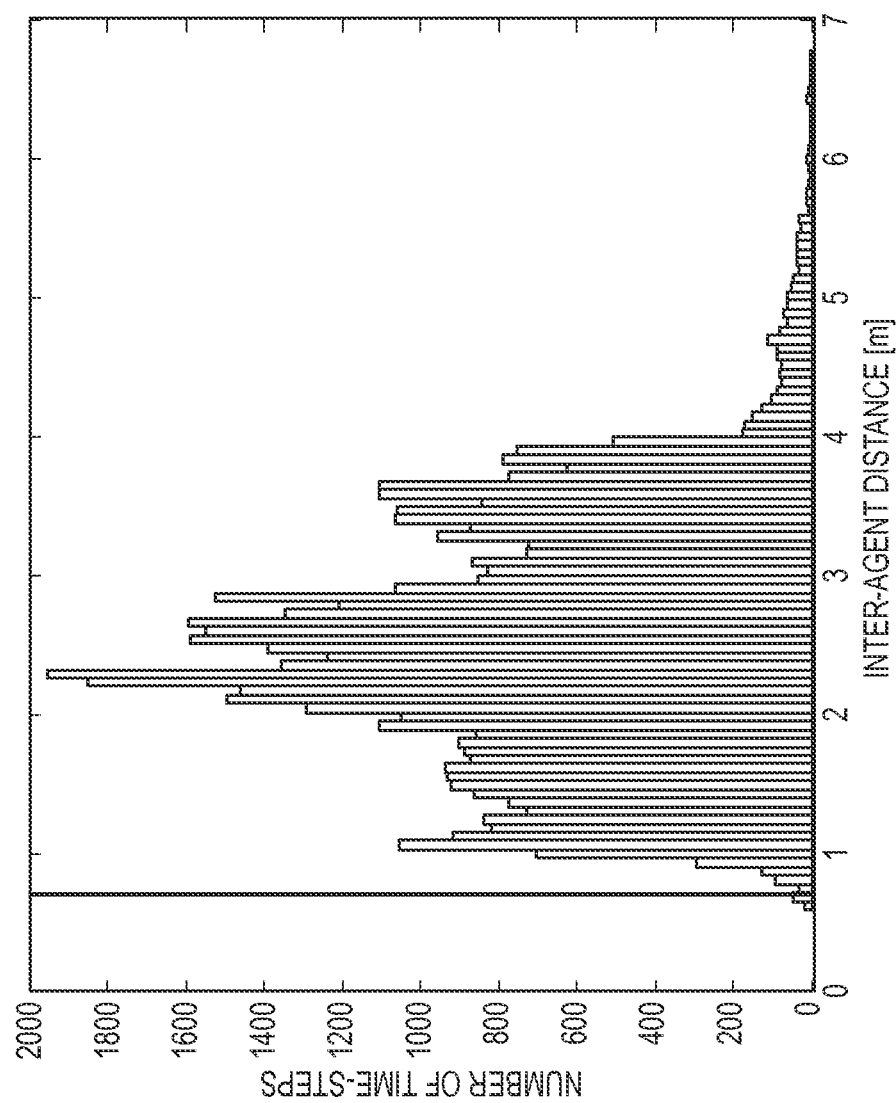
FIG. 25 illustrates a histogram of distance between all agents accumulated over a plurality of run experiments.

FIG. 25 illustrates a histogram 2500 showing statistics accumulated for the inter-agent distance over the experiments run by the inventors with quadrotor helicopters as the controlled aerial vehicles in a fly space (or 3D space). There is a step decrease in the number of data points with distance below one meter. This is due to the fact that the quadrotors used in the experiment were considered to have a radius of 0.35 meters enlarged by $\in = 0.1$ meters to account for the dynamics, which can decrease towards zero when in close proximity. Note, a few data points appear to be in collision (<0.7 meters), which can happen in cases where the optimization becomes infeasible especially when a human/dynamic obstacle is moving through the test fly or 3D space. In the fully controlled case, no collision was visually observed and all situations were successfully resolved. In the case with a human present, the quadrotor halted before a collision in a few cases, and this happened, for example, when the velocity estimation is inaccurate or the human moves too fast or with an abrupt change in direction.

With regard to evaluation of the algorithm, good performance was observed throughout the experiments especially for the centralized convex optimization. The distributed optimization performs well in simulation and in experiments with two quadrotors. If the collision avoidance constraints are linearized with respect to the current velocity, the distributed approach suffers from inaccuracies in the velocity estimation, which can lead to performance degradation due to disagreements in the linearization. The centralized, non-convex optimization performs well in simulation but may be too slow in some cases for real-time control/performance.

In support of the above discussion, it may be useful to provide equations or pseudocode used for determining repulsive velocity with the controller modules of the present shared control system. For the repulsive velocity field of FIG. 14, the repulsive velocity for agent $i \in A$ is given by:

```
for j = 1 : m, j ≠ i do
    if p_ij^H < r_i + r_j and |p_ij^3| < (h_i + h_j + D_h) then
```
$$u_{ij}^3 = V_r \left( \frac{r_i + r_j - p_{ij}^H}{r_i + r_j} \right) \left( \frac{h_i + h_j + D_h - |p_{ij}^3 - p_i^3|}{D_h} \right) \frac{p_{ji}^3}{|p_{ij}^3|}$$
```
    end if
    if p_ij^H < r_i + r_j + D_r and |p_ij^3| < (h_i + h_j) then
```
$$\overset{\circ}{u}_{ij}^H = V_r \left( \frac{h_i + h_j - |p_{ij}^3|}{h_i + h_j} \right) \left( \frac{r_i + r_j + D_r - p_{ij}^H}{D_r} \right) \frac{p_{ji}^H}{p_{ji}^H}$$
```
    end if
end for
```
$$\overset{\circ}{u}_i := \Sigma_{j=1}^m \overset{\circ}{u}_{ij}; \quad \overset{\circ}{u}_i = \min \left( \frac{V_r}{\|\overset{\circ}{u}_i\|}, 1 \right) \overset{\circ}{u}_i$$

where $V_r$ is the maximum repulsive force and $D_r$, and $D_h$ are the preferred minimal inter-agent distances in the X-Y plane and the Z component, respectively.

```
if p_ij^H > r_ij then
    α = atan2(p_ij^H), α_n = acos(r_ij/p_ij^H)
    if |p_ij^3| > h_ij then
```
$$\alpha_1 = \operatorname{atan}\left( \frac{p_{ij}^3 + h_{ij}}{p_{ij}^H - \operatorname{sign}(p_{ij}^3)r_{ij}} - \frac{\pi}{2} \right)$$

$$\alpha_2 = \operatorname{atan}\left( \frac{p_{ij}^3 - h_{ij}}{p_{ij}^H + \operatorname{sign}(p_{ij}^3)r_{ij}} + \frac{\pi}{2} \right)$$

```
    O = [p_ij^H - r_ij, p_ij^3 - sign(p_ij^3)h_ij]
    else
```
$$\alpha_1 = \operatorname{atan}\left( \frac{p_{ij}^3 + \operatorname{sign}(p_{ij}^3)h_{ij}}{p_{ij}^H - r_{ij}} - \operatorname{sign}(p_{ij}^3)\frac{\pi}{2} \right)$$

$$\alpha_2 = \operatorname{atan}\left( \frac{p_{ij}^3 - \operatorname{sign}(p_{ij}^3)h_{ij}}{p_{ij}^H - r_{ij}} + \operatorname{sign}(p_{ij}^3)\frac{\pi}{2} \right)$$

```
    O = [p_ij^H - r_ij, 0]
end if
α_O = atan2(O)
n_ij^1 = [cos(α - α_n), sin(α - α_n), 0]
n_ij^2 = [cos(α + α_n), sin(α + α_n), 0]
n_ij^3 = [p_ij^H cos(α_1)/p_ij^H, sin(α_1)]
n_ij^4 = [p_ij^H cos(α_2)/p_ij^H, sin(α_2)]
n_ij^5 = [p_ij^H cos(α_O)/p_ij^H, sin(α_O)]
c_ij^1 = c_ij^2 = c_ij^3 = c_ij^4 = 0; c_ij^5 = ||O||/τ
else if |p_ij^3| > h_ij then
```

$$\alpha = \operatorname{atan2}(p_{ij}^H), \quad \beta = \operatorname{atan}\left( \frac{|p_{ij}^3| - h_{ij}}{r_{ij}} \right)$$

$$\alpha_1 = \frac{\pi}{2} - \operatorname{atan}\left( \frac{|p_{ij}^3| - h_{ij}}{r_{ij} - p_{ij}^H} \right)$$

$$\alpha_2 = \frac{\pi}{2} - \operatorname{atan}\left( \frac{|p_{ij}^3| - h_{ij}}{r_{ij} + p_{ij}^H} \right)$$

```
n_ij^1 = [cos α cos α_1, sin α cos α_1, sin α_1]
n_ij^2 = [cos α cos α_2, sin α cos α_2, sin α_2]
```
$$n_{ij}^3 = \left[\cos\left(\alpha + \frac{\pi}{2}\right)\sin\beta, \sin\left(\alpha + \frac{\pi}{2}\right)\sin\beta, \cos\beta\right]$$

$$n_{ij}^4 = \left[-\cos\left(\alpha + \frac{\pi}{2}\right)\sin\beta, -\sin\left(\alpha + \frac{\pi}{2}\right)\sin\beta, \cos\beta\right]$$

```
n_ij^5 = [0, 0, 1]
c_ij^1 = c_ij^2 = c_ij^3 = c_ij^4 = 0; c_ij^5 = (|p_ij^3| - h_ij)/τ
if p_ij^3 < 0 then
    n_ij^s[3] = -n_ij^s[3] ∀s
end if
else
Agents i and j are in collision
n_ij^7 = p_ij/p_ij
c_ij^7 = -(r_ij - p_ij^H + h_ij - |p_ij^3 - p_i^3|)/τ
end if
``` where $H_{ij}^1$ and $H_{ij}^2$ represent avoidance to the right/left, $H_{ij}^3$ and $H_{ij}^4$ above/below and $H_{ij}^5$ represents a head-on maneuver, which remains collision-free up to $t=\tau$.

The reader may also benefit from being aware of the equations for linearization of VO utilized in one implementation of the control system by the inventors. One can denote $h_{ij}=h_i+h_j$ and $r_{ij}=r_i+r_j$. The non-convex constraint $\mathbb{R}^3 \setminus VO_{ij}^T$ is linearized to obtain a convex problem. For an approximation with five linear constraints, as in FIG. 16, the linear constraints are given by:

```
if p_ij^H > r_ij then
    α = atan2(p_ij^H), α_n = acos(r_ij/p_ij^H)
    if |p_ij^3| > h_ij then
```
$$\alpha_1 = \operatorname{atan}\left( \frac{p_{ij}^3 + h_{ij}}{p_{ij}^H - \operatorname{sign}(p_{ij}^3)r_{ij}} - \frac{\pi}{2} \right)$$

$$\alpha_2 = \operatorname{atan}\left( \frac{p_{ij}^3 - h_{ij}}{p_{ij}^H + \operatorname{sign}(p_{ij}^3)r_{ij}} + \frac{\pi}{2} \right)$$

```
    O = [p_ij^H - r_ij, p_ij^3 - sign(p_ij^3)h_ij]
else
```
$$\alpha_1 = \operatorname{atan}\left( \frac{p_{ij}^3 + \operatorname{sign}(p_{ij}^3)h_{ij}}{p_{ij}^H - r_{ij}} - \operatorname{sign}(p_{ij}^3)\frac{\pi}{2} \right)$$

$$\alpha_2 = \operatorname{atan}\left( \frac{p_{ij}^3 - \operatorname{sign}(p_{ij}^3)h_{ij}}{p_{ij}^H - r_{ij}} + \operatorname{sign}(p_{ij}^3)\frac{\pi}{2} \right)$$

```
    O = [p_ij^H - r_ij, 0]
end if
α_O = atan2(O)
n_ij^1 = [cos(α - α_n), sin(α - α_n), 0]
n_ij^2 = [cos(α + α_n), sin(α + α_n), 0]
n_ij^3 = [p_ij^H cos(α_1)/p_ij^H, sin(α_1)]
n_ij^4 = [p_ij^H cos(α_2)/p_ij^H, sin(α_2)]
n_ij^5 = [p_ij^H cos(α_O)/p_ij^H, sin(α_O)]
c_ij^1 = c_ij^2 = c_ij^3 = c_ij^4 = 0; c_ij^5 = ||O||/τ
else if |p_ij^3| > h_ij then
```

$$\alpha = \operatorname{atan2}(p_{ij}^H), \quad \beta = \operatorname{atan}\left( \frac{|p_{ij}^3| - h_{ij}}{r_{ij}} \right)$$

$$\alpha_1 = \frac{\pi}{2} - \operatorname{atan}\left( \frac{|p_{ij}^3| - h_{ij}}{r_{ij} - p_{ij}^H} \right)$$

$$\alpha_2 = \frac{\pi}{2} - \operatorname{atan}\left( \frac{|p_{ij}^3| - h_{ij}}{r_{ij} + p_{ij}^H} \right)$$

-continued $$n_{ij}^1 = [\cos\alpha\cos\alpha_1, \sin\alpha\cos\alpha_1, \sin\alpha_1]$$
$$n_{ij}^2 = [\cos\alpha\cos\alpha_2, \sin\alpha\cos\alpha_2, \sin\alpha_2]$$
$$n_{ij}^3 = \left[\cos\left(\alpha+\frac{\pi}{2}\right)\sin\beta, \sin\left(\alpha+\frac{\pi}{2}\right)\sin\beta, \cos\beta\right]$$
$$n_{ij}^4 = \left[-\cos\left(\alpha+\frac{\pi}{2}\right)\sin\beta, -\sin\left(\alpha+\frac{\pi}{2}\right)\sin\beta, \cos\beta\right]$$
$$n_{ij}^5 = [0, 0, 1]$$
$$c_{ij}^1 = c_{ij}^2 = c_{ij}^3 = c_{ij}^4 = 0; c_{ij}^5 = (|p_{ij}^3| - h_{ij})/\tau$$
if $p_{ij}^3 < 0$ then
   $n_{ij}^s[3] = -n_{ij}^s[3]$ ∀s
end if
else
   Agents i and j are in collision
   $n_{ij}^1 = p_{ij}/p_{ij}$
   $c_{ij}^1 = -(r_{ij} - p_{ij}^H + h_{ij} - |p_j^3 - p_i^3|)/\tau$
end if where $H_{ij}^1$ and $H_{ij}^2$ represent avoidance to the right/left, $H_{ij}^3$ and $H_{ij}^4$ represent avoidance above/below, and $H_{ij}^5$ represents a head-on maneuver, which remains collision-free up to $t=\tau$.

Control systems, such as system 100 of FIG. 1, and shared control methods, such as the method 300 of FIG. 3, can be used and/or expanded to provide cooperative collision avoidance among decision-making agents (or vehicles such as wheeled and/or other terrestrial or ground-based vehicles). These control systems and methods may apply to collision-free navigation among heterogeneous groups of decision-making agents. The following paragraphs and discussion highlights several contributions provided by the inventors including: (1) arbitrary kinematic model and dynamic constraints; (2) convex and non-convex, centralized and distributed algorithms for collision avoidance; (3) a novel extension to truly cooperative distributed collision avoidance where a prediction over future velocities of the neighboring agents can be taken into account in the computation of the velocity partition; and (4) extensive experimental evaluation of the proposed algorithms including different robot kinematics (e.g., small differentially driven robots, car-like robots, robotic wheelchairs, and boats). Although the following description generally focuses on vehicles/agents navigating in 2D space, the control methods can be used for aerial vehicles navigating in 3D space.

Throughout the following paragraphs, x denotes scalars, x vectors, M matrices, and X sets. The Minkowsky sum of two sets is denoted by $X \oplus y$ and $x=\|x\|$ denotes the Euclidean norm of vector x. The super index $*^k$ indicates the value at time $t^k$ and $\tilde{t}=t-t^k$ the appropriate relative time. Subindex $*_i$ indicates agent i, and relative vectors are denoted by $x_{ij}=x_i-x_j$. For ease of exposition, no distinction is made between estimated and real states.

The control problem can be stated as a group of n agents freely moving in 2D space for which shared control is required or desired. For each agent i, $p_i \in \mathbb{R}^3$ denotes its position, $v_i=\dot{p}_i$ its velocity, and $a_i=\ddot{p}_i$ its acceleration. The shape of each agent is modeled by an enveloping circle of radius $r_i$, centered at the agent's position $p_i$, and denoted by $D(p_i, r_i)$. One goal of the control method is to compute for each agent, at high frequency (e.g., 10 Hz), a local motion that respects the kinematics and dynamic constraints of the ego agent and that is collision free with respect to neighboring agents for a short time horizon (typically, 2 to 5 seconds or the like), and the problem may be labeled simply as "collision avoidance." As discussed above, centralized and distributed scenarios can be considered and addressed with local motion planning using the same terminology (e.g., global trajectory, preferred velocity, local trajectory, candidate local trajectory, candidate trajectory, and optimal reference trajectory) as discussed with reference to FIGS. 13A and 13B.

With regard to definition of candidate local trajectories, each candidate is that of an omnidirectional agent moving at a constant velocity, u, and starting at the current location, $p^k$, of the agent:

$$p_{ref}(\tilde{t})=p^k+u(t-t^k), t \in [t^k, \infty)$$     Eq. (41)

A trajectory tracking controller, respecting the kinematics and dynamic constraints of the agent, $\dot{p}(\tilde{t})=f(z^k, u, \tilde{t})$ is considered that is continuous in the initial state $z^k=[p^k, \dot{p}^k, \ddot{p}^k, \ldots]$ of the agent and converging to the candidate reference trajectory. This defines the candidate local trajectories given by $p(\tilde{t})$ and a bijective mapping from candidate reference velocities u.

Figure 26:
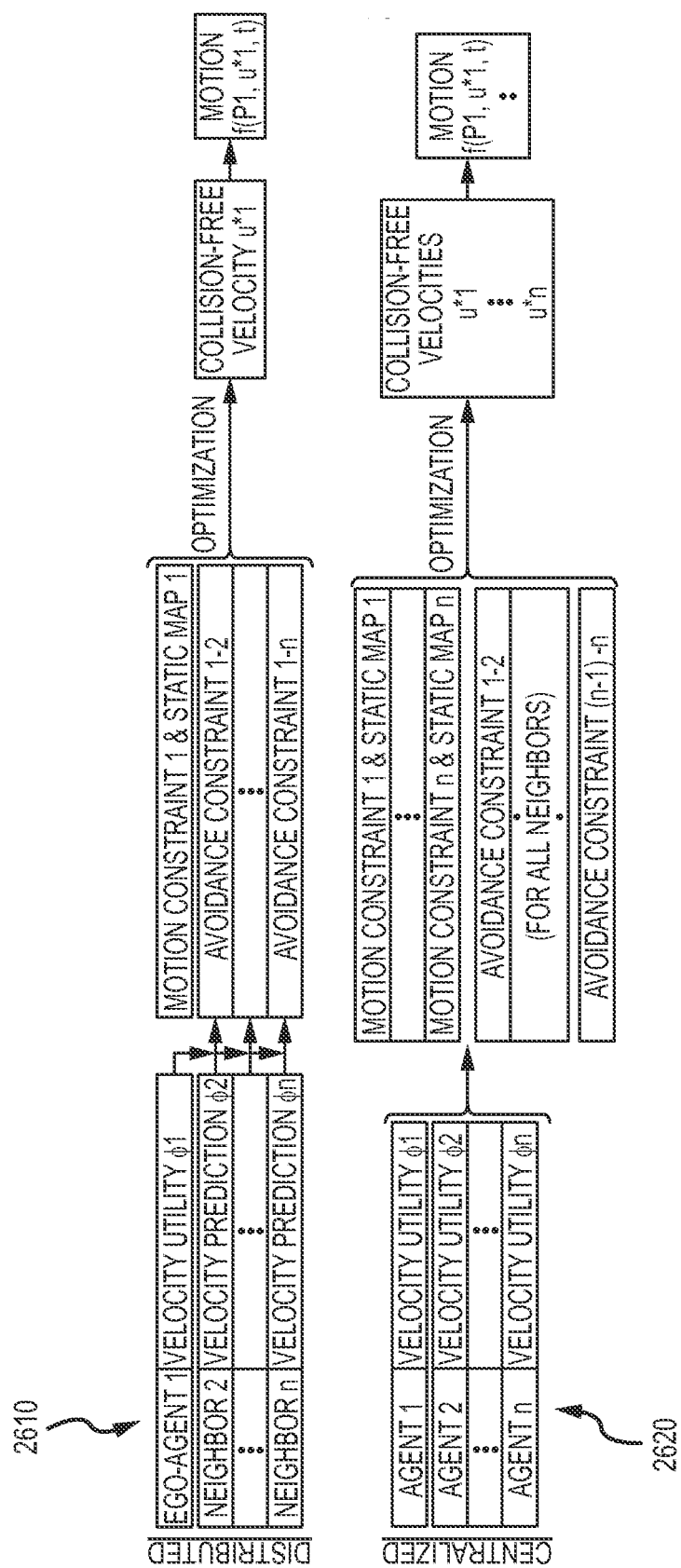
FIG. 26 illustrates distributed and centralized approaches to local motion planning to provide cooperative collision avoidance among decision-making agents.

One focus of the inventors' work is on local motion planning using a preferred velocity, $\bar{u}$, computed by a guidance system in order to track a global trajectory. An optimal reference trajectory can be computed such that its associated local trajectory is collision free. This provides a parameterization of local motions given by u and allows for an efficient optimization in candidate reference velocity space, ($\mathbb{R}^3$), to achieve collision-free motions. FIG. 26 illustrates with functional block or data flow diagrams 2610 and 2620 local motion planning according to the present teaching that uses a distributed approach and using a centralized approach, respectively.

Velocity prediction involves consideration that in each time instance a probability distribution over the future velocities of the ego agent and its neighbors is available or, due to the structure of the problem, it can be relaxed to a utility over the possible future velocities that represents their individual likelihood. This distribution can be computed in an environment around the agent's current velocity. Given a candidate reference velocity, ui, for an agent, i, its utility is defined by a probability distribution:

$$\text{Utility}, \phi_i: \mathbb{R}^2 \to [0,1] u_i \mapsto \phi_i(u_i)$$     Eq. (42)

such that $\int_{u_i \in \mathbb{R}^2} \phi_i(u_i)=1$. A value close to 1 indicates that the agent is very likely to choose that reference velocity, while a value close to 0 indicates that it is very unlikely.

In multi-agent applications where several robots/agents/vehicles are controlled, a prediction over the future velocities of the neighboring agents may not be suitable. In that case, a cost can be defined:

$$\text{Cost}, \chi_i: \mathbb{R}^2 \to [0,\infty) u_i \mapsto \chi_i(u_i)$$     Eq. (43)

which is then transformed into a utility distribution with a mapping $[0,\infty) \to [0,1]$. To maintain the linear characteristics for low cost, one can employ the following (but, note, other mappings are possible and may be used):

$$\phi_{i,aux}(u_i)=\max(0, 1-\chi_i(u_i)/K_0)$$     Eq. (44)

where $K_0$ is the cut-off cost, and this can be normalized to $$\phi_i(u_i) = \frac{\phi_{i,aux}(u_i)}{\int_{u_i \in R^2} \phi_{i,aux}(u_i)}$$     Eq. (45)

In the following paragraphs, three cases are discussed: (1) a simplified prediction; (2) utility computed from a motion prediction; and (3) utility computed from a cost distribution.

Using a simplified prediction may be useful in some implementations of a controller or control system. Simplifying assumptions can be made with respect to the neighboring agents such as the following: (1) static agent to provide a zero-order approximation ($\phi_j(u_j)=1$, for $u_j=0$; $\phi_j(u_j)=0$ otherwise); (2) constant velocity for a first-order approximation ($\phi_j(u_j)=1$, for $u_j=v_j$; $\phi_j(u_j)=0$); and (3) constant preferred velocity to provide a first-order approximation ($\phi_j(u_j)=1$, for $u_j=\bar{u}_j$; $\phi_j(u_j)=0$). In these formulations of the velocity predictions, $\bar{u}_j$ is the preferred velocity of agent j.

In other cases, the velocity prediction may be provided using a utility given a motion prediction. As a step towards accounting for uncertainties and predictions, one may consider the case of having a prediction of the future motion of the neighboring agent, i, given by a Gaussian Process (GP) over its future positions and velocities. The utility of each reference velocity can then be obtained by computing the posterior probability given the Gaussian Process, with different levels of complexity and using the following: (1) reference velocity ($\phi_j(u_j)=P(u_j,GP)$); (2) candidate reference trajectory ($\phi_j(u_j)=P(p_k^k+u_j(t-t^k),GP(t))$); and (3) candidate local trajectory ($\phi_j(u_j)=P(f(z_j^k,u_j,t),GP(t))$).

In still other cases, the velocity prediction may be provided using a utility given by a cost from the environment. The environment characteristics can be taken into account when constructing the weights over the reference velocities, $u_j$. This approach then provides information about the maneuverability of the neighboring agents and their motion preferences and can later be incorporated in the local motion planning step.

As an example, the cost, $\chi_j(u_j)$, can be given by the sum of several terms, which may include the following and should be saturated: (1) deviation from current velocity, where the agent is expected to continue with its current velocity ($K_1\|u_j-v_j\|^2$); (2) deviation from preferred velocity, where velocities close to its preferred velocity incur lower cost ($K_2\|u_j-\bar{u}_j\|^2$); (3) cost to go, determined as being proportional to the distance from the desired goal to the expected position after the time horizon of the local planner and as may be determined with a search algorithm or from a pre-computed distance transform map, and, with $K_3$ being a design constant, the term can be normalized to $[0,K_3v_{max}\tau]$ by $K_5$max $(0, cost2go(p_j^k+u_j\tau)-C_0)$ Eq. (46) where $C_0$=max $(0, cost2go(p_j^k)-v_{max}\tau)$; (4) static obstacles, where a high cost, $K_4\to\infty$, is added for reference trajectories in collision with a static obstacle such that $p_j^k+u_j\tilde{t}\in O_r$ for some $\tilde{t}\in[0,\tau]$; (5) congestion, where a cost, $K_5\ll K_4$, can be added for reference trajectories in collision with another agent for $\tilde{t}\in[0,\tau]$; for this weight, the other agents can be considered static or moving at constant speed, and the intuition behind this is that an agent would prefer to move away from other neighbors but, since they are mobile, the cost of a potential collision is not too high; note, this term penalizes movement towards potentially congested areas and may only be used for guidance as hard collision avoidance constraints are included in the local motion planning framework; and (6) motion velocity field, where the case is considered where a motion velocity field of the environment is available given by a velocity, V(p), for each position p, and this is the case, for example, in multi-lane navigation, with intuition indicating that velocities against the flow field are unlikely; this could be encoded by $K_5\int_0^\tau \|V(p_j^k+u_j t)-u_j\|dt$ for areas where the velocity field is defined and 0 in free areas (but alternative formulations are possible).

The different cost teams represent the belief the agent has over the environment and their relative weights are design parameters. Costs 1 and 4 to 6 can be obtained by all agents with common observations. On the other hand, costs 2 and 3 are agent specific and cannot be observed, although an estimation may be available and used. These terms are given as an example and can be modified or simplified. One contribution of this description is that of incorporating the velocity prediction in the planning.

Now, turning to determination of preferred velocity, in each time step, each agent, computes a preferred velocity, $\bar{u}_i$, which would be its desired reference velocity in the absence of other agents. It can be obtained to achieve different objectives. A first objective may be goal directed. In this case, the preferred velocity, $\bar{u}_i$, can be computed from the "cost to the goal" map (e.g., obtained by an F1 expansion as discussed above). Its orientation is that of the shortest path to the goal from the current position of the agent, and its magnitude equals the preferred speed, $\bar{V}>0$, of the agent reduced linearly in the neighborhood of the goal.

A second objective may be trajectory following. In this case, the preferred velocity, $\bar{u}_i$, is given by a trajectory tracking controller for omnidirectional agents, such as a controller in position with feed forward velocity, such as:

$$\bar{u}=K_p(q_i-p_i)+\dot{q}_i \qquad \text{Eq. (47)}$$

where $q_i$ is the ideal position on the guidance trajectory at the current time and $K_p$ is a design constant. A third objective may be semi-autonomous driving. In this case, the preferred velocity, $\bar{u}_i$, can be specified by a driver, with the preferred velocity, $\bar{u}_i$, being proportional to the driving wheel or joystick position (in the relative frame of the vehicle).

In practice, the preferred velocity, $\bar{u}_i$, often will be corrected with a repulsive velocity, $\mathring{u}_i$, that pushes the vehicle away from both static and dynamic obstacles. Collision-free motion is guaranteed by the constraints that are directly included in the local planning framework. Optimal solutions that minimize deviation with respect to the preferred velocity do produce solutions where agents come arbitrarily close to each other. This behavior can be unsafe in some real world scenarios with uncertainties in sensing and kinematic model. The repulsive velocity is, thus, included to help maintain a minimum distance to other agents and walls, and it moves the ego-agent (controlled vehicle) away when it is too close.

A linear function weighting the distance to other vehicles can be used that is adapted to specify the maximum velocity allowed towards the obstacles or other vehicles as shown by:

$$\mathring{u}_i = u_{i|o}^{rep} n_{i,o} + \sum_{j|p_{ij}<D} u_{i|j}^{rep} \frac{p_{ij}}{p_{ij}} \qquad \text{Eq. (48)}$$

where $$u_{i|o}^{rep} = \max\left(V_r \frac{\overline{D}-d(p_i,O_{\tau_i})}{\overline{D}} - \overline{V}, \bar{u}_i \cdot n_{i,o}\right) \qquad \text{Eq. (49)}$$

$$u_{i|j}^{rep} = \max\left(V_r \frac{D-p_{ij}}{D-r_i-r_j} - \overline{V}, \bar{u}_i \cdot \frac{p_{ij}}{p_{ij}}\right) \qquad \text{Eq. (50)}$$

where $V_r$ is the maximum repulsive velocity, D and $\overline{D}$ are the maximum distance from which a repulsive force is added, $d(p_i,O)$ is the distance to the closest static obstacle within the $O_{r_i}$ map and $n_{i,O}$ is the normal vector from it. In order to avoid corner issues, not only the closest point it considered but also an average over the closest points. The norm of $\mathring{u}_i$ is then limited to $\|\mathring{u}_i\|\leq V_r$. For ease of notation, consider the following $\tilde{u}:=\bar{u}+\mathring{u}$.

Turning now to consideration of motion constraints, for an agent, i, the candidate local trajectories can be given by a tracking controller, $p_i(t)=f(z_i^k,u_i,\tilde{t})$, towards a constant velocity reference trajectory parameterized by u. The set of feasible local trajectories given the current state is defined by:

$$\mathcal{R}_i(z_i^k)=\{u_i\in\mathbb{R}^2, \text{such that the trajectory } f(z_i^k,u_i,\tilde{t})$$
$$\text{respects all dynamic constraints}\} \qquad \text{Eq. (51)}$$

And, in the following discussion, the super-index, $*^k$, is dropped to simplify the notation.

With regard to a first constraint regarding dynamic restrictions ("Constraint 1"), in order to guarantee collision-free motions, it should be guaranteed that each agent remains within a maximum tracking error, $\in_i$, of its reference trajectory. For a maximum tracking error $\in_i$ and a current state, $z_i=[p_i,\dot{p}_i,\ddot{p}_i]$, the set of reference velocities $u_i$ that can be achieved with position error below $\in_i$ is given by $R_i:=R(z_i,\in_i)$ and then:

$$R_i:=\{u_i\in\mathcal{R}_i(z_i)|\|(p_i+\tilde{t}u_i)-f(z_i,u_i,\tilde{t})\|\leq\in_i,\forall \tilde{t}>0\} \qquad \text{Eq. (52)}$$

If a local trajectory that is continuous in acceleration is used (such as one generated by one of the trajectory controllers taught herein), the set of reachable reference velocities, $R_i$, depends on $\dot{p}_i$, $\ddot{p}_i$, and $\in_i$. A mapping, $\gamma$, from the initial state, $\dot{p}_i$, $\ddot{p}_i$, and a reference velocity, $u_i$, to maximum tracking error is precomputed and stored in a look up table as:

$$\gamma(u_i,\dot{p}_i,\ddot{p}_i) = \max_{\tilde{t}>0} \|(p_i + \tilde{t}u_i) - f(z_i,u_i,\tilde{t})\| \qquad \text{Eq. (53)}$$

A bounding box given by four linear constraints of the form $H_j=\{u_i|n_ju_i\leq b_j\}$ is computed such that $R_i \subset \cup_{l=1}^{4}H_l$. These linear constraints can then be included in the algorithms to reduce the search space.

Although some examples of agents, vehicles, or robots have been provided earlier, it may be useful at this point in the description to provide several additional examples of typical robot models used by the inventors to implement and/or test their control methods (and controllers and control systems). Below, five different robot kinematics and dynamics models are described that have been implemented and tested with this framework, and these cover most of the typical robot platforms presently in use.

First, one may model a robot, vehicle, or agent as a simply unicycle that may take the form of a small, differently-drive robot. In this case, the local trajectories can be defined by two sections including a circumference arc followed by a straight line path at a constant speed, $u_i$. The angular velocity over the arc was, in one model, defined such that the correct orientation was achieved within a fixed time, T, and the linear velocity minimized the tracking error of the reference trajectory. A closed form solution was obtained for the set $R_i$, but, in this simple formulation, the robots had no constraints in acceleration and the linear and angular velocities presented a discontinuity.

Second, one may model the controlled agent as a bicycle. For example, this modeling may be applied to car-like robots with bicycle kinematics. A trajectory controller can be employed to track the referenced trajectory given by a constant speed, $u_i$, and was obtained by applying full-state linearization via dynamic feedback to the non-linear system. Additional constraints such as maximum steering angle and velocity and linear velocity and acceleration were added as saturation limits. This framework was useful as it guaranteed continuity in both linear velocity and steering angle.

Third, a point mass $v^{th}$-order integrator may be used to model the controlled vehicle. A controller for point mass $v^{th}$-order integrator dynamics can and has been described, which is continuous up to the $v_{th}$ derivative of the initial state. For $v>0$, the state feedback control law was given by:

$$p^{(v+1)}(\tilde{t})=-a_v p^{(v)}-\ldots -a_2\ddot{p}+a_1(u-\dot{p})+a_0(p^k+u\tilde{t}-p) \qquad \text{Eq. (54)}$$

In particular, for $v=2$ (continuity in initial acceleration), the trajectory is given by:

$$p(\tilde{t})=p^k+u\tilde{t}+((\dot{p}^k-u+(\omega_1-\omega_0)F)\tilde{t}-F)e^{-\omega_0\tilde{t}} \qquad \text{Eq. (55)}$$

with $F=(\ddot{p}^k+2\omega_0(\dot{p}^k-v\infty))/(\omega_0-\omega_1)^2$ and $\omega_0$, $\omega_1$ being design parameters related to the decay of the initial velocity and acceleration.

Fourth, the robot may be modeled as a unicycle with dynamic constraints. For example, as shown in FIG. 2, a robotic wheelchair may be modeled as a unicycle. The kinematic model of a differentially-driven agent (unicycle) was considered:

$$[\bar{p},\dot{\delta}]^T=[\cos\delta,\sin\delta,0]^T v_1+[0,0,1]^T v_2 \qquad \text{Eq. (56)}$$

with $\bar{p}$ being the point in between both tractor wheels, $\delta$ being the orientation of the vehicle, and $v_1$, $v_2$ being the forward and rotational speed of the platform, respectively. The relevant variables are shown in FIG. 2. For this non-linear system, $\bar{p}$ is not fully controllable. Any reference point, p, to the front of the vehicle axles is fully controllable and linearization via static feedback becomes feasible. Consider $p=\bar{p}+[\cos\delta, \sin\delta]^T\Delta$, where $\Delta>0$ defines the maneuverability of the vehicle. The following relations then hold:

$$\dot{p}=\xi, v_1=\xi\cdot[\cos\delta,\sin\delta]^T, v_2=[-\sin\delta,\cos\delta]^T/\Delta \qquad \text{Eq. (57)}$$

and the system is then controllable about p with holonomic velocity inputs given by $\xi\in\mathbb{R}^2$ and a local trajectory may be applied at this point. A circle with a radius, r, is considered as the enveloping shape of the vehicle. Equation (55) defines the local motion of the vehicle's holonomic point. Additional constraints can be added such as maximum linear and angular velocity ($|v_1|\leq v_{1,max}$, $|v_2|\leq v_{2,max}$) and maximum linear and angular accelerations ($|\dot{v}_1|\leq\dot{v}_{1,max}$, $|\dot{v}_2|\leq\dot{v}_{2,max}$).

Fifth, the vehicle may be modeled as an omnidirectional boat with dynamic constraints. The methods taught herein have also been applied to control a team of omnidirectional boats controlled by three rotating propellers. An LQR controller in position in velocity was employed to track the reference trajectory. Additional saturation limits were included that accurately model the boat dynamics.

In the control method, static obstacles are typically given by a grid map, $O_0$, of occupied space. The dilated obstacle map of the positions, p, where a disk, D(p,r), is in collision with a static obstacle is denoted by $O_r$. Its complement defines the positions for which the agent is not in collision. A constraint ("Constraint 2" in some of this description) can be stated regarding collision avoidance with static obstacles. For agent $i\leq m$ this constraint is given by the reference velocities such that the new positions are not in collision with the enlarged obstacle map, $p_i+u_i\tilde{t} \notin O_{r_i+\in_i}$, for all $\tilde{t}\in[0,\tau]$.

The constraint can be kept in its original grid-based representation or convexified. Grid-based forms can be used due to the mapping between velocities and future positions. This provides a vehicle with full navigation capability including being able to move close to the static obstacles and being able to go inside small openings. Particularly, given a known grid map, $O_0$, the enlarged map $O_{r_i+\in_i}$ can be precomputed for several values of $\in_i$. With regard to convexification, for simplicity and lower computational cost, the static obstacles within a neighborhood of the robot may be approximated by a union of linear constraints forming a convex polygon. This is the case, of example, for a polygon where the closest side is taken as the linear constraint, but, in complex environments, this can be suboptimal. Depending on the algorithm employed either the grid-based representation or its convex approximation can be employed.

With regard to pair-wise collision avoidance, the following discussion teaches the constraint for inter-agent avoidance (or avoidance of dynamic obstacles), and it may be based on work on velocity obstacles, reciprocal velocity obstacles, and/or their convex counterpart. The constraint is computed for agents of radius $\hat{r}_i = r_i + \epsilon_i$ following the reference trajectory. First, the constraint is described in its relative velocity space formulation, which can be employed in a centralized optimization. Then, three different approaches to obtain a distributed version are described.

Regarding a velocity obstacle and relative velocity space, the inter-agent collision avoidance constraint can be obtained for the reference trajectory following or using work on velocity obstacles. The velocity obstacle is formed by the relative reference velocities that lead to a collision between the two agents within the given time horizon $\tau$. This constraint ("Constraint 3" or a constraint to provide inter-agent collision avoidance) may be stated: for every pair of neighboring agents $i \leq m$, $j \in [i+1, n]$, the constraint is given be the candidate reference velocities such that $\|p_i - p_j + (u_i - u_j)\tilde{t}\| \geq \hat{r}_{i+j} = \hat{r}_i + \hat{r}_j$, for all $\tilde{t} \in [0, \tau]$. This constraint can be rewritten as $u_i - u_j \notin VO_{ij}^\tau = \cup_{t=0}^\tau ((D(p_j, \hat{r})) \oplus D(p_i, \hat{r}_i)/\tilde{t})$, representing a truncated cone, which is only computed if the distance between the two agents is below a threshold ($p_{ij} < K_d$). Since this constraint is non-convex (free space is the complement of $VO_{ij}^\tau$), it should be linearized to incorporate it into a convex optimization. Alternatively, for homogeneous teams of robots, the control obstacle (or $C^N$) can be employed as a substitute of the velocity obstacle. Then, $C^N$-CO considers all interacting agents or robots as linear systems with order N dynamics. After linearization of the $C^N$-CO, the method described herein proceeds analogously.

An approximation can be made using linear constraints. Particularly, the non-convex constraint $\mathbb{R}^2 \backslash VO_{ij}^\tau$ (inter-agent collision-free reference velocities) can be approximated by three linear constraints of the form $n_{ij}^l \cdot u_{ij} - b_{ij}^l$, with $l \in \{1, 2, 3\}$ and given by:

$$\begin{bmatrix} \cos(\gamma^+) \\ \sin(\gamma^+) \end{bmatrix} u_{ij} \leq 0, \; -\frac{p_{ij}}{p_{ij}} \cdot u_{ij} \leq \frac{p_{ij} - r_{i+j}}{\tau}, \; \begin{bmatrix} \cos(\gamma^-) \\ \sin(\gamma^-) \end{bmatrix} u_{ij} \leq 0 \quad \text{Eq. (58)}$$

where $\gamma^+ = \alpha + \beta$, $\gamma^- = \alpha - \beta$, $\alpha = \text{a tan } 2(-p_{ij})$ and $\beta = \text{a cos}(r_{i+j}/p_{ij})$. The first and last constraints represent avoidance to the right and to the left, respectively, and the middle constraint represents a head-on maneuver, which remains collision free up to $\tilde{t} = \tau$.

Turning now to the selection of a linear constraint, $\mathbb{R}^2 \backslash VO_{ij}^\tau$ is linearized by selecting one of the three linear constraints. Sensible choices include the following: (1) fixed side for avoidance: if agents are moving towards each other ($v_{ij} \cdot p_{ij} < 0$) avoid on a predefined side, on the left (l=1) or on the right (l=3) and if the agents are not moving towards each other the constraint perpendicular to the apex of the cone (l=2) is selected to maximize maneuverability; (2) maximum constraint satisfaction for the current relative velocity, $$\underset{l}{\text{argmin}} \, (n_{ij}^l \cdot (v_i - v_j) - b_{ij}^l):$$

this selection maximizes the feasible area of the optimization when taking into account the motion continuity constraints; and (3) maximum constrain satisfaction for the preferred velocity, $$\underset{l}{\text{argmin}} \, (n_{ij}^l \cdot (\bar{u}_i - \bar{u}_j) - b_{ij}^l)$$

if centralized and $$\underset{l}{\text{argmin}} \, (n_{ij}^l \cdot (\bar{u}_i - v_j) - b_{ij}^l)$$

if distributed: this selection may provide faster progress towards the goal position but the optimization may become quickly infeasible if the agent greatly deviates from its preferred trajectory. Option 1 provides the best coordination results as it incorporates a social rule, Option 2 maximizes the feasible area of the optimization, and Option 3 provides (or may provide) faster convergence to the ideal trajectory. Without loss of generality, consider $n_{ij} \cdot u_i \leq b_{ij}$ the selected linearization of $\mathbb{R}^2 \backslash VO_{ij}^\tau$, which can be included in a centralized convex optimization.

Pair-wise collision avoidance may also include avoidance of a velocity obstacle in the distributed case. The new reference velocity of the neighboring agent, $u_j$, is unknown. One of the following assumptions can be made regarding this velocity: (1) static agent: the assumption $u_j = 0$ is made, and the constraint is then given by $u_i \in \mathbb{R}^2 \backslash VO_{ij}^\tau$ and its linearization by $n_{ij} \cdot u_i \leq b_{ij}$, with this approach being prone to collisions in highly dynamic environments; and (2) constant velocity: the assumption $u_j = v_j$ is made, and the constraint is then given by $u_i \in \mathbb{R}^2 \backslash VO_{ij}^\tau \oplus v_j$ and its linearization by $n_{ij} \cdot u_i \leq b_{ij} + n_{ij} \cdot v_j$, with this approach typically not considering the case where the other agent is also decision-making.

Pair-wise collision avoidance may further include velocity obstacles (or a distributed reciprocal). In the following discussion, the assumption is made that all agents compute collision-free motions following identical algorithms. One attempt towards taking into account decision making can be considered the work on the reciprocal velocity obstacle, where the velocity obstacle was slightly translated and the assumption was made that both agents share the avoidance effort with a known weight. To avoid reciprocal dances, to obtain stronger guarantees, and to coin the problem as a convex optimization, the idea was later extended to optimal reciprocal collision avoidance (ORCA).

The goal with regard to the velocity obstacle is to obtain two sets $F_{i|j} \subset \mathbb{R}^2$ and $F_{j|i} \subset \mathbb{R}^2$ such that for every velocity $u_i \in F_{i|j}$ and for every velocity $u_j \in F_{j|i}$ the relative velocity is collision free, thus:

$$\left. \begin{array}{l} u_i \in \mathcal{F}_{i|j} \\ u_j \in \mathcal{F}_{j|i} \end{array} \right\} \Rightarrow u_i - u_j \in \mathbb{R}^2 \backslash VO_{ij}^\tau \quad \text{Eq. (59)}$$

equivalent to $F_{i|j} \oplus (-F_{j|i}) \subset \mathbb{R}^2 \backslash VO_{ij}^\tau$. Therefore, agent i can freely select a velocity within $F_{i|j}$ and agent j can freely select a velocity within $F_{j|i}$.

An avoidance topology can be fixed by first linearizing the constraint $\mathbb{R}^2 \backslash VO_{ij}^\tau$. In this case, the partition is reduced to obtaining a value $b_{i|j}$ such that:

$$n_{ij} \cdot u_i \leq b_{i|j}$$
$$-n_{ij} \cdot u_j \leq b_{ij} - b_{i|j}$$ $$\Rightarrow n_{ij} \cdot u_{ij} \leq b_{ij}$$
Eq. (60)

where the implication holds for any $b_{i|j} \in \mathbb{R}$. For reciprocal collision avoidance, $b_{i|j}$ can be defined such that if the minimum required change in relative velocity is denoted by $\Delta u_{ij}$ then the minimum required change in velocity for agent i is $\Delta u_i = \lambda_{i|j} \Delta u_{ij}$, with $\lambda_{i|j}$ being a constant to indicate how the avoidance effort is shared between both agents. For agent j, it is then assumed $\Delta u_j = -(1-\lambda_{i|j})\Delta u_{ij}$. The implication of Equation (60) then holds, and, for agent i, the linear constraint is computed from:

$$n_{ij} \cdot u_{ij} = n_{ij} \cdot (v_i - v_j + \Delta u_{ij}) =$$
$$n_{ij} \cdot \left(v_i - v_j + \frac{\Delta u_i}{\lambda_{i|j}}\right) = n_{ij} \cdot (v_i - v_j + (u_i - v_i)/\lambda_{i|j}) \leq b_{ij}$$
Eq. (61)

which implies:

$$n_{ij} \cdot u_i \leq b_{i|j} = \lambda_{i|j} b_{ij} + n_{ij} \cdot ((1-\lambda_{i|j})v_i + \lambda_{i|j} v_j)$$
Eq. (62)

Figure 27:
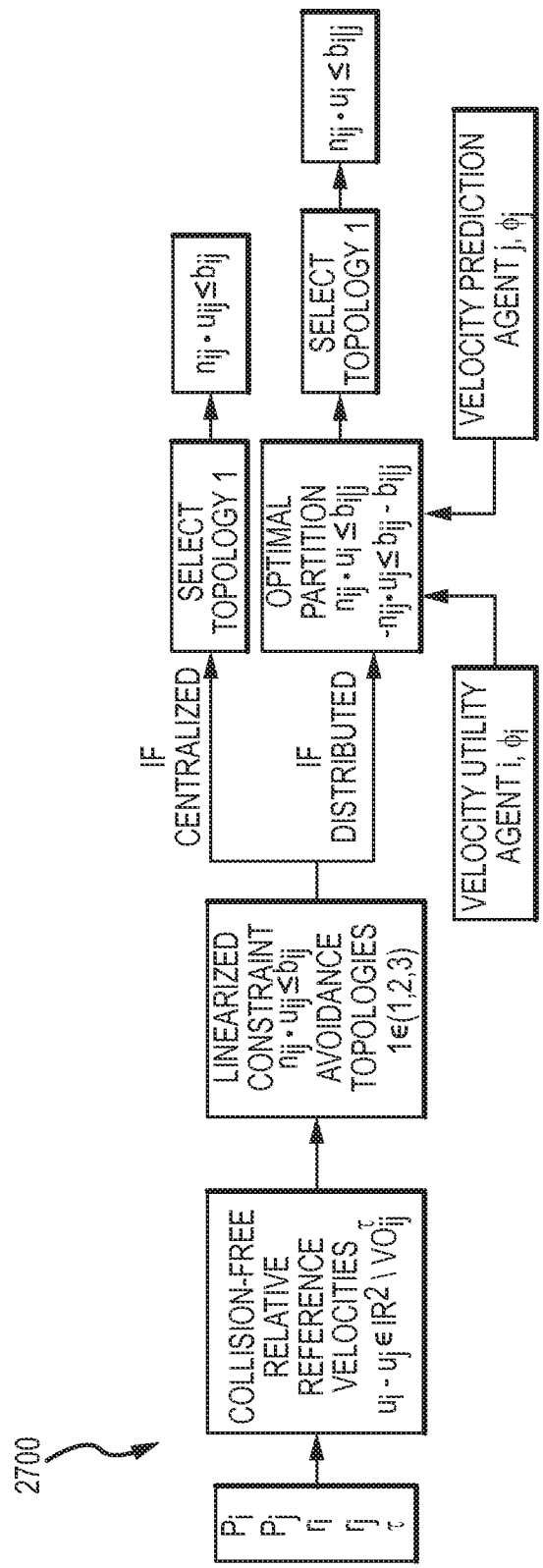
FIG. 27 illustrates a functional block drawing or data flow diagram showing an example of computation of collision constraints according to the present description.

Although decision making is encoded, the parameter $\lambda_{i|j}$ defining the collaboration effort is fixed and known, typically considering a known partition between agents that equally cooperate, $\lambda_{i|j} = 0.5$, and dynamic obstacles, $\lambda_{i|j} = 1$. FIG. 27 illustrates with the functional block system or data flow diagram 2700 exemplary computation of collision constraints.

At this point in the description, it may be useful to provide more explanation of cooperative pair-wise collision avoidance. Reciprocal methods are a first step towards modeling inter-agent decision making, but they consider all agents equal or a known cooperation effort. Velocity predictions and external factors such as static obstacles were not taken into account. In contrast, the following provides a method to incorporate a velocity prediction or utility function over future velocities in the selection of the sets $F_{i|j}$ and $F_{j|i}$ of the velocity partition for distributed collision avoidance. This produces a truly cooperative partition that takes into account the state of each agent and can improve vehicle navigation. A cooperation measure is defined as a function of the utility functions $\phi_i(u_i)$ and $\phi_j(u_j)$ of both interacting agents and the partition is found such that the cooperation measure is maximized.

With regard to the cooperation measure, to bound the problem, one can consider two disks, $D_i$ and $D_j$, that are centered at the current velocity of each agent and of known radius, such as $\tau a_i^{max}$ representing the velocities that can be achieved within the time horizon. For each linearization option, $l \in \{1, 2, 3\}$, of the collision-free relative velocities $\mathbb{R}^2 \setminus VO_{ij}^\tau$ and for each value of $b_{i|j}$ defining the partition, the cooperative measure $Y(l, b_{i|j})$ is given by: (1) $Y(l)$ which can favor a certain avoidance topology, for example to encode preferences for avoidance to the right; and (2) $Y(i,l,b_{i|j})$ which is a function of the utility of the collision-free velocities within the partition $F_{i|j}$ of agent i (analogously for agent j). One can then define each agent's term by:

$$Y(i, l, b_{i|j}) = \frac{\int_{u_i \in D_i \cap \mathcal{F}_{i|j}} \phi_i(u_i) du_i}{\int_{u_i \in D_i} \phi_i(u_i) du_i}$$
Eq. (63)

with $F_{i|j}$ and $F_{j|i}$ defined by Equation (60). Then, two alternative cooperation measures are proposed in the form of a joint value and a min-max value. The joint value is given by:

$$Y_1(l, b_{i|j}) = Y(l) + Y(i,l,b_{i|j}) + (j,l,b_{i|j})$$
Eq. (64)

The min-max value is given by:

$$Y_2(l, b_{i|j}) = Y(l) + \min(Y(i,l,b_{i|j}), Y(j,l,b_{i|j}))$$
Eq. (65)

Note that, for each agent and fixed l, $Y(i,l,b_{i|j})$ is a monotonically increasing/decreasing function of $b_{i|j}$ taking values from 0 to 1.

With regard to an optimal partition and linearization, for a cooperative measure $Y_r(l,b_{i|j})$, the optimal partition and linearization are then given by:

$$(l^*, b_{i|j}^*) = \arg\max_{l, b_{i|j}} Y(l, b_{i|j})$$
Eq. (66)

obtained by first computing the value $Y_r(l,b_{i|j})$ for each $l \in \{1, 2, 3\}$ and then selecting the maximum among the three. The reciprocal partition discussed earlier is obtained, for $\lambda = 0.5$, by employing the cooperation measure:

$$Y_r(l,b_{i|j}) = \max(n_{ij}^l \cdot v_i - b_{ij}, -n_{ij}^l \cdot v_i - (b_{ij} - b_{i|j}))$$
Eq. (67)

The following discussion teaches another exemplary algorithm or method for performing local motion planning (e.g., as may be implemented with the shared control system 100 of FIG. 1). In each control loop, an optimal reference velocity, $u^*_i$, is computed by solving an optimization in candidate reference velocity space. The preferred velocity, $\bar{u}_i$, of the ego-agent is given, together with the current position and velocity of neighboring agents. The following describes a distributed optimization and a centralized optimization. The optimization cost, which is described in detail below, is denoted by $C(u_i)$ and $C(u_{1:m})$.

For a first optimization technique ("Optimization 1" or distributed optimization), each agent, i, independently solves an optimization where its optimal reference velocity, $u^*_i$, is computed as follows, with the position $p_j$ and velocity $v_j$ of neighboring agents being known:

$$u_i^* = \arg\min_{u_i} C(u_i)$$

s.t. $\|u_i\| \leq u_{max}$ $u_i \in R_i$ respects motion constraints $u_i$ collision-free w.r.t. static obstacles $u_i \in \mathcal{F}_{i|j}$ collision-free w.r.t. neighboring agents For a second optimization technique or algorithm ("Optimization 2" or centralized optimization), a single optimization is solved where the optimal reference velocities of all vehicles, $u^*_{1:m} = [u^*_1, \ldots, u^*_m]$, are jointly computed as follows:

$$u_{1:m}^* = \arg\min_{u_{1:m}} C(u_{1:m})$$

s.t. $\|u_i\| \leq u_{max}, \forall i \leq m$ $u_i \in R_i$ respects motion constraints $\forall i \leq m$ $u_i$ collision-free w.r.t static obstacles $\forall i \leq m$ $u_i$ collision-free w.r.t neighboring agents $\forall i \leq m$ Note that in the centralized optimization the partitions, $F_{i|j}$, for distributed avoidance are not required or utilized.

In the following, four algorithms are described to compute the optimal reference velocities. First, a distributed, convex optimization may be used. Optimization 1 is solved with quadratic cost $C(u_i)$ and linearized constraints. Computational complexity is very low and scalability is very good, but the solution space is greatly reduced due to the linearization of the constraints and the partition of the reference velocity space. Second, a centralized, convex optimization may be used to compute the optimal reference velocities. In this case, Optimization 2 is solved with quadratic cost, $C(u_{i:m})$, and linearized constraints. Computation complexity is low and scalability is relatively good, but the solution space is partially reduced due to the linearization of the constraints. Third, a centralized, non-convex optimization may be utilized. With this algorithm, Optimization 2 is solved with quadratic cost, $C(u_{i:m})$, and non-convex constraints. Computational complexity is high and scalability is poor, but the complete solution space is explored. Fourth, a distributed, non-convex search may be performed within the convex region to compute the optimal reference velocities. With the use of this algorithm, Optimization 1 is solved with quadratic cost, $C(u_{i:m})$, or arbitrary utilities $\phi_i(u_i)$, linearized inter-agent collision avoidance constraints, non-convex motion constraints, and static obstacle avoidance constraints. Computational complexity is low and stability is good, but the solution space is reduced due to the linearization of the collision-avoidance constraints and the partition of the reference velocity space to guarantee safety in the distributed case.

These algorithms provide either collision-free reference inputs that respect all the dynamic constraints ($u^*_i$ if distributed or $u^*_{1:m}$ if centralized) or an infeasible flag. If the optimization is infeasible, the time horizon might be decreased or a different linearization might be selected. If the problem remains infeasible, agent i (distributed) or agents 1:m (centralized) decelerate on their last feasible local trajectory (obtained at time $t_f$) following the time remap given by:

$$\gamma(t) = -t_f^2/(2\tau) + (1+t_f/\tau)t - t^2/(2\tau), t \in [t_f, t_f+\tau], \gamma(t) = t_f + \tau/2, t > t_f+\tau \quad \text{Eq. (68)}$$

The re-parameterization of the trajectories guarantees that the vehicles stop within the time horizon of the local planner, unless the optimization becomes feasible in a later time step.

Turning first to distributed convex optimization, the optimization cost, $C(u_i)$ is defined by a quadratic function given by two terms. The first one is a regularizing term penalizing changes in velocity, and the second one minimizes the distance to the preferred velocity. The optimization cost may be determined as:

$$C(u_i) := K_o \|u_i - v_i\|^2 + \|u_i - \bar{u}_i\|^2 \quad \text{Eq. (69)}$$

where $K_o$ is a design constant.

Typically, pedestrians prefer to maintain a constant velocity in order to minimize energy. Hence, preference was given to turning instead of changing speed. Furthermore, penalizing changes in speed leads to a reduction of deadlock situations. This idea can be formalized as an elliptical cost, higher in the direction parallel to $\bar{u}_i$ and lower perpendicular to it. One can then let $\Lambda < 0$ represent the relative weight and let $\gamma_i$ represent the orientation of $\bar{u}_i$. Then, the relative weighting is defined by:

$$L = \begin{bmatrix} \Lambda & 0 \\ 0 & 1 \end{bmatrix} \text{ and } D_i = \begin{bmatrix} \cos\gamma_i & \sin\gamma_i \\ -\sin\gamma_i & \cos\gamma_i \end{bmatrix}$$

And the optimization cost is redefined as:

$$C(u_i) := K_o \|u_i - v_i\|^2 + (u_i - \bar{u}_i)^T D_i^T L D_i (u_i - \bar{u}_i) \quad \text{Eq. (70)}$$

For each neighboring agent j, a collision-avoidance constraint is computed, linearized, and partitioned ($u_i \in F_{i|j}$).

The constraints for avoidance of static obstacles are also linearized, and the set, $R_i$, defining the motion constraints is approximated by a convex polygon (formed by a union of linear constraints). If $R_i$ is given by two convex regions, only one is selected such as either the closest one to the previous reference velocity or the closest one to the preferred reference velocity. Note that at high speeds, $R_i$ is formed by a single region. The set of all linear constraints may be denoted by $C_{lin}$. Then, Optimization 1 may be formulated as a quadratic program with linear constraints as:

$$u_i^* = \arg\min_{u_i} C(u_i) \quad \text{Eq. (71)}$$
$$\text{s.t. } \|u_i\| \le u_{max}$$
$$n_s \cdot u_i \le b_s \forall s \in C_{lin}$$

Turning now to centralized convex optimization, the optimization cost, $C(u_{1:m})$, is defined by a quadratic function given by a weighted sum of the cost functions, $C(u_i)$, of each agent as:

$$C(u_{1:m}) := \Sigma_{i=1}^m \omega_i C(u_i) \quad \text{Eq. (72)}$$

where $\omega_i$ represents the weight of each individual agent in the avoidance effort and can be used to define characteristics such as shy versus aggressive behavior.

For each neighboring pair of neighboring agents, i and j, a collision-avoidance constraint is computed and linearized (e.g., as described above). The set of linear constraints for inter-agent collision avoidance (one for each pair of neighboring agents) is denoted by $C_{rel}$. The constraints for avoidance of static obstacles are also linearized and the sets $R_i$ are approximated by a convex polygon. The set of these linear constraints for agent i is denoted by $C_{i,abs}$. Then, Optimization 2 can be formulated as a quadratic program with linear constraints as:

$$u_{1:m}^* = \arg\min_{u_{1:m}} C(u_{1:m}) \quad \text{Eq. 73}$$
$$\text{s.t.}$$
$$\|u_i\| \le u_{max}, \forall i \le m$$
$$n_{ij} \cdot (u_i - u_j) \le b_{ij}, \forall i, j \text{ neighboring agents}$$
$$n_s \cdot u_i \le b_s, \forall i \in [1, m], \forall s \in C_{i,abs}$$

Turning now to centralized non-convex optimization, to coin the problem as a convex optimization, the inter-agent collision avoidance constraints were linearized, which led to a sub-optimal solution due to the reduction of the solution space (an avoidance topology was fixed). To obtain the global optimum, a non-convex problem should be solved. The solution may be obtained via sampling, which may use a large amount of samples in this high dimensional space with many constraints. Instead, the inventors propose that one of the two following algorithms may be utilized to provide shared control of vehicles.

First, one may utilize a mixed integer quadratic program. The optimization that is formulated in this way uses a program where three binary variables are added for each inter-agent collision avoidance constraint and that specifies which one of the three linear constraints is active. Another two binary variables are added for each $R_i$ set that needs to be approximated by two convex regions. One can then let b be the vector of all binary variables, where each binary variable, β, is zero if the constraint is active (to be satisfied) and one otherwise.

The optimization cost of Equation (72) is kept, with an optional modification. Since an avoidance topology is not defined beforehand, a side preference for the collision avoidance can now be added by appropriately selecting a penalty for the binary variables. The three binary variables associated with each VO constraint, $s \in C_{rel}$, are denoted by $\beta_s^l$, $l \in [1,3]$. For example, the rule "prefer to avoid on the right" can be added by penalizing $\beta_s^l = 1$ with a weight w. The vector of linear cost with respect to the binary variables is then given by:

$$f_\beta = [\underbrace{w00 \ldots w0}_{3|C_{rel}|} \underbrace{000 \ldots 00}_{2|I_2|}],$$

where $I_2$ is the set of agents whose set $R_i$ is approximated by two convex regions, $I_1 = [1,m] \backslash I_2$, and $|X|$ the cardinality of set X. The set of linear constraints for static obstacle avoidance is denoted by $C_{i,obst}$ and the set of linear constraints defining the polygonal approximation of $R_i$ by $C_{i,dyn}$, and the sets verify $C_{i,abs} = C_{i,obst} \cup C_{i,dyn}$.

Optimization 2, in this case, can then be formulated as a quadratic program with linear constraints as:

$$u_{1:m}^* = \arg\min_{u_{1:m},b} (Cu_{1:m}) + f_\beta \cdot b \quad \text{Eq. (74)}$$

s.t. $\|u_i\| \leq u_{max}, \forall i \in [1, m]$ $n_s^l \cdot (u_i - u_j) - \beta_s^l M \leq b_s^l, \forall s \in C_{rel}, l \in [1, 3]$ $\beta_s^1 + \beta_s^2 + \beta_s^3 = 2, \forall s \in C_{rel}$ $n_s \cdot u_i \leq b_s, \forall i \in [1, m], \forall s \in C_{i,obst}$ $n_s \cdot u_i \leq b_s, \forall i \in I_1, \forall s \in C_{i,dyn}$ $n_s \cdot u_i - \beta_s^l M \leq b_s, \forall i \in I_2, \forall s \in C_{i,dyn}, l \in [1, 2]$ $\beta_s^1 + \beta_s^2 = 1, \forall i \in I_2, \forall s \in C_{i,dyn}$ where M>>0 is a large enough constant and extra constraints have been added to impose that only one linear constraint is active for each original non-convex constraint. This optimization can be solved via branch-and bound, where the maximum number of explored nodes defines the ratio between optimality and computational time.

To reduce the computational time of the algorithm, an initial point may be specified. The solution of the convex optimization discussed herein may be well suited for this purpose since it typically returns a feasible (although not optimal) solution with very low computational time. Optimality of the solution increases with time as more nodes are explored. The algorithm can exit at any time to cope with run-time constraints, and, hence, this method features anytime properties.

Second, centralized, non-convex optimization may be formulated as message passing optimization. For example, this non-convex optimization can be solved using an improved version of the alternating direction method of multipliers (ADMM) algorithm known to those skilled in the art. This approach was naturally parallelizable and allowed for incorporating different cost functional with only minor adjustments, and binary constraints were no longer required and/or used. None the less, convergence to the global optimum was not guaranteed.

Turning now to distributed non-convex search within a convex region, convex (linear) and non-convex (grid-based) constraints are combined to explore a larger solution space while keeping the computational cost low. A convex cost, $C(u_i)$, is given by Eq. 70. Additionally, a non-convex cost can be defined, for example, by $\tilde{C}(u_i) = C(u_i) + \chi_i(u_i)$. The set of convex constraints is formed by the inter-agent linearized collision avoidance constraints (i.e., set $F_{i|j}$), and the bounding box of the set $R_i$ is denoted by C. For agent i, the set of non-convex constraints is formed by the static obstacle collision avoidance constraint and the set $R_j$ accounting for the motion constraints and is denoted by $\tilde{C}_i$. Both non-convex constraints are given by grid representations of identical resolution.

To efficiently find a solution, the optimization is divided in two parts. First, a convex subproblem is solved resulting in $u_i^c$, and, second, this is followed by a search within the grid-based constraints restricted to the convex area defined by the linear constraints. The quadratic cost defined in Equation (70) is maintained, and the algorithm proceeds as follows:

---

Input distributed: $z_1$, $\bar{u}_1$ and $r_1 + \epsilon_i$; $p_j$, $\dot{p}_j$ and $r_j$ ∀j neighbor of 1. Consider $\epsilon_j = \epsilon_1$.
Result: $u_i^*$
    Compute all constraints 1, 2 and 3
    $u_i^c \leftarrow$ solution 2-dimensional convex optimization with quadratic cost Eq. (70) and convex constraints C.
    ||Wave expansion from $u_i^c$ within convex area C.
    Initialize sorted list L (increasing cost $\tilde{C}(u_i)$) with $u_i^c$.
    while L ≠ ∅ do
        $u_i \leftarrow$ first point in L; L := L\\$u_i$; feasible := 'true';
        if feasibleDynamics($u_i$)= 'false' or feasibleMap($u_i$)= 'false' then
            L ←expandNeighbors(L, $u_i$);
            feasible := 'false';
        end if
        if feasible = 'true' then return $u_i^* = u_i$ end if.
    end while;
    return 0;

---

In this algorithm, function feasibleDynamics($u_i$), checks in a precomputed grid if the tracking error is below $\in_i$, given the initial state of the vehicle (if $u_i \in R_i$ then return 'true'; else 'false'). Function feasibleMap($\bar{u}_i$) checks if $u_i$ leads to a trajectory in collision with static obstacles given by the grid map $O_{r_i + \in_i}$. This is efficiently checked in the precomputed dilated map (see Constraint 2) (if segment $(p_i, p_i + u_i \tau) \cap O_{r_i + \in_i} = \emptyset$ then return 'true'). The function expandNeighbors adds the neighboring grid points if they are within the convex region defined by the convex constraints in and they are not previously explored, with the function defined as:

---

Function L ← expandNeighbors(L, $u_i^{in}$);
for each 8-connected grid neighbor $u_i^{neighbor}$ of $u_i^{in}$ do
    if {$u_i^{neighbor}$ not previously added to L} and
    {$u_i^{neighbor}$ satisfies convex constraints C} then
        L ← L ∪ $u_i^{neighbor}$;
        Sort list L, increasing cost $\tilde{C}(u_i)$ -continued

```
        end if;
    end for;
```

Figure 28:
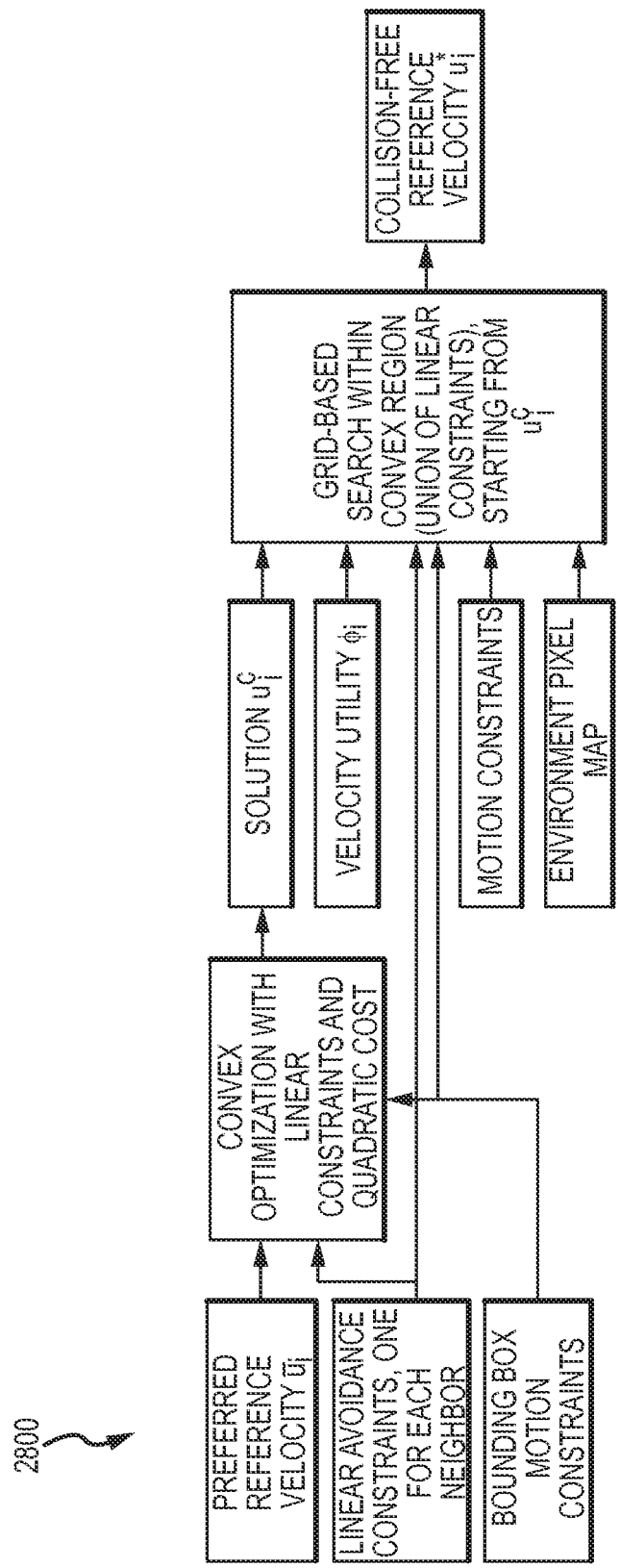
FIG. 28 illustrates a functional block or data flow diagram showing an example of a distributed non-convex search within convex region.

An example of implementation of the distributed non-convex search within a convex region algorithm is shown in FIG. 28 with data flow or functional block diagram 2800.

Now, it may be useful to turn to an analysis of the above-described algorithms providing collision avoidance guarantees. With regard to radius enlargement, variable maximum tracking error, $\in_i$, and associated radius enlargement is desirable for feasibility. To guarantee feasibility of the computation of the inter-agent collision avoidance constraint, $VO_{i|j}^\tau$, $r_i+r_j+\in_i+\in_j \leq d(p_i,p_j)$ should be satisfied, i.e., the extended radii of the robots should not be in collision. This might happen for fixed $\in_i$ but is assuredly avoided by having $\in_i$ and $\in_j$ stepwise decreasing when robots are close to each other.

The planned local trajectories are collision free up to time $\tau$, with the assumption that other vehicles follow the same algorithm or maintain a constant velocity. Passive safety is guaranteed if the assumptions hold. In the case where optimization is feasible, collision-free motion is guaranteed for the local trajectory up to time $\tau$ (optimal reference trajectory is collision free for agents of radii enlarged by $\in$ and agents stay within $\in$ of it) with the assumption that all interacting agents either continue with their previous velocity or compute a new one following the same algorithm and assumptions. One can let $p_i(t)$ denote the position of agent i at time $t \geq t^k$ and recall $\tilde{t}=t-t^k$, then:

$$\|p_i(t)-p_j(t)\|=\|f(z_i^k,u_i\tilde{t})-f(z_j^k,u_j\tilde{t})\| \geq \|(p_i^k+u_i\tilde{t})-(p_j^k+u_j\tilde{t})\|$$
$$\|-\in_i-\in_j \geq r_i+\in_i+r_j+\in_j-\in_i-\in_j=r_i+r_j \qquad \text{Eq. (75)}$$

where the first inequality holds from the triangular inequality and Constraint 1 ($u_i \in R_i$ and $u_j \in R_j$). The second inequality holds from Constraint 3 ($u_i-u_j \notin VOT_{ij}^\tau$ and, if distributed $u_i \in F_{i|j}$ and $u_j \in F_{j|i}$). To guarantee feasibility of the velocity obstacles computation and, thus, completion of the method, the discussion regarding radius enlargement should also hold. Due to the time-discrete implementation, after each time step, a new collision-free trajectory is computed. Therefore, the trajectories of all agents, given as concatenation of segments, are collision free.

If the optimization is infeasible, no collision-free solution exists that respects all constraints. If the time horizon is longer than the required time to stop, safety is preserved if all involved vehicles drive their last feasible trajectory with a time re-parameterization to reach stop before a collision arises:

$$\dot{\gamma}(t_f+\tau)=(1+t_f/\tau)-(t_f+\tau)/\tau=0 \qquad \text{Eq. (76)}$$

This time re-parameterization implies a slowdown of the agent, which in turn may render the optimization feasible in a later time step. Since this computation is performed at a high frequency, each individual agent is able to adapt to changing situations. With regard to dynamic obstacles, the feasibility of the optimization indicates if the dynamic obstacles can be avoided (assuming they adhere to their predicted reference velocity) or a collision is imminent. A fast control loop is able to handle small deviations in the prediction.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, in addition to the test cases described herein, a test case may involve arbitrary robots moving among people such as in a theme park or on a busy street (e.g., either with passenger providing input (such as a Segway-type vehicle or a wheelchair) or with autonomous control (e.g., a robotic character, a cleaning robot, a surveillance device, and so on)).

It will be understood that the methods taught herein are also useful for autonomous driving and not only semi-autonomous. For example, if no input from a driver/guest is available, the vehicle can be controlled to follow a desired path or navigate toward a predefined goal by itself. Thus, the driver input is optional. One can imagine a case where a driver/guest sits in/on the vehicle but does not command anything so as to just go along for a ride provided by the autonomously controlled vehicle. This one more reason that the guidance trajectories can be beneficial.

Several means are available to implement the systems and methods discussed in this specification. These means include, but are not limited to, digital computer systems, microprocessors, application-specific integrated circuits (ASIC), general purpose computers, programmable controllers and field programmable gate arrays (FPGAs), all of which may be generically referred to herein as "processors" (such as represented by processors 112 and 122 in the system 100 of FIG. 1). For example, in one embodiment, signal processing may be incorporated by an FPGA or an ASIC, or alternatively by an embedded or discrete processor. Therefore, other embodiments include program instructions resident on computer readable media which when implemented by such means enable them to implement various embodiments. Computer readable media include any form of a non-transient physical computer memory device (such as memory 149 of control system 120 in FIG. 1). Examples of such a physical computer memory device include, but are not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions (such as those in controllers 116, 132 in FIG. 1) include, but are not limited to, computer-executable instructions executed by computer system processors and hardware description languages such as Very High Speed Integrated Circuit (VHSIC) Hardware Description Language (VHDL).

We claim:

1. A method of providing shared control over movement of a vehicle within a space, comprising:
   receiving user input related to a velocity for the vehicle within the space;
   processing the user input with a local motion planner selectively adjusting the velocity based on a set of predefined constraints and presence of neighboring vehicles in the space to generate a trajectory for the vehicle in the space;
   communicating motion control signals including the trajectory to the vehicle; and
   operating drive mechanisms in the vehicle based on the motion control signals to move the vehicle from a first position to a second position within the space for an upcoming time period,
   wherein the set of predefined constraints comprises a grid map of the space that defines locations of obstacles in the space,
   wherein the processing of the user input includes searching the grid map to identify the obstacles and to define a path from the first position to the second position in the space that avoids the obstacles, and wherein the obstacles comprise virtual objects displayed in the space or on a monitor in the vehicle.

2. The method of claim 1, wherein the trajectory defines a speed for the vehicle and a direction for movement.

3. The method of claim 1, wherein the set of predefined constraints comprises a guidance trajectory defining a passageway through the space that can be traveled by the vehicle without collision with the obstacles and wherein the trajectory is defined to retain the vehicle within the passageway.

4. The method of claim 3, wherein the passageway comprises a set of interconnected waypoints in the space and wherein an active area in which the vehicle may move is associated with each of the waypoints.

5. The method of claim 4, wherein at least some of the active areas differ in size or shape defining differing areas in which the vehicle may move within the space.

6. The method of claim 1, wherein the set of predefined constraints includes kinematic data for the vehicle and wherein the processing of the user input based on presence of neighboring vehicles includes processing data for collision avoidance for other vehicles moving in the space, velocity predictions for ones of the other vehicles neighboring the vehicle in the space, or predictions of movements of the other vehicles during the upcoming time period.

7. A method for controlling vehicle movement through a drive or air space, comprising:
  with a controller, receiving user input related to a user-preferred trajectory for moving the vehicle within the space; and
  with the controller, processing the user input to selectively adjust the trajectory based on a set of predefined constraints to generate a control trajectory for the vehicle in the space for an upcoming time period,
  wherein the set of predefined constraints comprises a grid map of the space that defines locations of obstacles in the space,
  wherein the processing of the user input includes searching the grid map to identify the obstacles and to define a path from the first position to the second position in the space that avoids the obstacles,
  wherein the set of predefined constraints comprises a guidance trajectory defining a passageway through the space that can be traveled by the vehicle without collision with the obstacles,
  wherein the trajectory is defined to retain the vehicle within the passageway,
  wherein the passageway comprises a set of interconnected waypoints in the space,
  wherein an active area in which the vehicle may move is associated with each of the waypoints, and
  wherein at least some of the active areas differ in size or shape defining differing areas in which the vehicle may move within the space.

8. The method of claim 7, wherein the set of predefined constraints includes kinematic data for the vehicle, data for collision avoidance for other vehicles moving in the space, velocity predictions for ones of the other vehicles neighboring the vehicle in the space, or predictions of movements of the other vehicles during the upcoming time period.

9. A method for controlling a vehicle in an installation, comprising:
  receiving a user-generated vehicle motion command for the vehicle;
  determining whether the user-generated vehicle motion command implicates a constraint;
  when the user-generated vehicle motion command implicates the constraint, combining the user-generated vehicle motion command with a system-generated command to produce a modified vehicle motion command to control movement of the vehicle in the installation; and
  when the user-generated vehicle motion command does not implicate the constraint, using the user-generated vehicle motion command to control movement of the vehicle in the installation,
  wherein the combining of the user-generated vehicle motion command with the system-generated command to produce the modified vehicle motion command comprises performing an optimization adapted to maintain a perception that the user-generated vehicle motion command is directly controlling the vehicle subject to the constraint,
  wherein the constraint comprises at least one of avoiding collision with other vehicles moving in the installation, avoiding collision with static obstacles in the installation, and ensuring a defined motion is realizable by the vehicle, and
  wherein the optimization is global whereby motion commands are computed concurrently for all vehicles, including the vehicle, in the installation.

10. The method of claim 9, wherein the constraint comprises a schedule such that the vehicle is guaranteed to be in a specified zone in the installation at a system-determined time or time interval.

11. The method of claim 10, wherein the schedule is defined using a guidance trajectory specifying a trajectory, a time associated with points on the trajectory, an active zone associated with each of the points, and a time interval associated with each of the active zones.

12. The method of claim 11, wherein the constraint comprises ensuring a position of the vehicle lies within one of the active zones within the time interval associated with the one of the active zones.

13. The method of claim 12, wherein the schedule is defined by a second guidance trajectory, wherein the vehicle may be controlled in a selective manner using the guidance trajectory or the second guidance trajectory, and wherein switching between the guidance trajectories is performed in response to optimizing a cost function related to a vehicle schedule based on a current state of the vehicle or is performed in response to user input selecting among a two or more of the active states.

14. The method of claim 12, wherein consistency between the vehicle and the guidance trajectory is maintained by adding a motion component that directs the vehicle towards a point within the guidance trajectory for a next time instant.

15. The method of claim 9, wherein the schedule further defines an orientation for the vehicle within the specified zone.

16. The method of claim 9, wherein the constraint comprises a relationship between the vehicle and at least one other vehicle moving through the installation and wherein the user-generated vehicle motion command is modified according to the relationship.

17. The method of claim 9, wherein the constraint comprises a vehicle position relative to static obstacles in the installation and wherein the user-generated vehicle motion command is modified according to a position of the vehicle in the installation relative to the static obstacles.

18. The method of claim 9, further comprising projecting an image of an object onto a surface in the installation and wherein the modified vehicle motion command is generated based on a proximity of the vehicle to the surface onto which the image is projected.

19. The method of claim 18, wherein the modified vehicle motion command is adjusted when the vehicle passes over the surface onto which the image is projected or wherein the image is a fixed or moving projected image generated in response to user input in the vehicle.

20. The method of claim 9, wherein the optimization is local to each vehicle in the installation based on the user-generated vehicle motion command and a predicted motion of neighboring vehicles of the vehicle.

21. The method of claim 9, wherein, when the modified vehicle motion command does not satisfy the constraint, a responsive motion command is generated to stop the vehicle or to continue movement of the vehicle along a prior trajectory.

22. The method of claim 9, wherein surfaces of the installation are characterized by a pixel map comprising a two-dimensional or three-dimensional grid allowing computation of vehicle motions that do not result in collision with the surfaces.

23. The method of claim 9, wherein the constraint is precomputed with respect to a vehicle controller.

24. The method of claim 9, wherein a solution of the optimization is determined by wave expansion within a convex area defined by half-plane constraints determined to avoid collision with other vehicles until a value is determined that satisfies the constraint to avoid collision with fixed surface of the installation and satisfies the constraint to ensure the defined motion is realizable.

25. A method for controlling a vehicle in an installation, comprising:
   receiving a user-generated vehicle motion command for the vehicle;
   determining whether the user-generated vehicle motion command implicates a constraint;
   when the user-generated vehicle motion command implicates the constraint, combining the user-generated vehicle motion command with a system-generated command to produce a modified vehicle motion command to control movement of the vehicle in the installation; and
   when the user-generated vehicle motion command does not implicate the constraint, using the user-generated vehicle motion command to control movement of the vehicle in the installation,
   wherein the combining of the user-generated vehicle motion command with the system-generated command to produce the modified vehicle motion command comprises performing an optimization adapted to maintain a perception that the user-generated vehicle motion command is directly controlling the vehicle subject to the constraint,
   wherein the constraint comprises at least one of avoiding collision with other vehicles moving in the installation, avoiding collision with static obstacles in the installation, and ensuring a defined motion is realizable by the vehicle, and
   wherein a solution of the optimization is determined by wave expansion within a convex area defined by half-plane constraints determined to avoid collision with other vehicles until a value is determined that satisfies the constraint to avoid collision with fixed surface of the installation and satisfies the constraint to ensure the defined motion is realizable.

26. The method of claim 25, wherein the constraint comprises a schedule such that the vehicle is guaranteed to be in a specified zone in the installation at a system-determined time or time interval.

27. The method of claim 26, wherein the schedule is defined using a guidance trajectory specifying a trajectory, a time associated with points on the trajectory, an active zone associated with each of the points, and a time interval associated with each of the active zones.

28. The method of claim 27, wherein the constraint comprises ensuring a position of the vehicle lies within one of the active zones within the time interval associated with the one of the active zones.

29. The method of claim 28, wherein the schedule is defined by a second guidance trajectory, wherein the vehicle may be controlled in a selective manner using the guidance trajectory or the second guidance trajectory, and
   wherein switching between the guidance trajectories is performed in response to optimizing a cost function related to a vehicle schedule based on a current state of the vehicle or is performed in response to user input selecting among a two or more of the active states.

30. The method of 28, wherein consistency between the vehicle and the guidance trajectory is maintained by adding a motion component that directs the vehicle towards a point within the guidance trajectory for a next time instant.

31. The method of claim 25, wherein the schedule further defines an orientation for the vehicle within the specified zone.

32. The method of claim 25, wherein the constraint comprises a relationship between the vehicle and at least one other vehicle moving through the installation and wherein the user-generated vehicle motion command is modified according to the relationship.

33. The method of claim 25, wherein the constraint comprises a vehicle position relative to static obstacles in the installation and wherein the user-generated vehicle motion command is modified according to a position of the vehicle in the installation relative to the static obstacles.

34. The method of claim 25, further comprising projecting an image of an object onto a surface in the installation and wherein the modified vehicle motion command is generated based on a proximity of the vehicle to the surface onto which the image is projected.

35. The method of claim 34, wherein the modified vehicle motion command is adjusted when the vehicle passes over the surface onto which the image is projected or wherein the image is a fixed or moving projected image generated in response to user input in the vehicle.

36. The method of claim 25, wherein the optimization is local to each vehicle in the installation based on the user-generated vehicle motion command and a predicted motion of neighboring vehicles of the vehicle.

37. The method of claim 25, wherein, when the modified vehicle motion command does not satisfy the constraint, a responsive motion command is generated to stop the vehicle or to continue movement of the vehicle along a prior trajectory.

38. The method of claim 25, wherein surfaces of the installation are characterized by a pixel map comprising a two-dimensional or three-dimensional grid allowing computation of vehicle motions that do not result in collision with the surfaces.

39. The method of claim 25, wherein the constraint is precomputed with respect to a vehicle controller.

40. A method of providing shared control over movement of a vehicle within a space, comprising:
   receiving user input related to a velocity for the vehicle within the space;
   processing the user input with a local motion planner selectively adjusting the velocity based on a set of predefined constraints and presence of neighboring vehicles in the space to generate a trajectory for the vehicle in the space;

communicating motion control signals including the trajectory to the vehicle; and operating drive mechanisms in the vehicle based on the motion control signals to move the vehicle from a first position to a second position within the space for an upcoming time period, wherein the set of predefined constraints comprises a guidance trajectory defining a passageway through the space that can be traveled by the vehicle without collision with the obstacles and wherein the trajectory is defined to retain the vehicle within the passageway, wherein the passageway comprises a set of interconnected waypoints in the space, wherein an active area in which the vehicle may move is associated with each of the waypoints, and wherein at least some of the active areas differ in size or shape defining differing areas in which the vehicle may move within the space.

41. The method of claim 40, wherein the trajectory defines a speed for the vehicle and a direction for movement.

42. The method of claim 40, wherein the set of predefined constraints includes kinematic data for the vehicle.

43. The method of claim 42, wherein the processing of the user input based on presence of neighboring vehicles includes processing data for collision avoidance for other vehicles moving in the space, velocity predictions for ones of the other vehicles neighboring the vehicle in the space, or predictions of movements of the other vehicles during the upcoming time period.

\* \* \* \* \*